United States Patent
Aoyama et al.

(10) Patent No.: US 7,669,559 B2
(45) Date of Patent: Mar. 2, 2010

(54) INTERNAL COMBUSTION ENGINE

(75) Inventors: Shunichi Aoyama, Kanagawa (JP);
Katsuya Moteki, Tokyo (JP); Kenshi Ushijima, Kanagawa (JP); Shinichi Takemura, Yokohama (JP); Hideaki Mizuno, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 148 days.

(21) Appl. No.: 11/907,194

(22) Filed: Oct. 10, 2007

(65) Prior Publication Data
US 2008/0087255 A1    Apr. 17, 2008

(30) Foreign Application Priority Data

| Oct. 11, 2006 | (JP) | ............................. 2006-277854 |
| Oct. 18, 2006 | (JP) | ............................. 2006-283981 |
| Jul. 25, 2007 | (JP) | ............................. 2007-192734 |

(51) Int. Cl.
*F02B 75/04*    (2006.01)

(52) U.S. Cl. .................................................. 123/48 B

(58) Field of Classification Search .............. 123/48 B, 123/78 E, 197.4, 193.6, 193.2, 193.4
See application file for complete search history.

(56) References Cited

U.S. PATENT DOCUMENTS

| 4,662,326 A | * | 5/1987 | Kohnert ................... 123/193.6 |
| 4,751,871 A | * | 6/1988 | Burghardt et al. ............. 92/212 |
| 4,966,068 A | * | 10/1990 | Ficht et al. ..................... 92/193 |
| 6,703,145 B1 | * | 3/2004 | Samuelsson ................. 428/666 |
| 6,915,766 B2 | * | 7/2005 | Aoyama et al. ........... 123/78 E |
| 6,990,934 B2 | * | 1/2006 | Sugiyama et al. ......... 123/48 B |
| 2008/0223341 A1 | * | 9/2008 | Kamada .................... 123/48 B |

FOREIGN PATENT DOCUMENTS

| JP | 2005-163695 | * | 6/2005 |
| JP | 2005-180303 | * | 7/2005 |

OTHER PUBLICATIONS

Takatoshi Sugano et al, "Combustion Chamber and Performance of a Low heat Rejection Engine", Proceedings of 13$^{th}$ Internal Combustion Engine Symposium (International), 1996, 68, pp. 399-404.

* cited by examiner

*Primary Examiner*—Hai H Huynh
(74) *Attorney, Agent, or Firm*—Foley & Lardner LLP

(57) ABSTRACT

In a reciprocating piston engine employing a variable compression ratio mechanism linked to a reciprocating piston for variably adjusting a geometrical compression ratio by varying at least a piston top dead center position, so that the top dead center position obtained at a low geometrical compression ratio is set to be lower than that at a high geometrical compression ratio, responsively to a controlled variable, a controller is configured to set a target compression ratio to a high value at low engine load operation, and to a relatively low value at high engine load operation. A substantially entire area of a crown of the piston, defining a part of a wall surface of a combustion chamber, is formed of a non-metallic material having a higher heat-insulating and heat-reserving property as compared to a base structural material of each of the combustion chamber and the piston.

38 Claims, 46 Drawing Sheets

HIGH COMPRESSION RATIO POSITION

LOW COMPRESSION RATIO POSITION

AXIS Oa OF CONTROL SHAFT

USUAL ALL METAL PISTON

THERMAL-INSULATION PISTON

USUAL ALL METAL PISTON STRUCTURE

THERMAL-INSULATION PISTON AND TWO-SPLIT CYLINDER LINER STRUCTURE SUITED TO TWO CONTRADICTORY REQUIREMENTS, THAT IS, THERMAL INSULATION AND HEAT RECOVERY

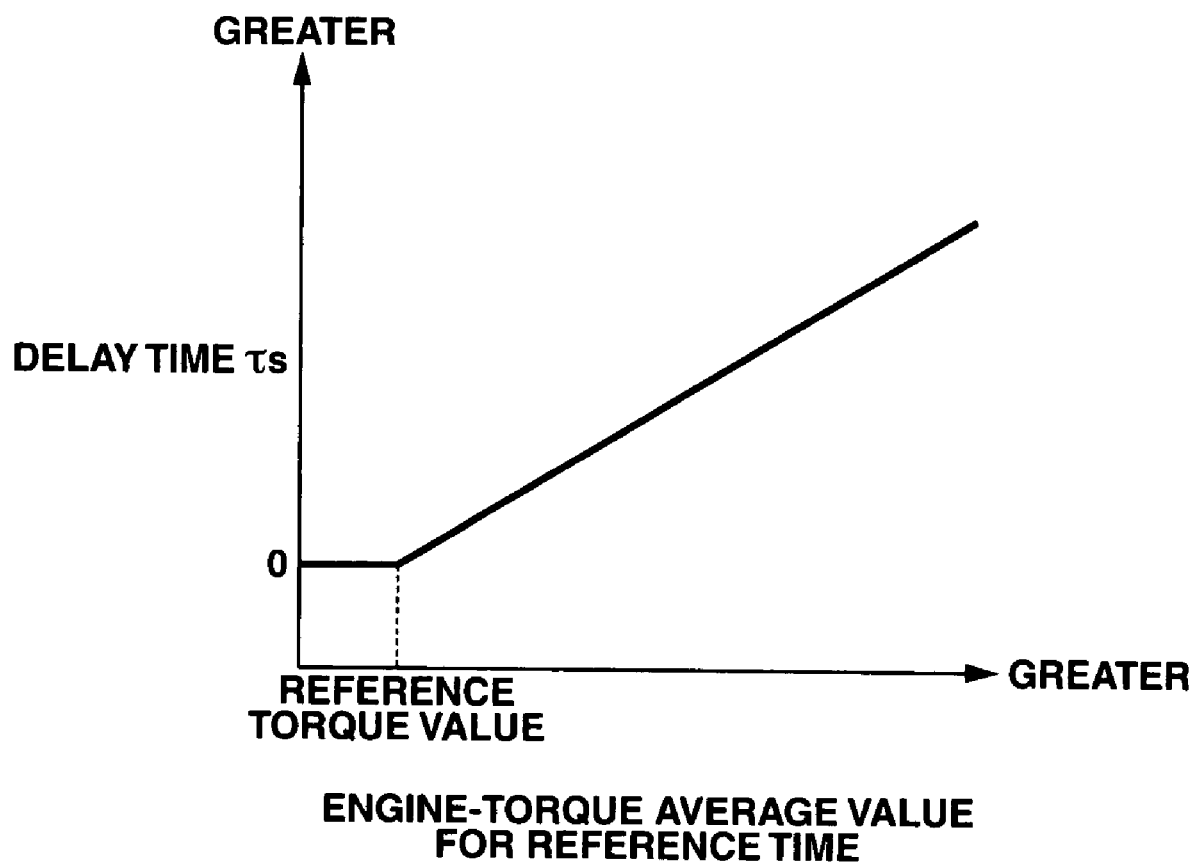

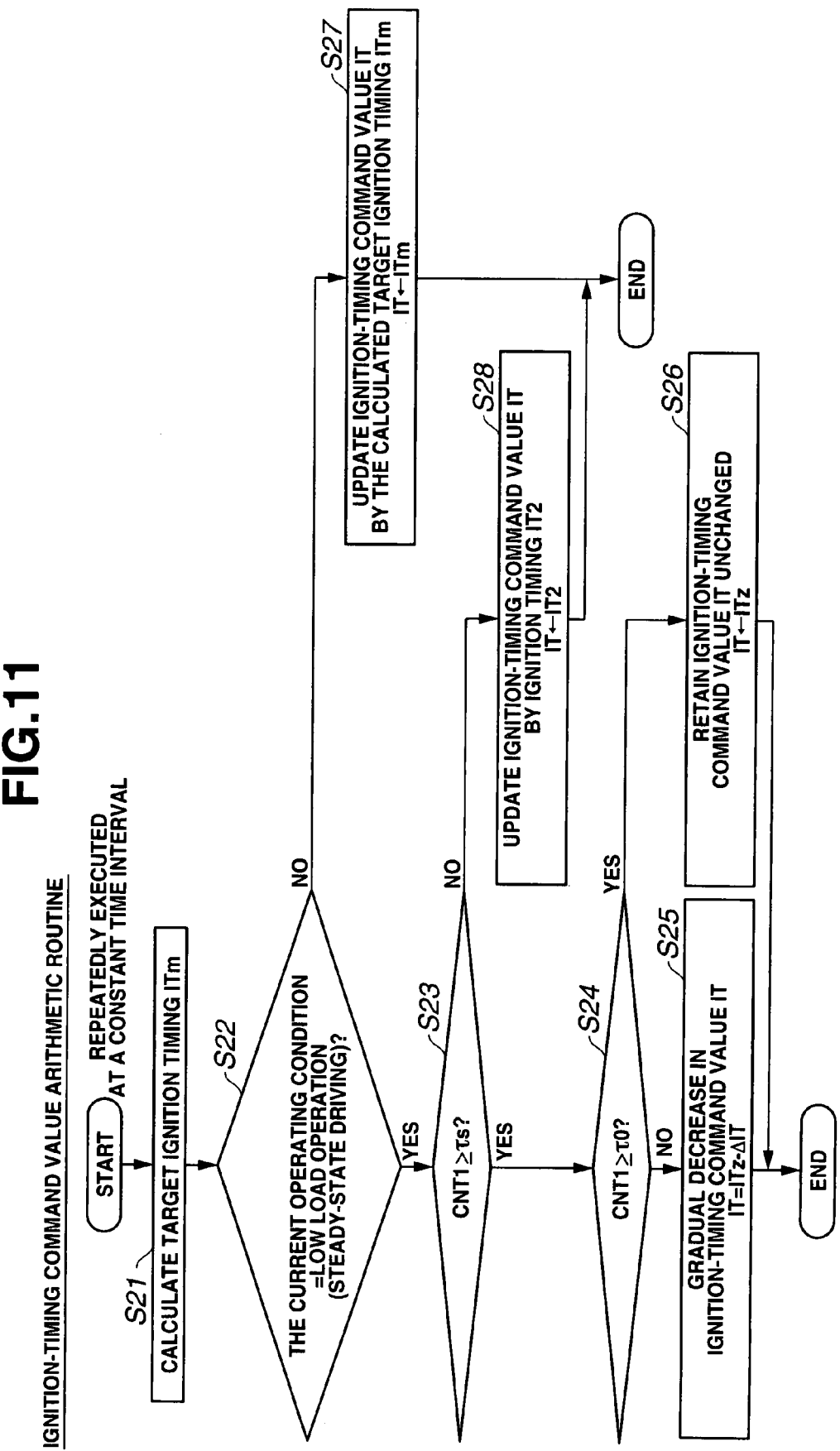

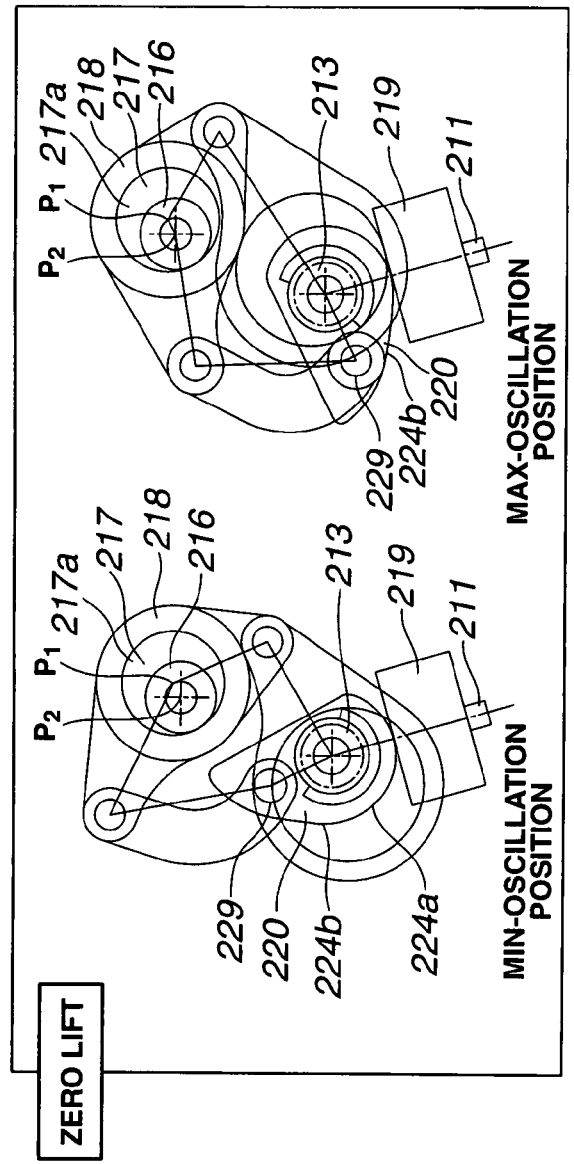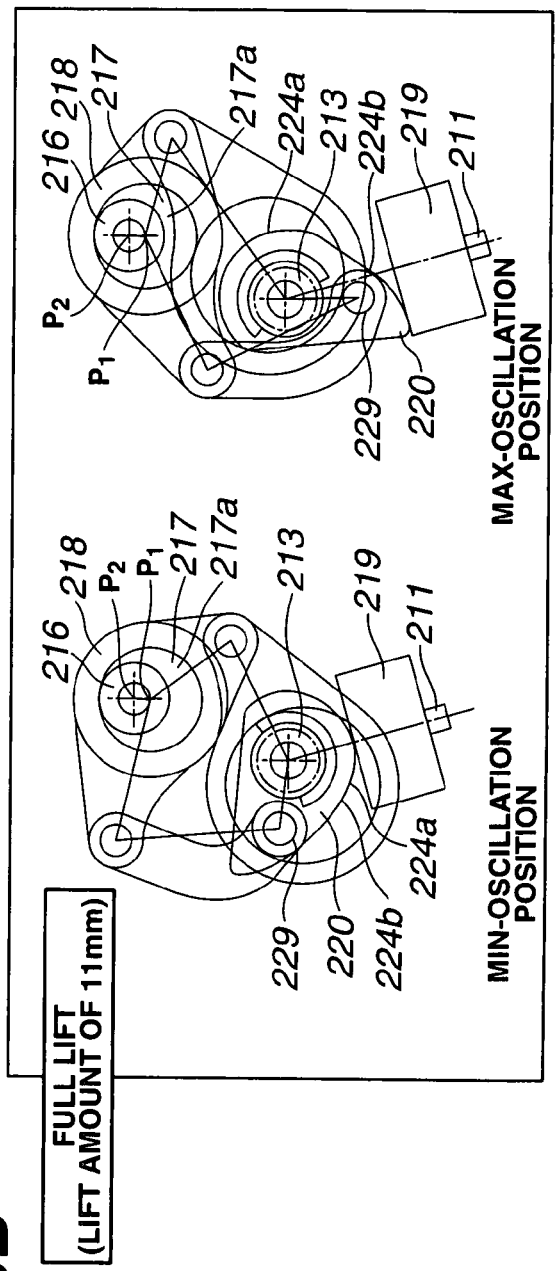

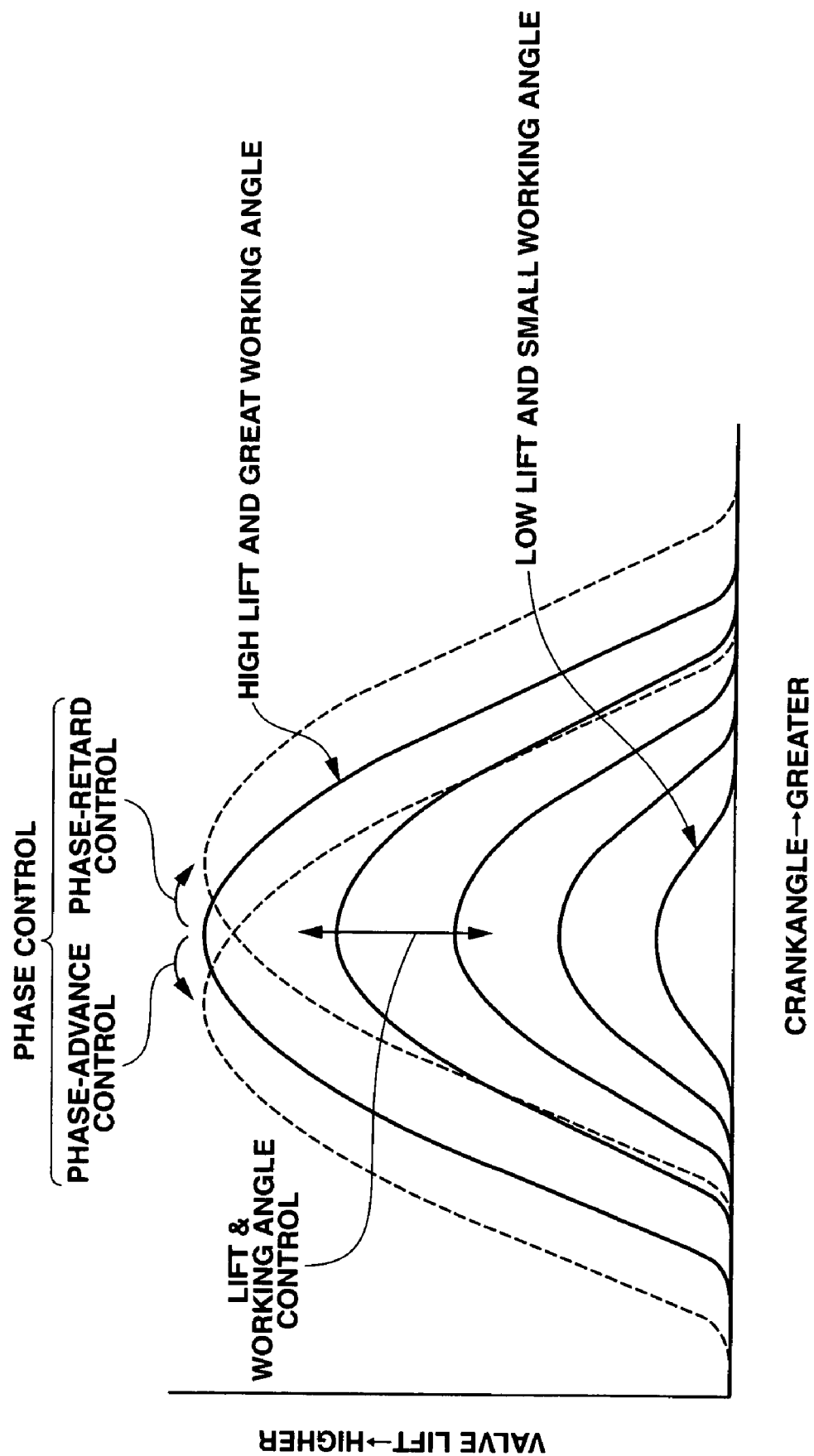

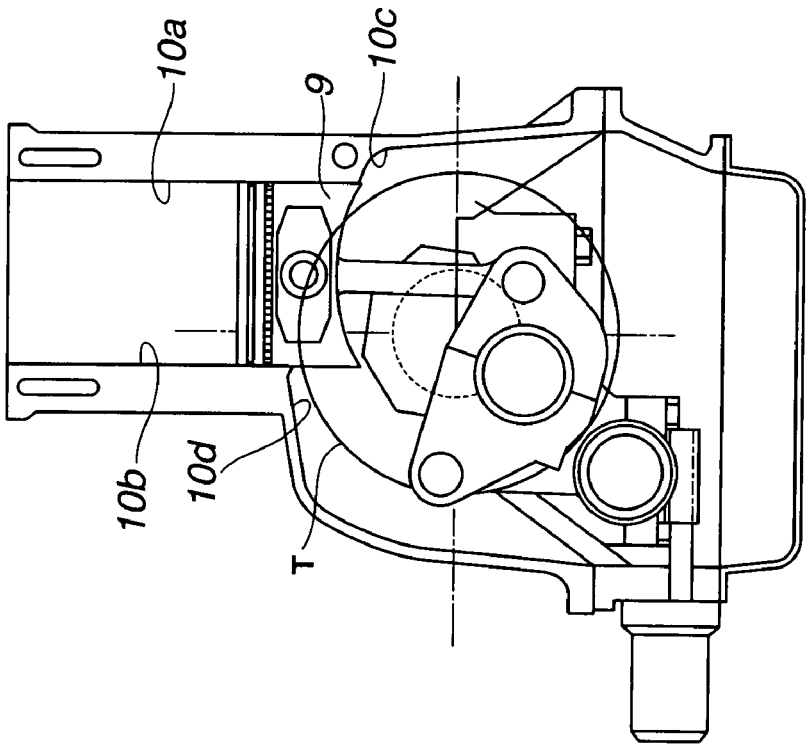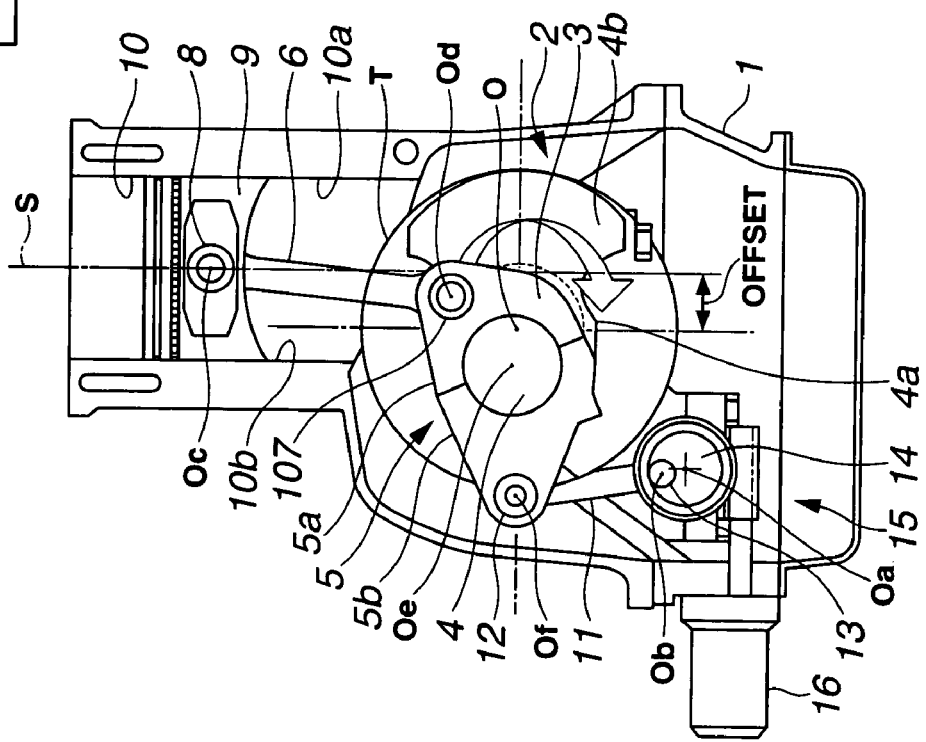

FIG.40
FUNCTION OF MULTI-LINK PISTON CRANK MECHANISM
PISTON STROKE CHARACTERISTIC CLOSE TO SIMPLE HARMONIC MOTION 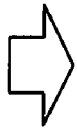 -30% REDUCTION OF MAX. INERTIA FORCE OF RECIPROCATING PISTON PARTS  NARROW PISTON-PIN BOSS WIDTH
UPPER-LINK UPRIGHT ATTITUDE KEEP NEAR MAX. IN-CYLINDER PRESSURE Pmax  STABLE PISTON DYNAMIC BEHAVIOR PISTON-SKIRT THRUST LOAD REDUCTION 
SUPER-LOW PISTON

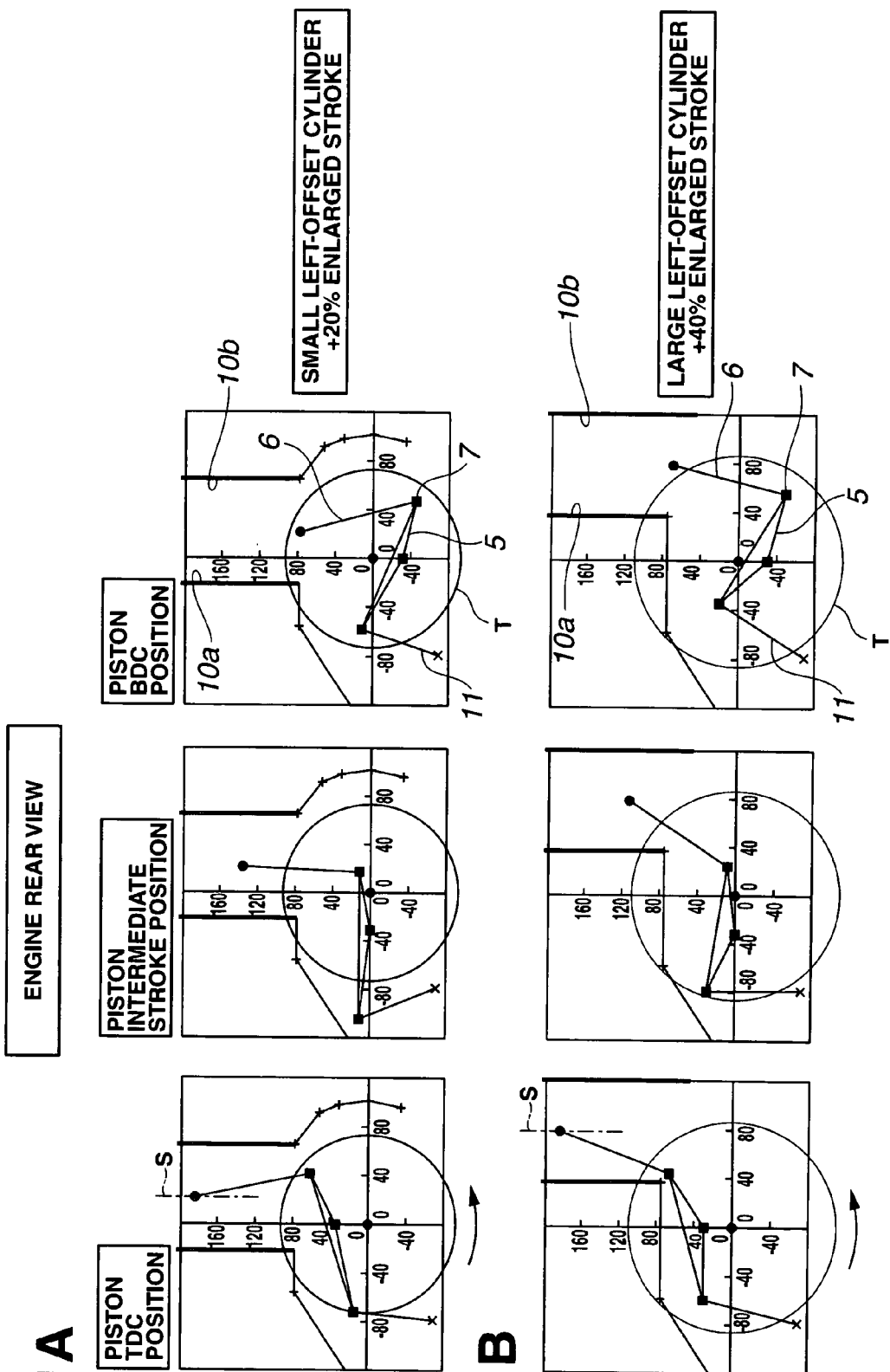

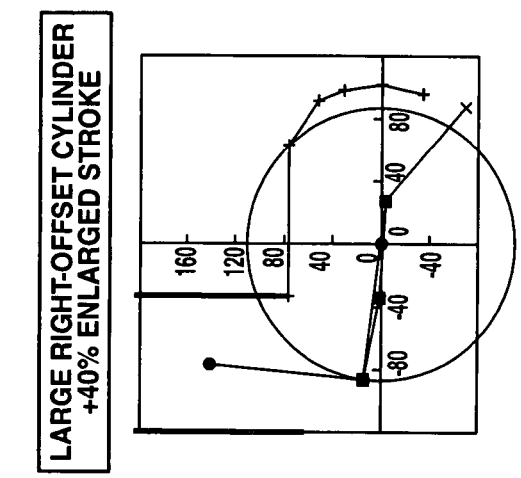
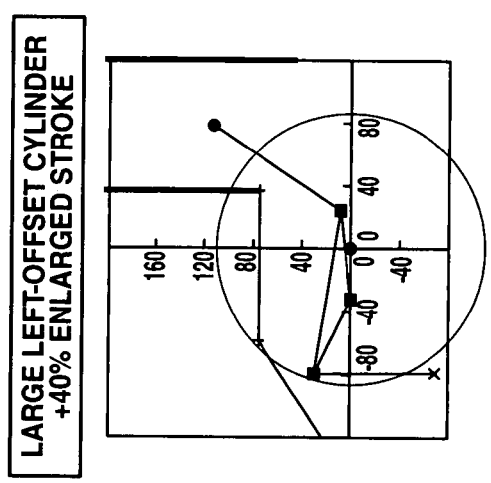
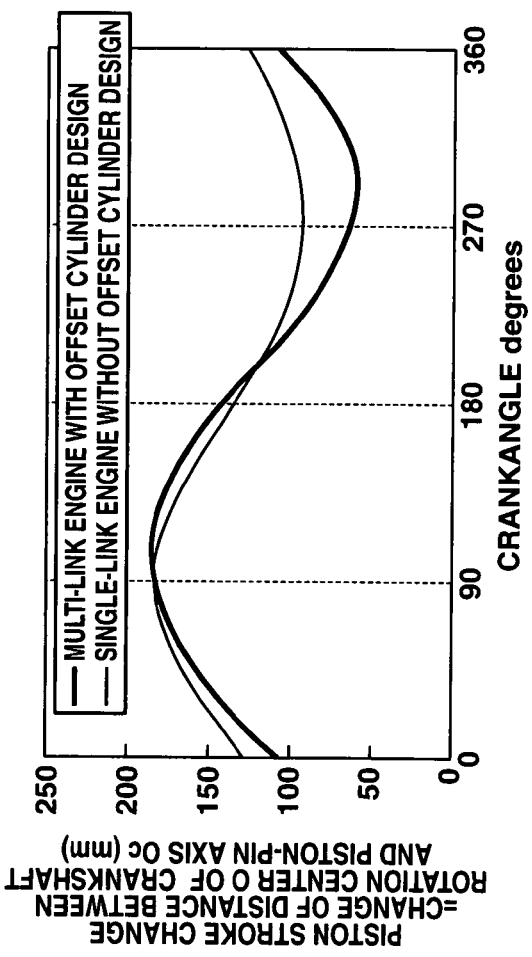
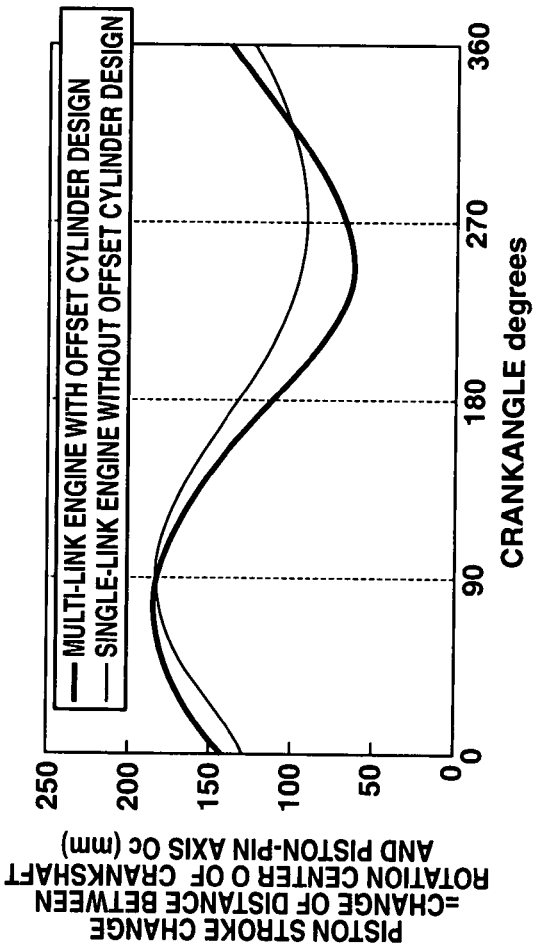
FIG.44A
FIG.44B

FIG.45

| ITEM | Mg | Al |
|---|---|---|
| SPECIFIC GRAVITY | 1.74 | 2.7 |
| THERMAL EXPANSION COEFFICIENT×$10^{-6}$ | 27.1 | 23.6 |
| HEAT CONDUCTIVITY cal/cm s °C | 0.367 | 0.53 |
| YOUNG'S MODULUS×$10^3$ kg/mm$^2$ | 4.5 | 6.3 |
| MELTING POINT °C | 650 | 660 |

ENGINE FRONT VIEW

INTERNAL COMBUSTION ENGINE

TECHNICAL FIELD

The present invention relates to an internal combustion engine having reciprocating pistons, and specifically to an improved technology to reduce a cooling loss of a reciprocating internal combustion engine.

BACKGROUND ART

In recent years, there have been proposed and developed various heat-insulated internal combustion engines in which thermal insulation materials such as ceramic materials are affixed to a part or almost the entire wall surface of a combustion chamber. The thermal insulation material contributes to a reduction in cooling loss, thus enhancing a thermal efficiency of the engine at low load operation. One such heat-insulated engine has been disclosed in Japanese document "Proceedings of 13th Internal Combustion Engine Symposium (International), (1996), 68, pp. 399-404, titled "Combustion Chamber and Performance of a Low Heat Rejection Engine" published Jun. 17, 1996 and written by six authors Takatoshi SUGANO, Shigeo SEKIYAMA, Hiroshi SASAKI, Akira HIGASHINO, Hiroshi MATSUOKA, and Hideo KAWAMURA.

SUMMARY OF THE INVENTION

However, the previously-noted ceramic heat-insulating material has a property that most of heat absorbed by the ceramic insulation material itself is transferred to air drawn into a combustion chamber at high load operation (at high engine temperatures). The use of ceramic materials results in a temperature rise of the intake air drawn into the combustion chamber. For instance, the intake-air temperature rises up to 200° C. or more at the end of compression stroke. Such an excessive intake-air temperature rise leads to the problem of undesirable engine knock occurring at high load operation on gasoline engines. To avoid such an undesirable knocking condition at high load operation, in fixed-compression-ratio engines, a design compression ratio is generally fixed to a relatively lower value in comparison with a compression ratio suited to low engine load. This means a deterioration in fuel economy at low engine load. Additionally, during high load operation, an adequate charging efficiency of intake air must be fully taken into account. When the intake-air temperature undesirably rises, the intake-air density is lowered, thus causing a decrease in the quantity of air drawn into the combustion chamber, in other words, a reduction in engine torque output at high engine load. That is, avoiding engine knock by reducing the compression ratio usually requires a trade-off in engine torque.

Accordingly, it is an object of the invention to provide an engine, capable of reconciling an enhancement of thermal efficiency during low load operation and an avoidance of knocking during high load operation, by reducing a cooling loss under a low thermal load condition (i.e., at low engine load operation) by combining an idea of heat-insulated engines with variable-compression-ratio engines.

In order to accomplish the aforementioned and other objects of the present invention, an engine comprises a cylinder block having a cylinder, a reciprocating piston movable through a stroke in the cylinder, a variable compression ratio mechanism configured to be linked to the piston for variably adjusting a geometrical compression ratio of the engine by varying at least a top dead center position of the piston responsively to a controlled variable, an engine-and-vehicle sensor provided for detecting an engine operating condition, and a controller configured to be electronically connected to at least the variable compression ratio mechanism and the sensor for controlling the variable compression ratio mechanism by changing the controlled variable depending on the engine operating condition, wherein a part of a wall surface of a combustion chamber, defined between the piston and the cylinder, is formed of a non-metallic material having a higher heat-insulating and heat-reserving property as compared to a base structural material of each of the combustion chamber and the piston.

The other objects and features of this invention will become understood from the following description with reference to the accompanying drawings.

BRIEF DESCRIPTION OF THE DRAWINGS

FIG. 3A is a partial cross-sectional view illustrating a usual piston structure, whereas

FIG. 4A is a perspective view of the usual piston structure with the cylinder partially cut out, whereas

FIG. 10 is a characteristic diagram showing the relationship between a delay time τs and an engine-torque average value for a reference time t1-t2.

FIG. 11 is a flow chart illustrating an arithmetic routine used to determine an ignition-timing command value IT for an electronic ignition system of each of the engines of the first and second embodiments.

or less) and a high engine thermal load condition (e.g., wall temperatures Tw exceeding 150° C.), and used within an electronic control unit (ECU) incorporated in the engine of the third embodiment.

Figure 13A:
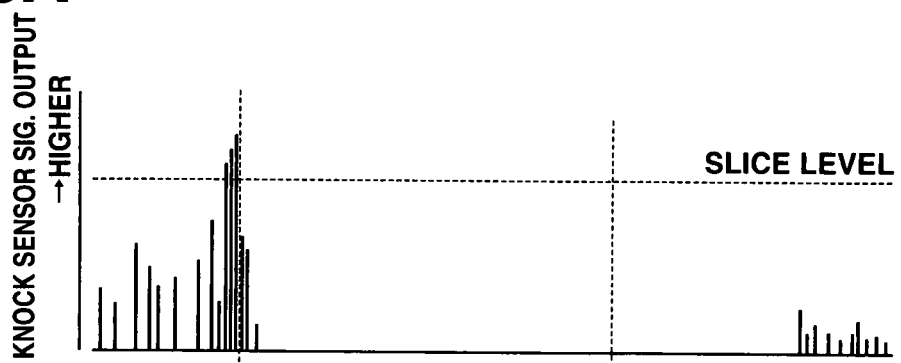
Figure 13B:
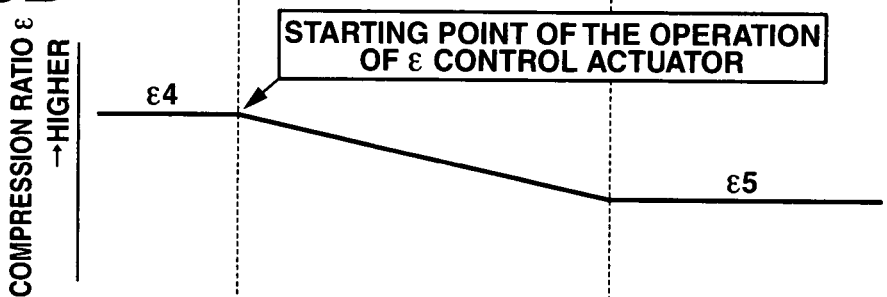
Figure 13C:
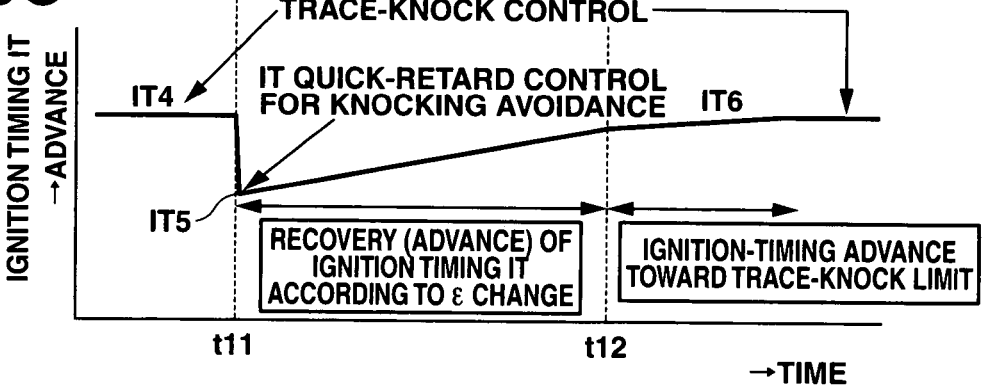

FIGS. 13A-13C are time charts, respectively illustrating a change in a knock sensor signal output, a change in target compression ratio ∈m, and a change in ignition timing IT during knock-avoidance control executed by the ECU of the engine of the third embodiment, and explaining a transient control characteristic when the knocking condition occurs under the high thermal load condition.

Figure 14:
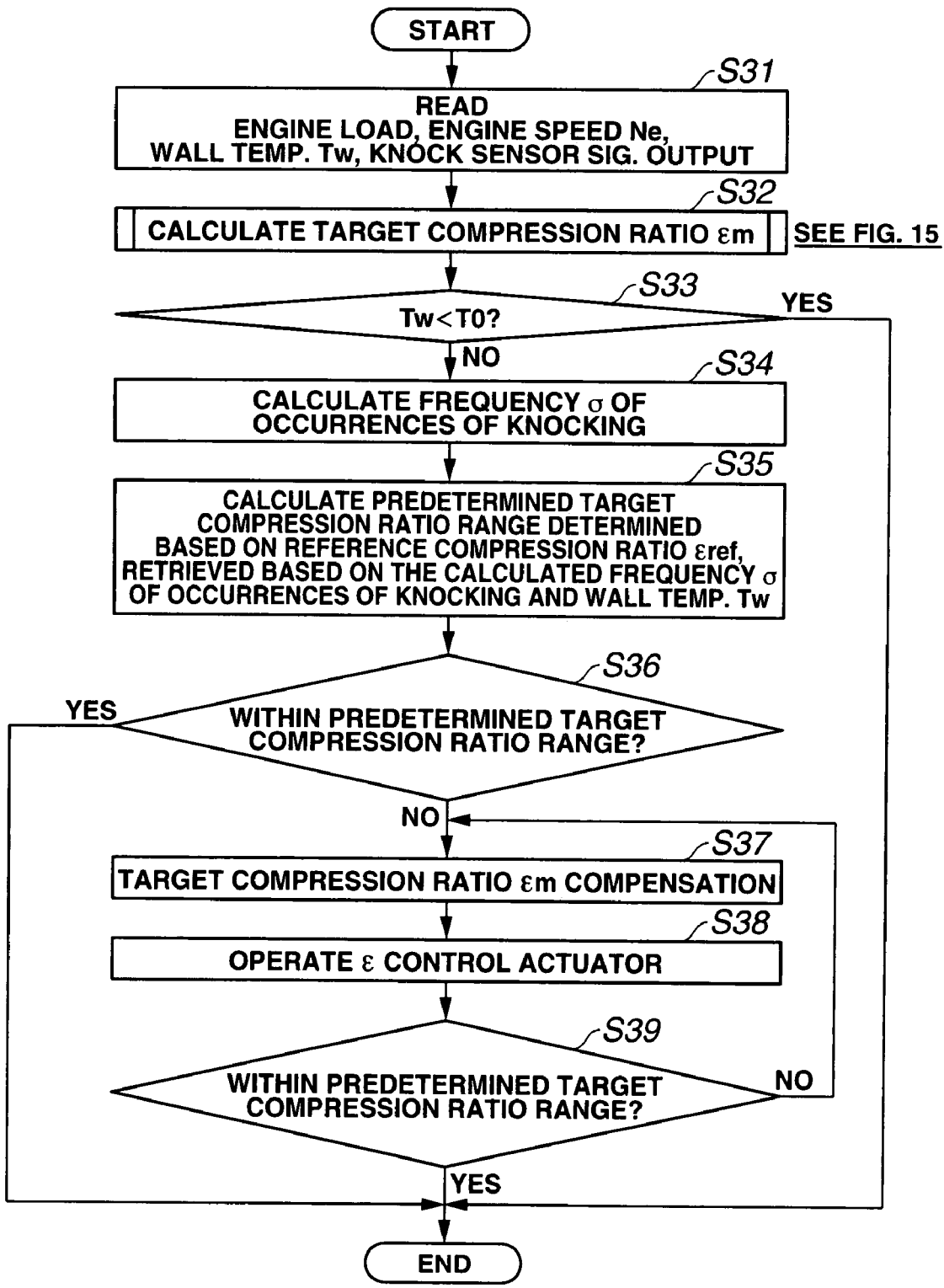

FIG. 14 is a flow chart illustrating a compression ratio control routine executed within the ECU of the engine of the third embodiment.

Figure 15:
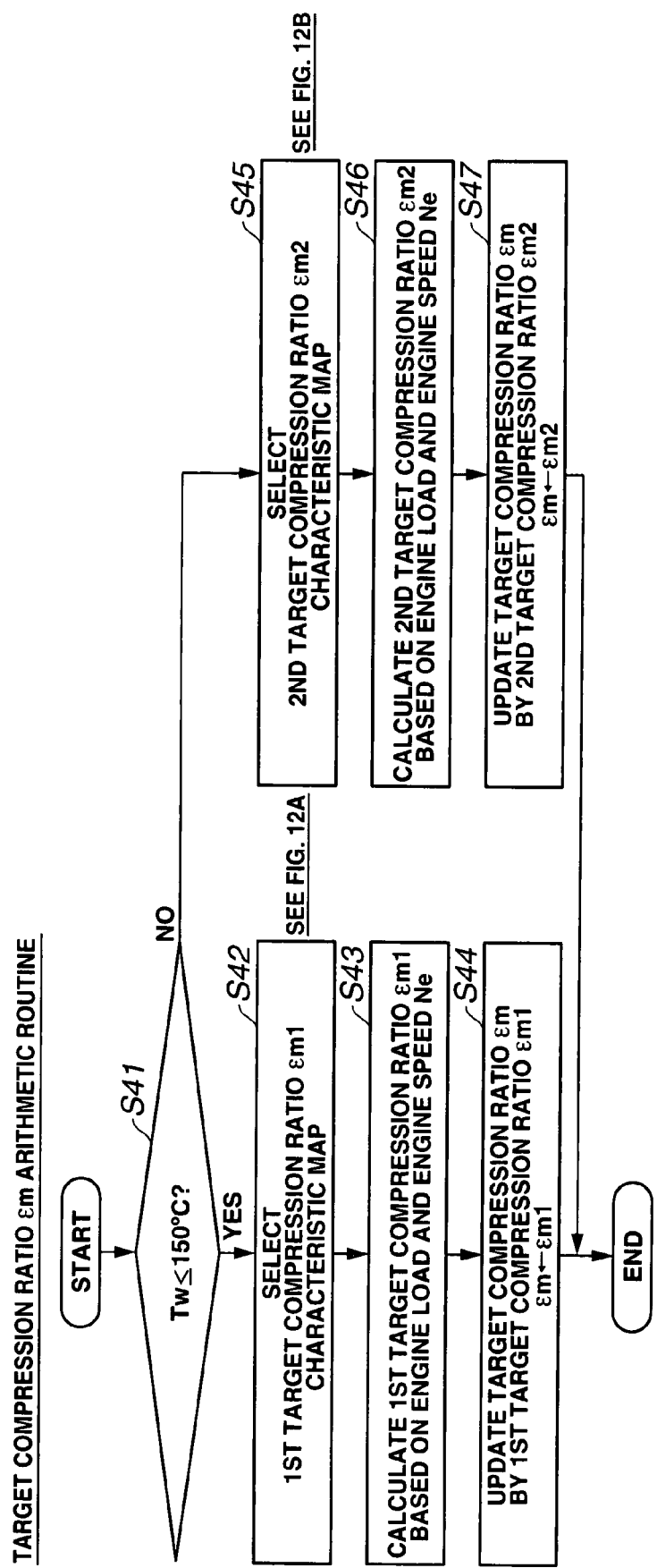

FIG. 15 is a flow chart illustrating an arithmetic routine used to determine target compression ratio ∈m.

Figure 16:
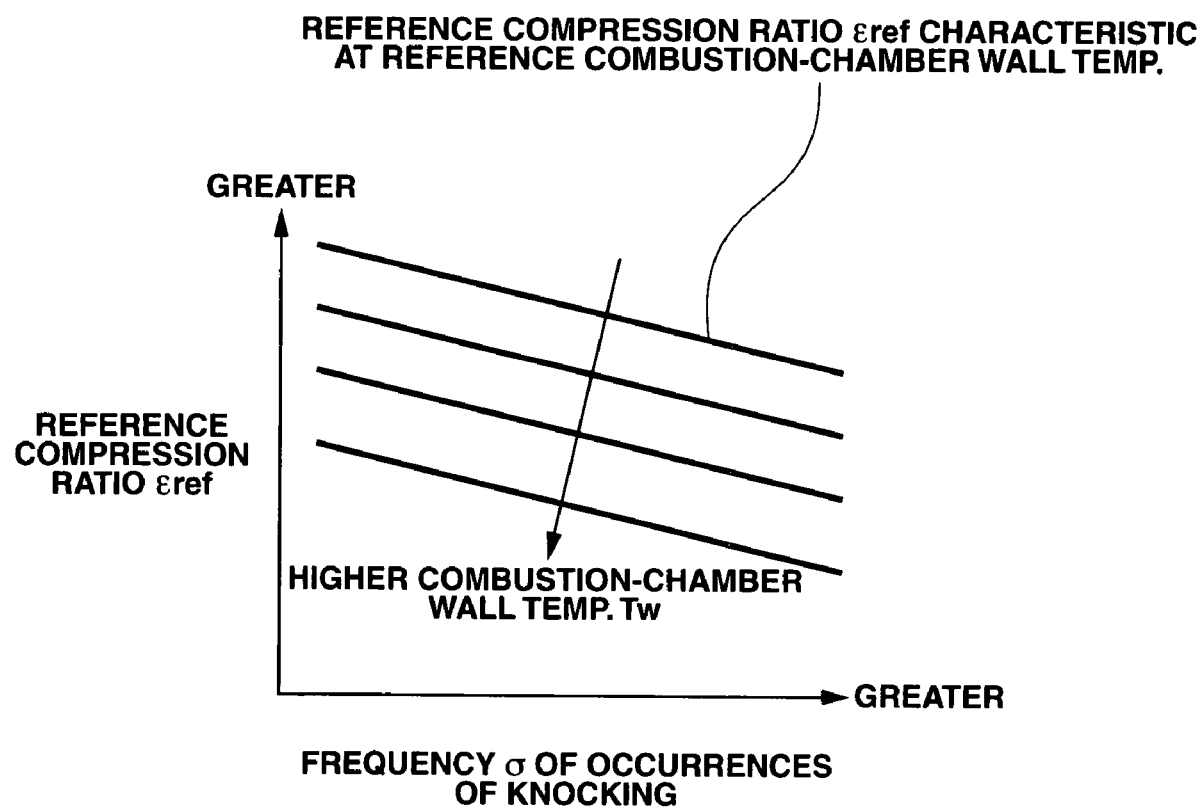

FIG. 16 is a reference compression ratio characteristic diagram showing the relationship among an engine-knock occurrence frequency σ, a reference compression ratio ∈ref, and combustion-chamber wall temperature Tw.

Figure 17:
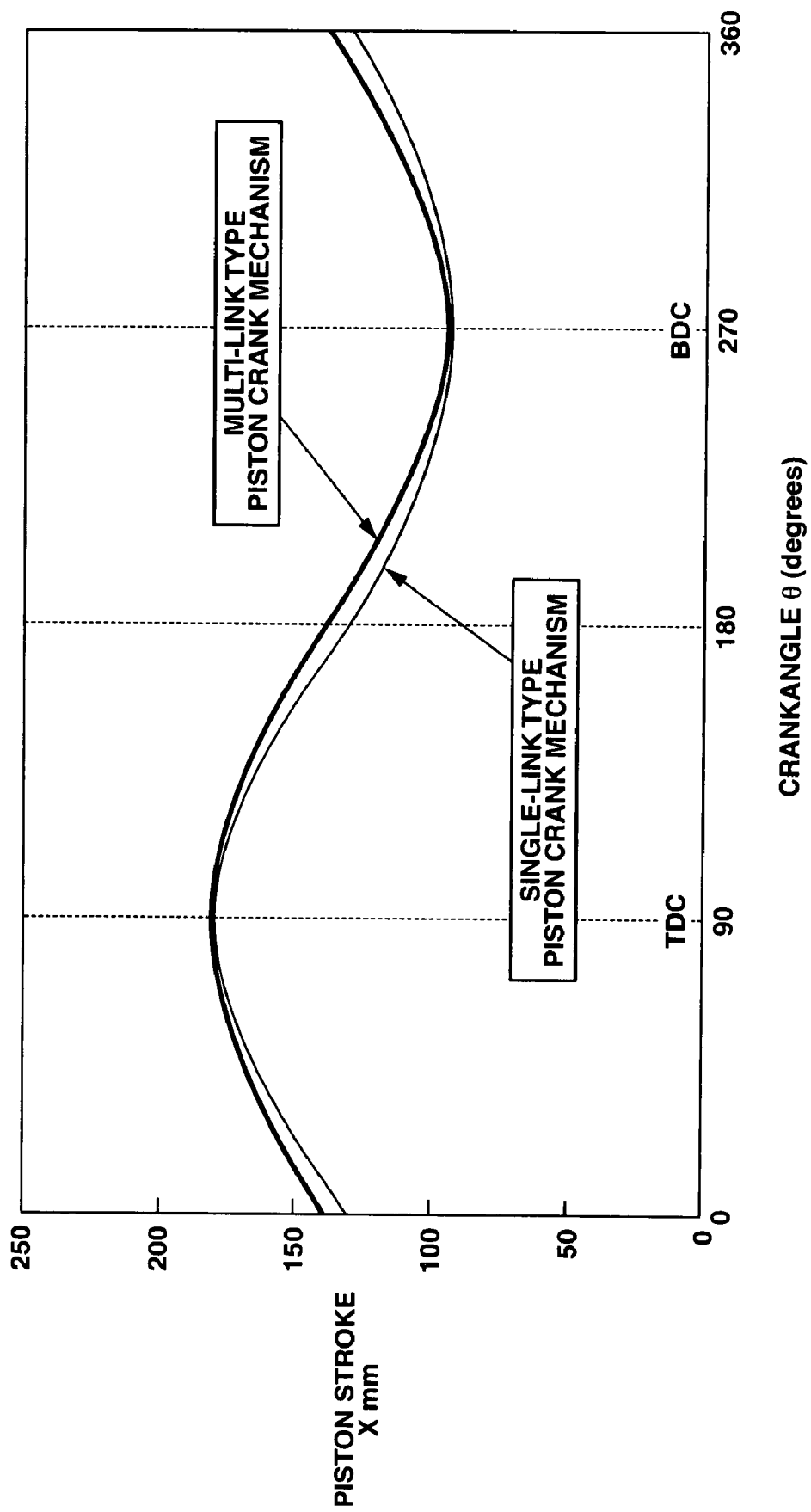

FIG. 17 is a comparative piston-stroke characteristic diagram illustrating two different piston stroke characteristics, namely a piston stroke characteristic obtained by a typical single-link reciprocating piston engine and a piston stroke characteristic obtained by a multi-link reciprocating piston engine.

Figure 18:
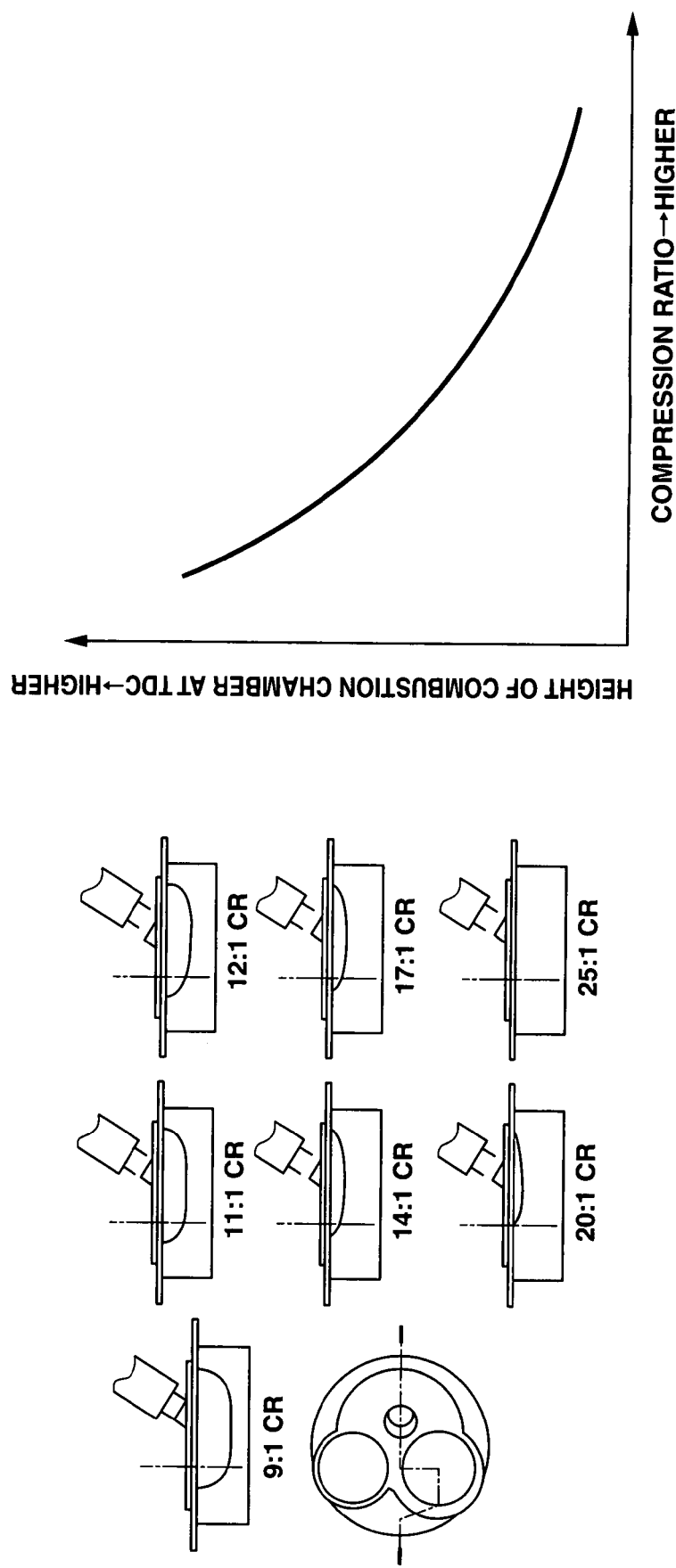

FIG. 18 is a characteristic diagram illustrating the relationship between a compression ratio and a height (or a degree of flatness) of the combustion chamber at TDC.

Figure 19:
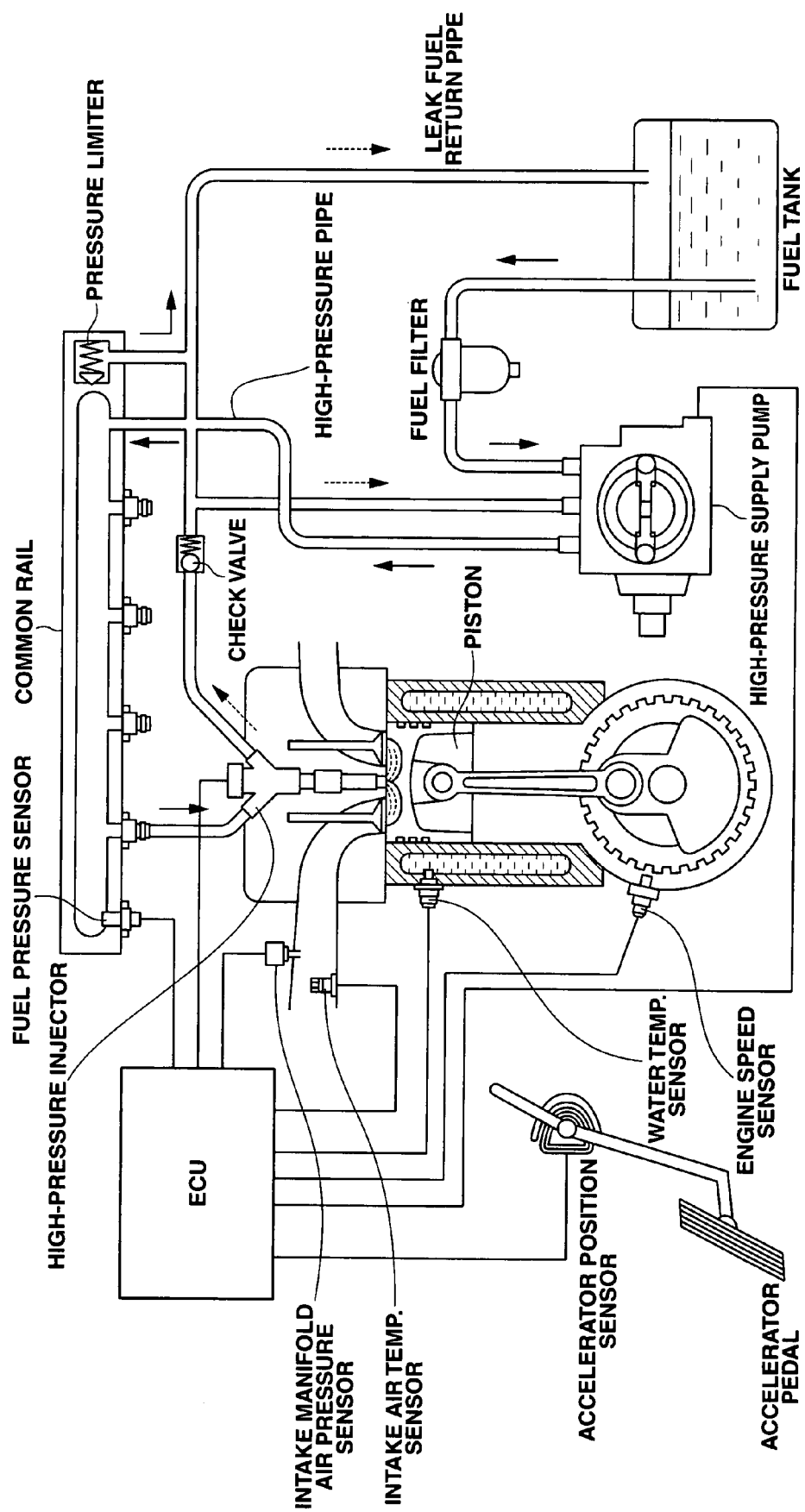

FIG. 19 is a schematic system diagram illustrating a common-rail fuel-injection system.

Figures 20A, 20B:
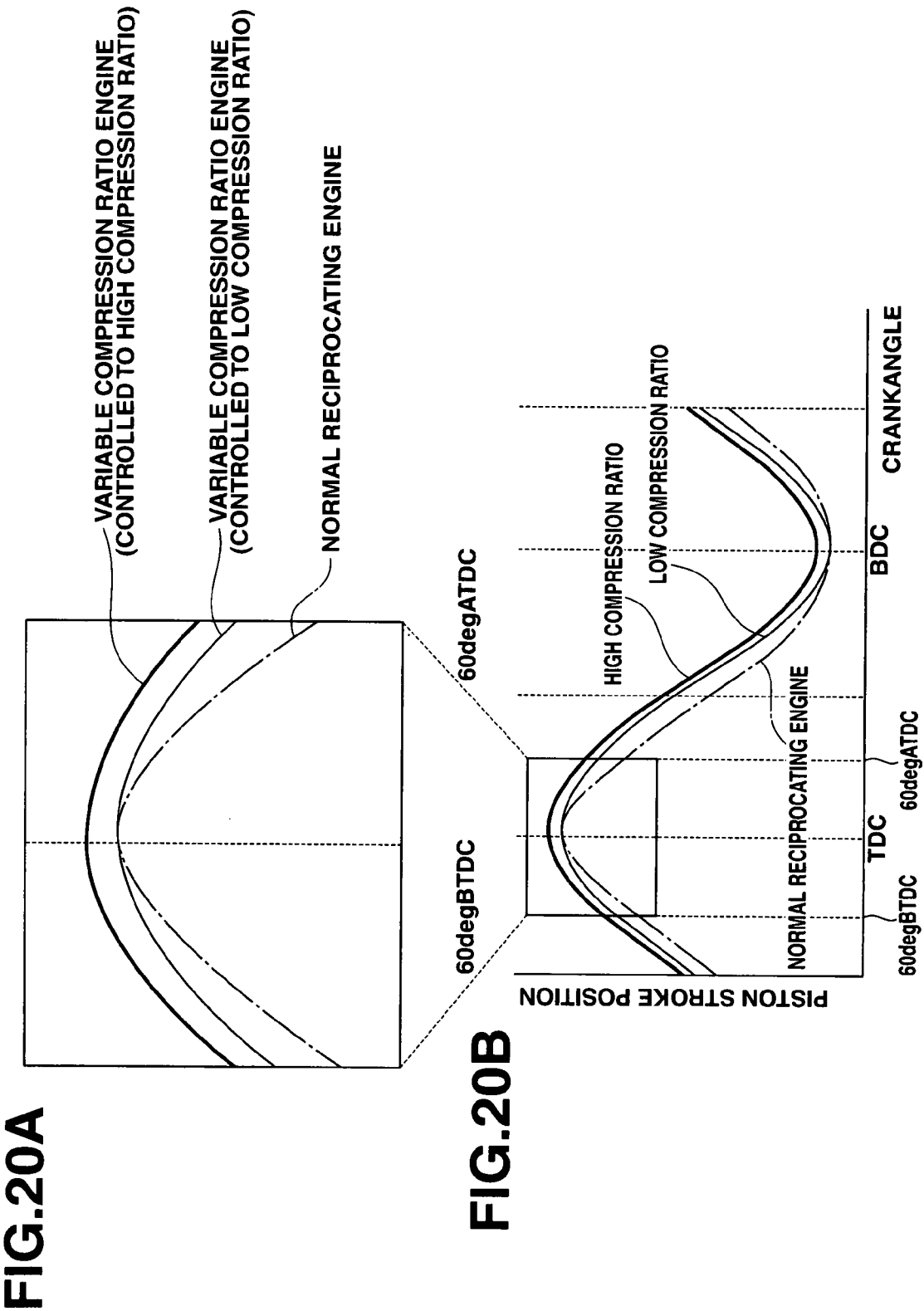

FIGS. 20A-20B are explanatory views illustrating piston stroke characteristics of the variable compression ratio reciprocating engine of the fourth embodiment.

Figure 21:
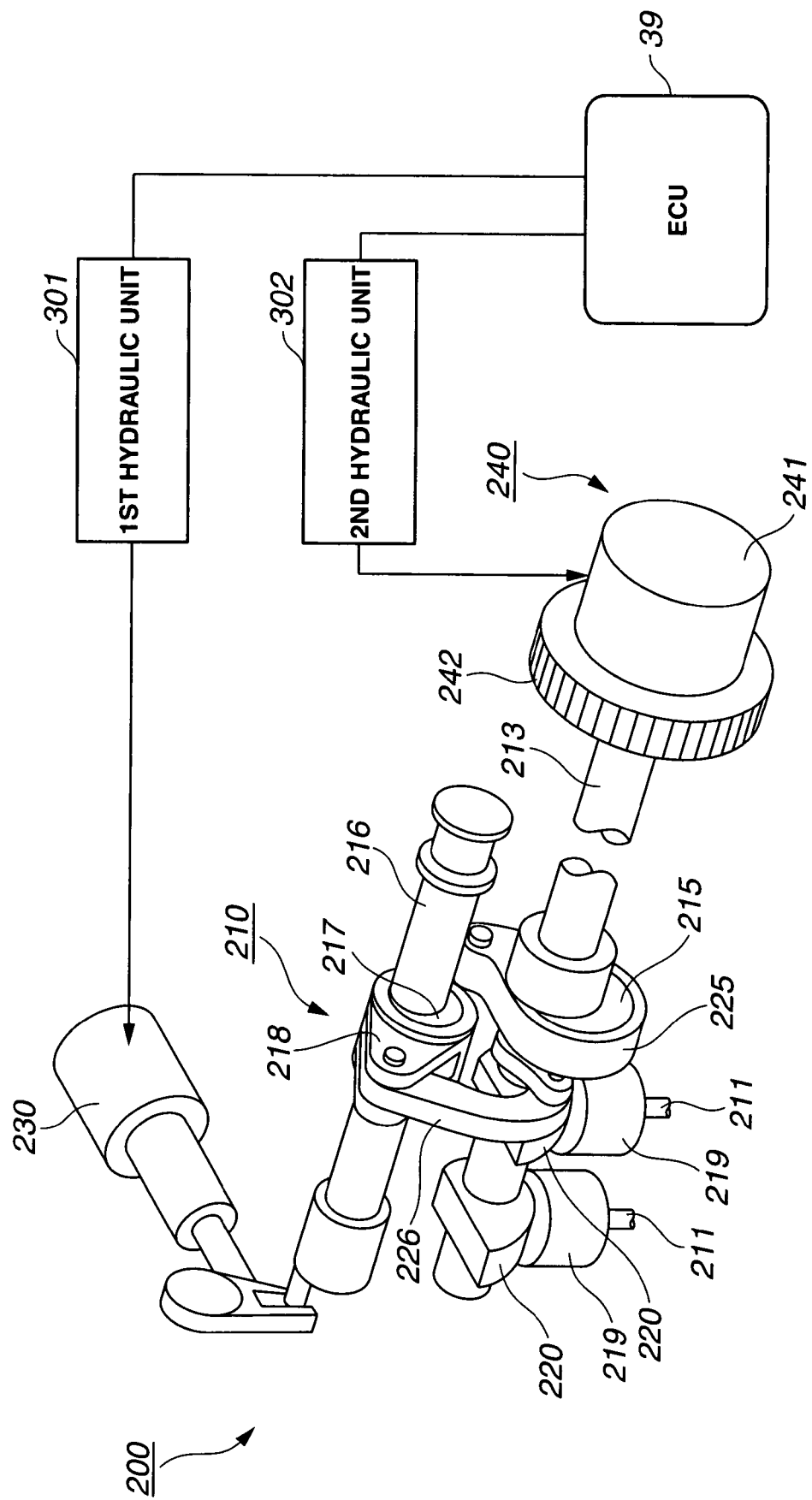

FIG. 21 is a perspective view illustrating a variable valve operating system, which is applied to an intake port valve.

Figure 22:
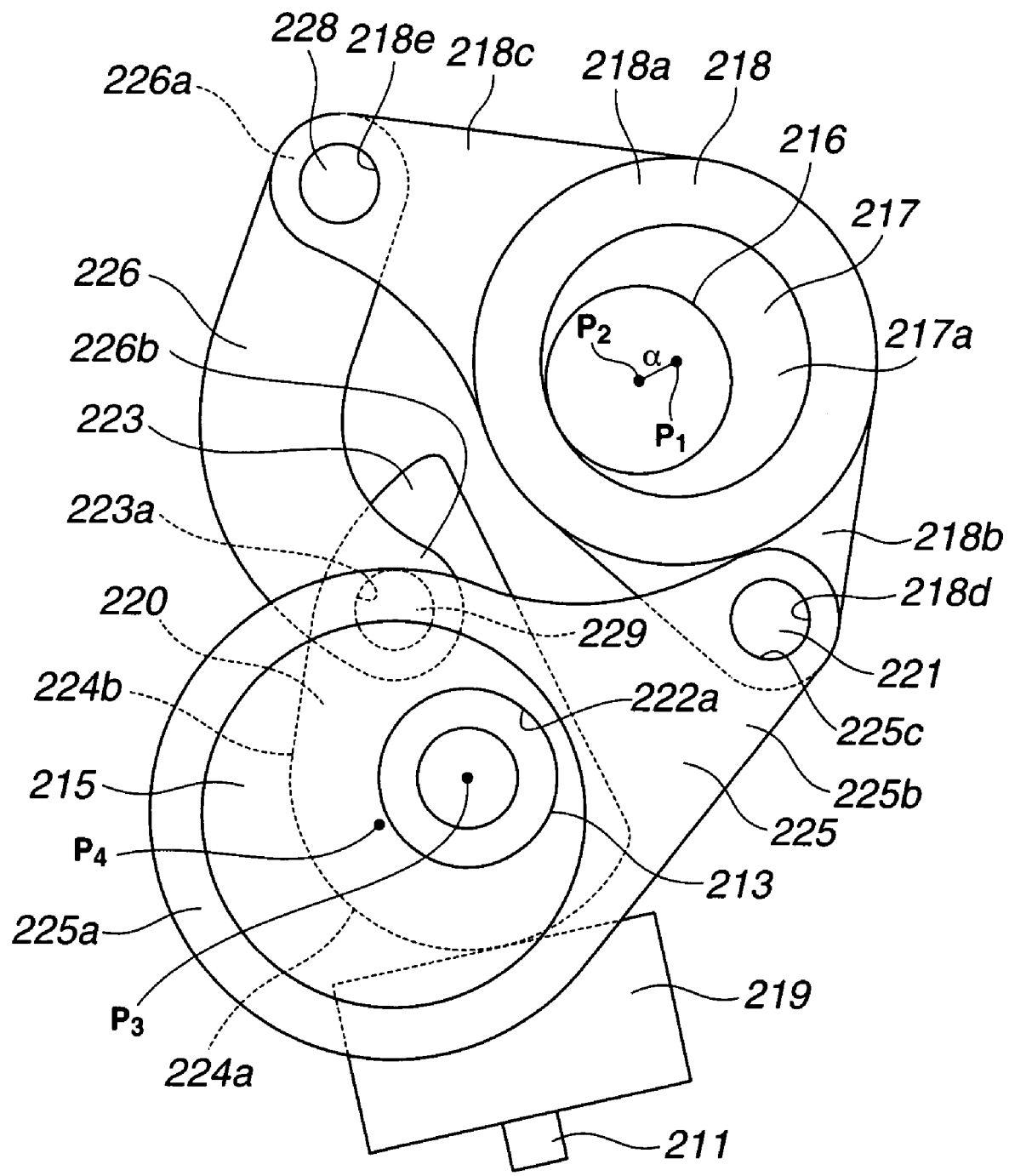

FIG. 22 is an enlarged view showing a continuously variable valve event and lift control (VEL) mechanism constructing a part of the variable valve operating system of FIG. 21.

FIGS. 23A-23B are explanatory views illustrating variations in a valve lift amount, produced by the VEL mechanism of FIG. 22.

FIG. 24 is an explanatory view showing the operation of the variable intake-valve operating system.

Figure 25:
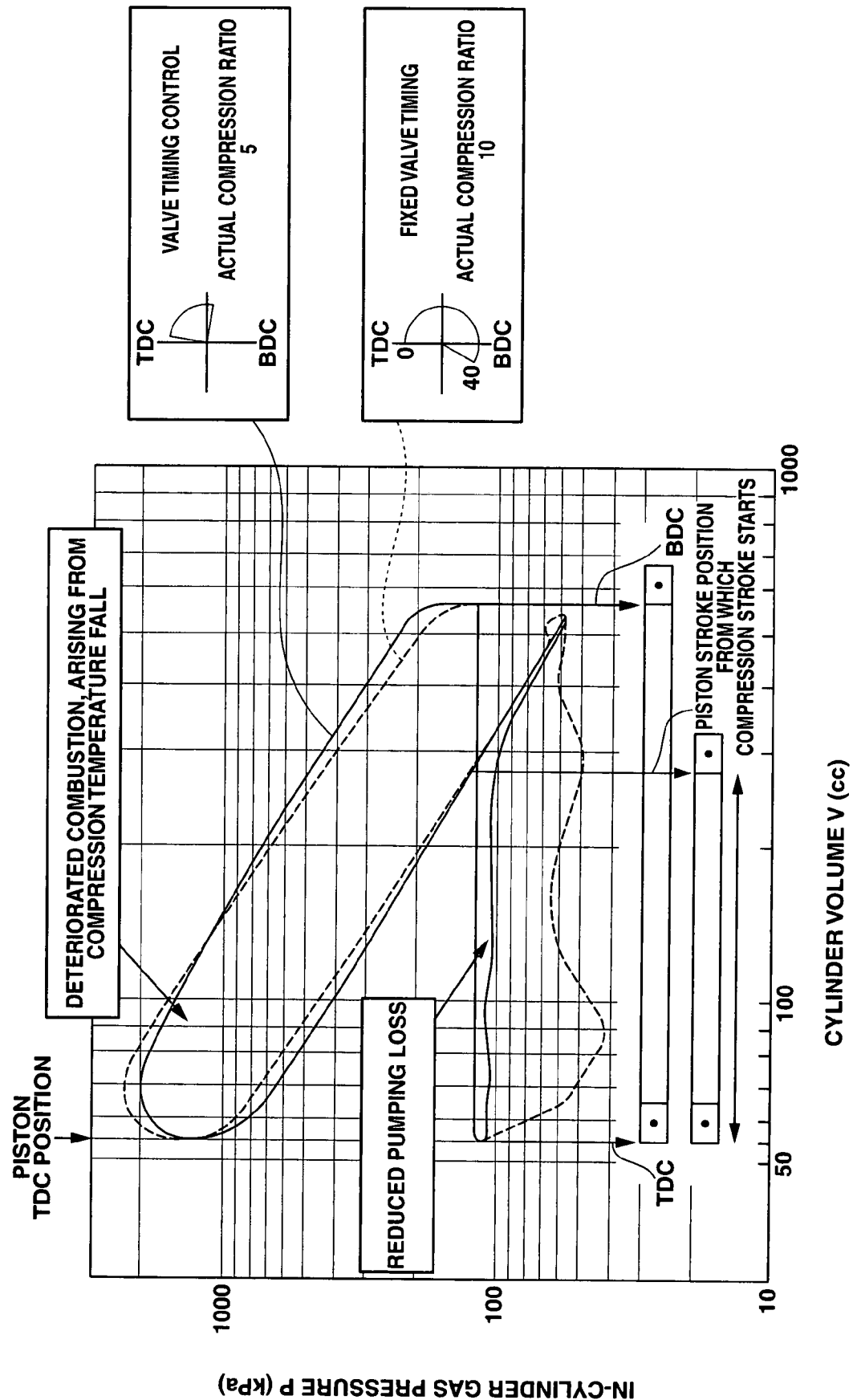

FIG. 25 is a comparative view showing two different pressure-volume diagrams, namely a PV diagram obtained by a Miller-cycle engine whose intake valve closure timing IVC is controlled to approximately 90 degrees of crankangle BBDC by means of the variable intake-valve operating system, and a PV diagram obtained by a reciprocating internal combustion engine whose IVC is fixed to approximately 40 degrees of crankangle ABDC (after bottom dead center).

Figure 26:
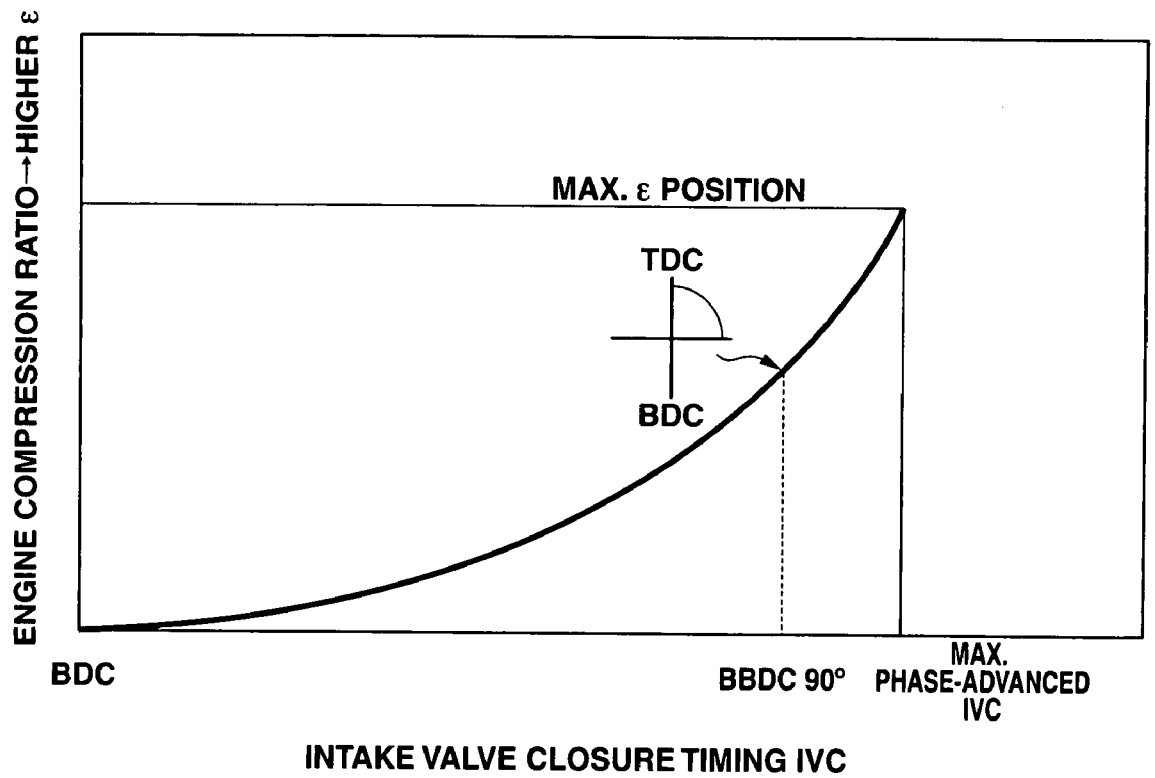

FIG. 26 is a characteristic diagram showing the relationship between intake valve closure timing IVC and engine compression ratio ∈.

Figure 27:
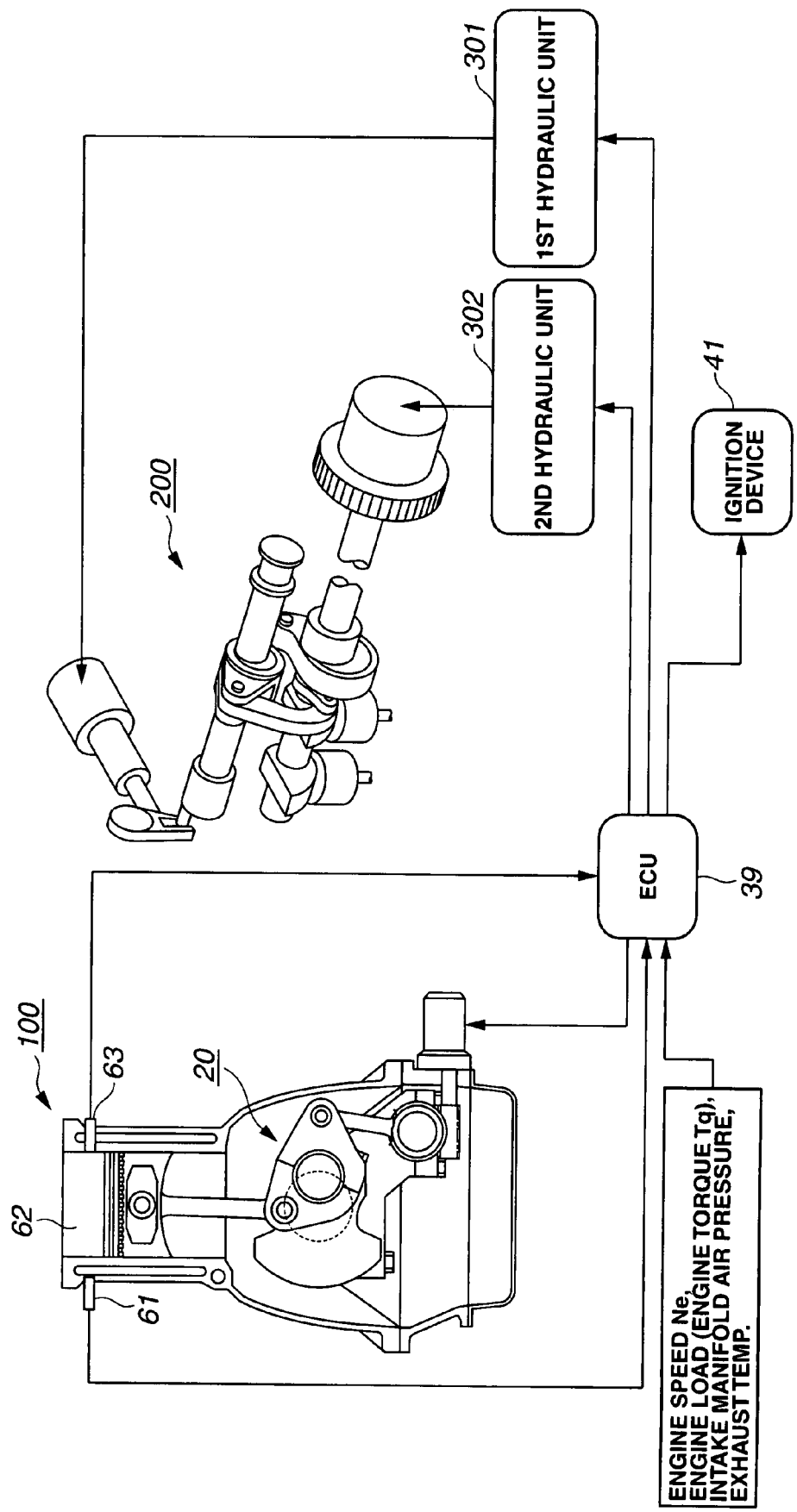

FIG. 27 is a schematic system diagram showing an engine control system configuration of the variable compression ratio reciprocating piston engine of the fourth embodiment.

Figure 28A:
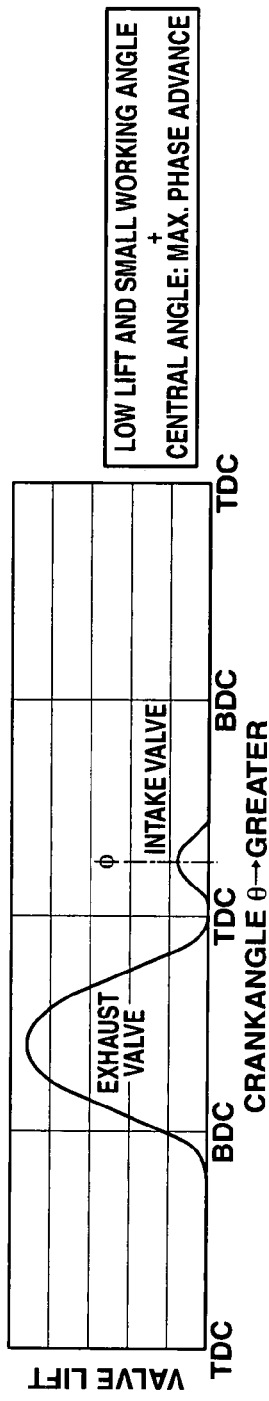
Figure 28B:
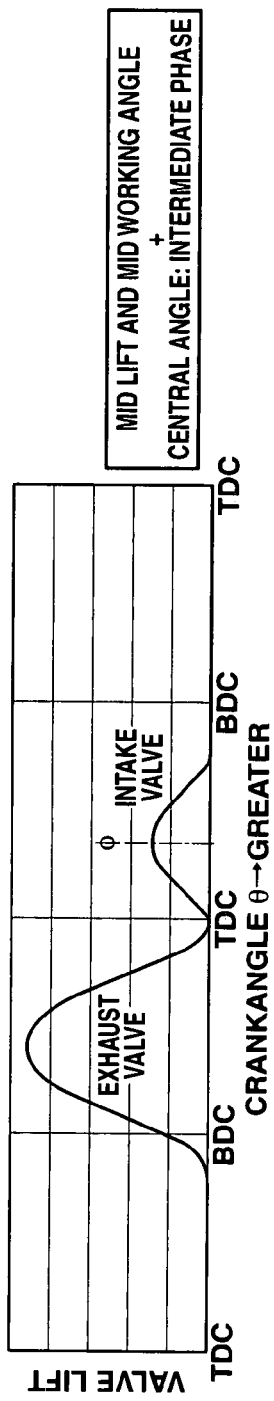
Figure 28C:
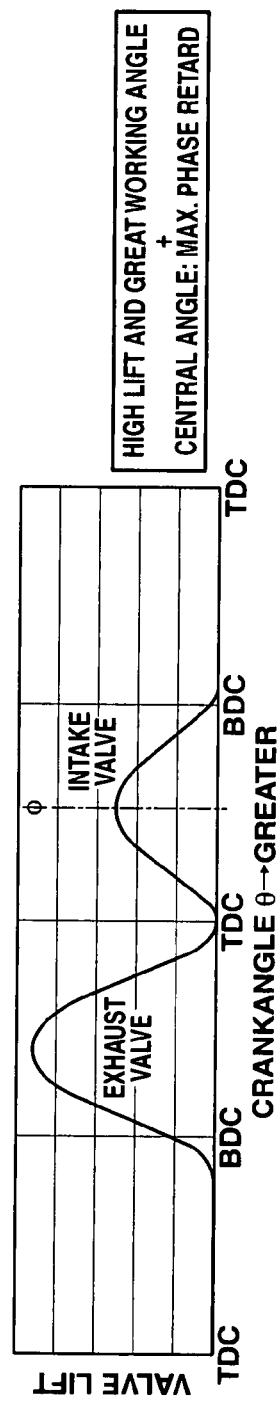

FIGS. 28A-28C are explanatory views showing VEL+ VTC control under three different engine operating conditions.

Figure 29:
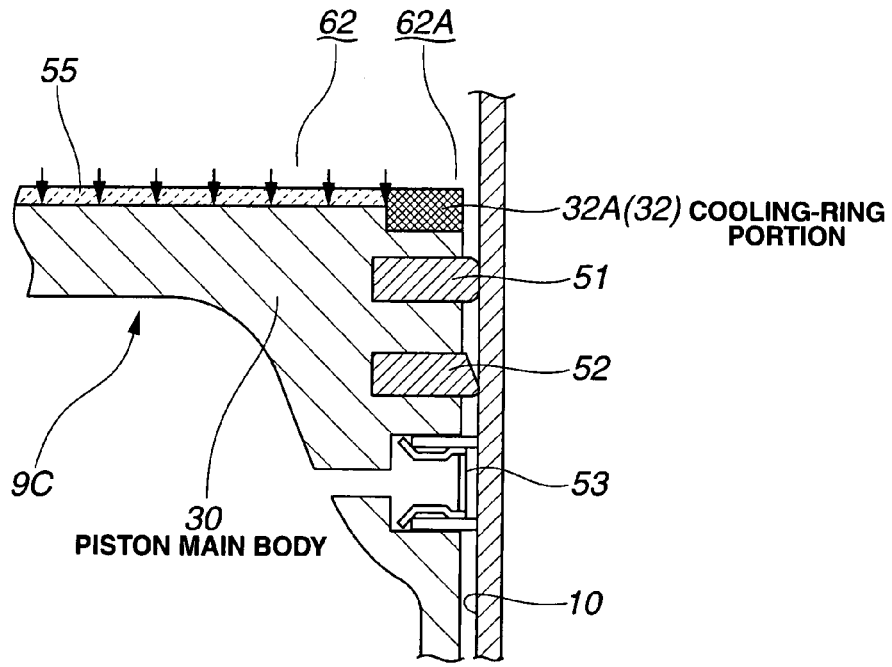

FIG. 29 is a longitudinal cross-sectional view illustrating a structure of a thermal-insulation plus cooling-ring piston of the reciprocating engine of the fifth embodiment.

Figure 30:
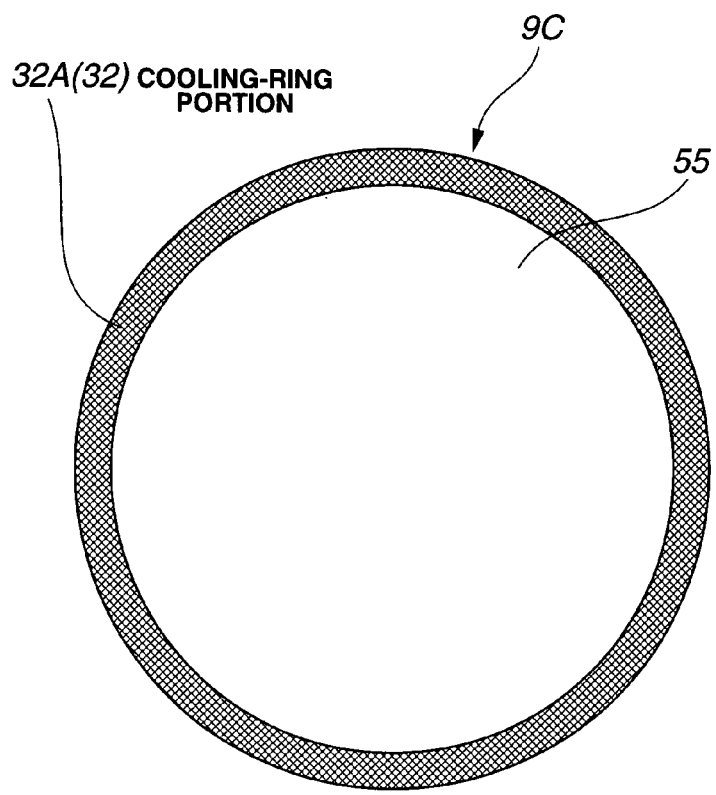

FIG. 30 is a top view of the piston of the reciprocating engine of the fifth embodiment.

Figure 31:
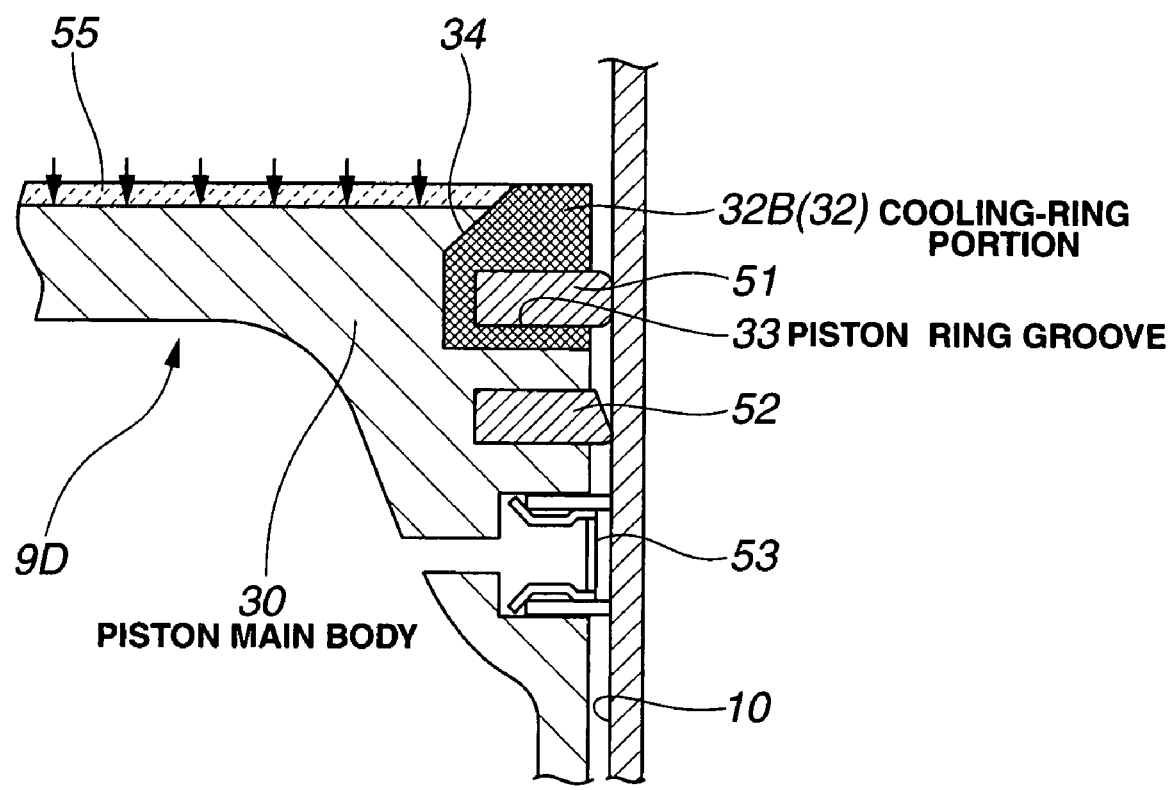

FIG. 31 is a longitudinal cross-sectional view illustrating a structure of a thermal-insulation plus cooling-ring piston of the reciprocating engine of the sixth embodiment.

Figure 32:
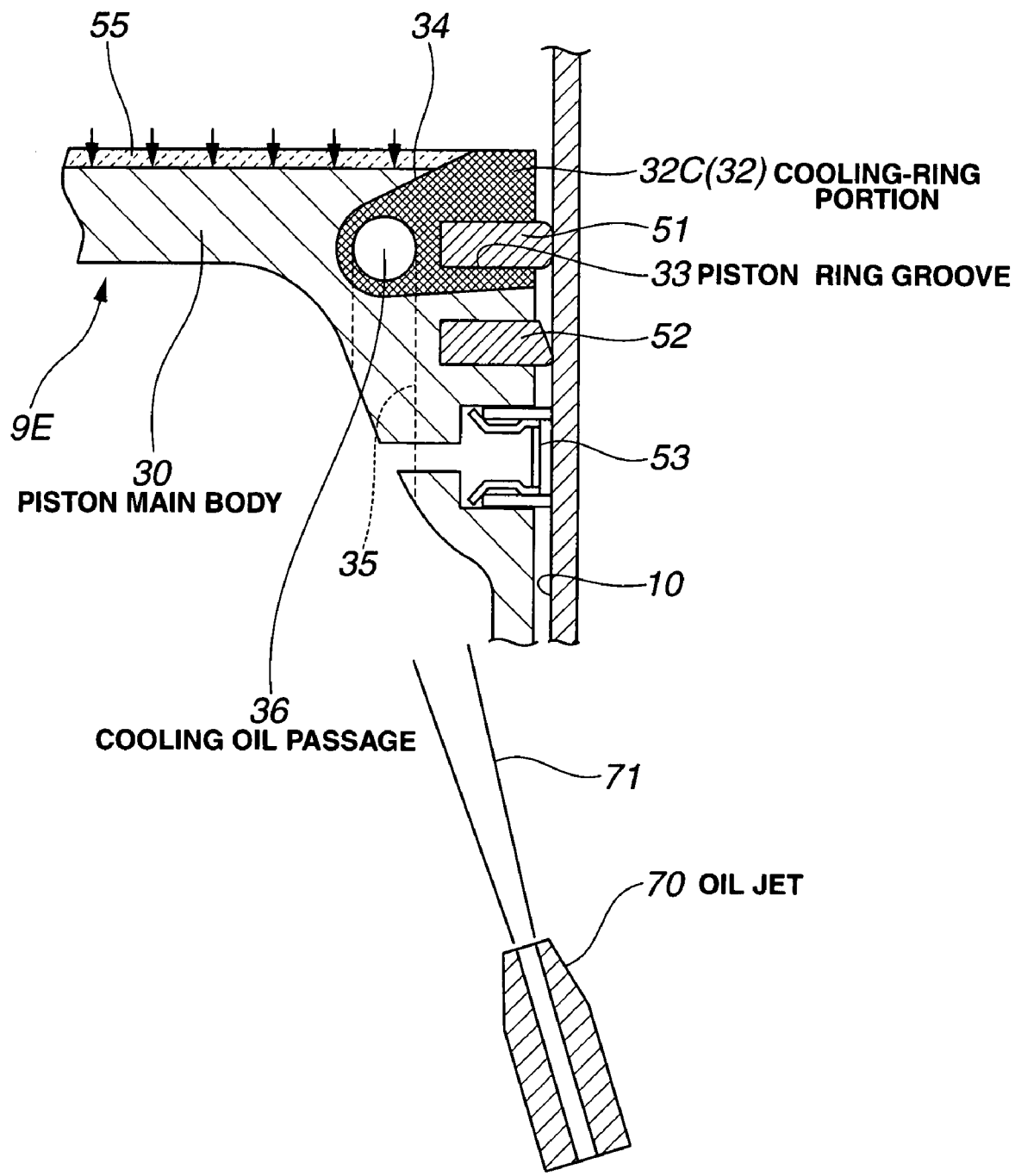

FIG. 32 is a longitudinal cross-sectional view illustrating a structure of a thermal-insulation plus cooling-ring plus cooling-oil passage equipped piston of the reciprocating engine of the seventh embodiment.

Figure 33:
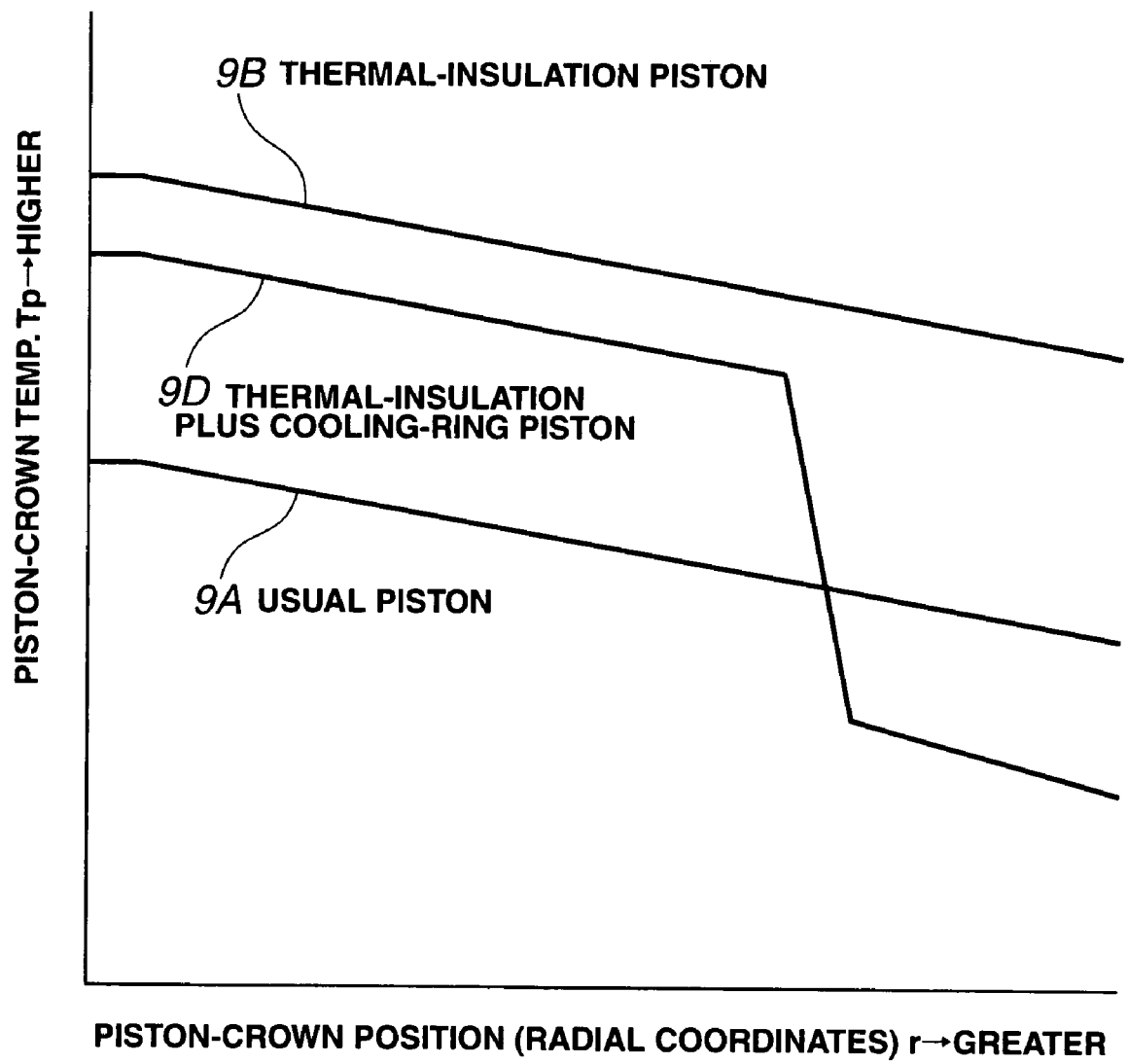

FIG. 33 is a characteristic diagram illustrating the relationship between a piston-crown temperature Tp and the coordinate (the radial position) of a point on a piston crown in a radial coordinate system.

Figure 34:
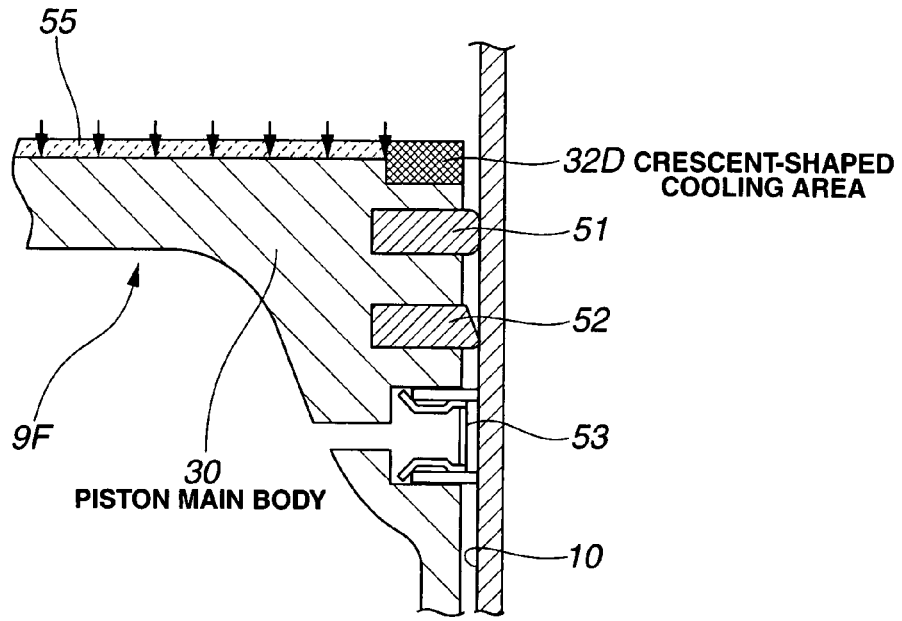

FIG. 34 is a longitudinal cross-sectional view illustrating a structure of a thermal-insulation plus partial cooling-area piston of the reciprocating engine of the eighth embodiment.

Figure 35:
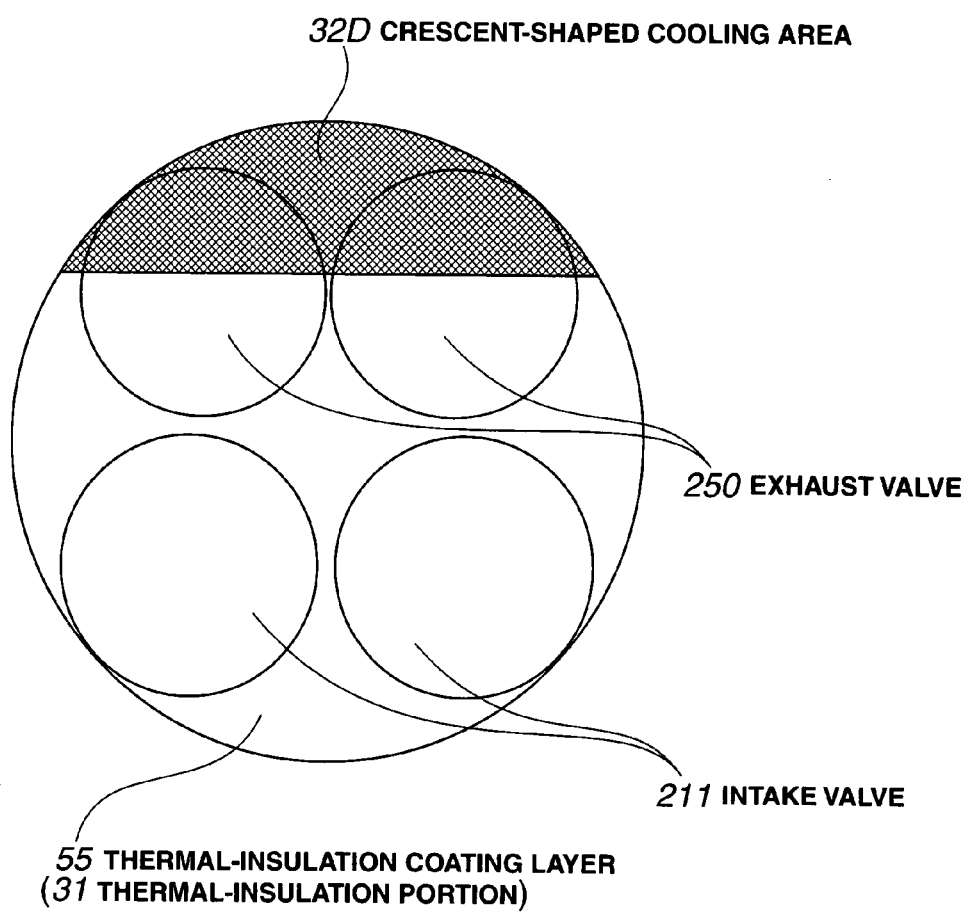

FIG. 35 is a top view of the piston of the reciprocating engine of the eighth embodiment.

FIGS. 36A-36B are schematic diagrams illustrating two different operating states in the multi-link reciprocating piston engine of the ninth embodiment, at an intermediate piston-stroke position and a piston BDC position.

Figure 37B:
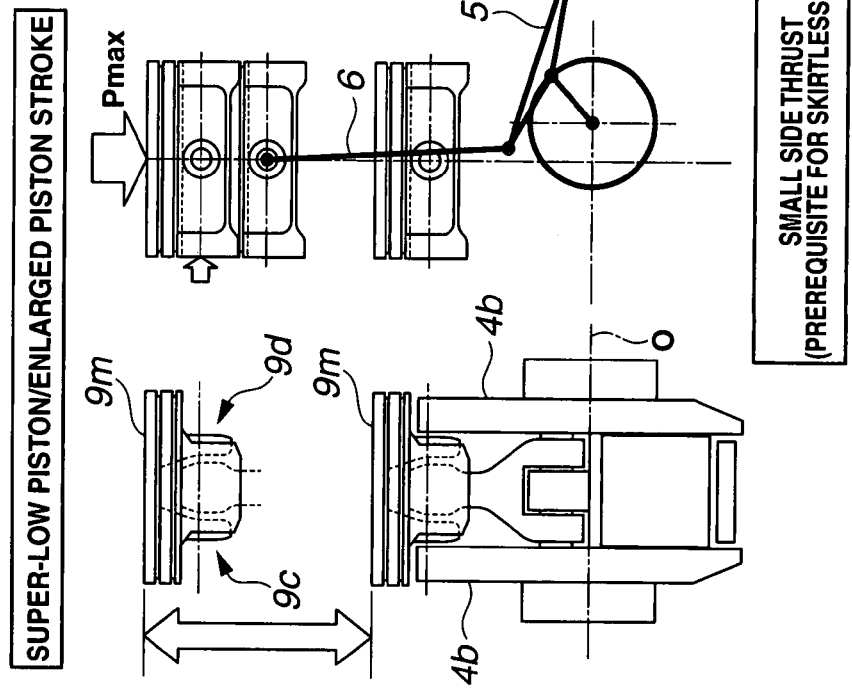
Figure 37A:
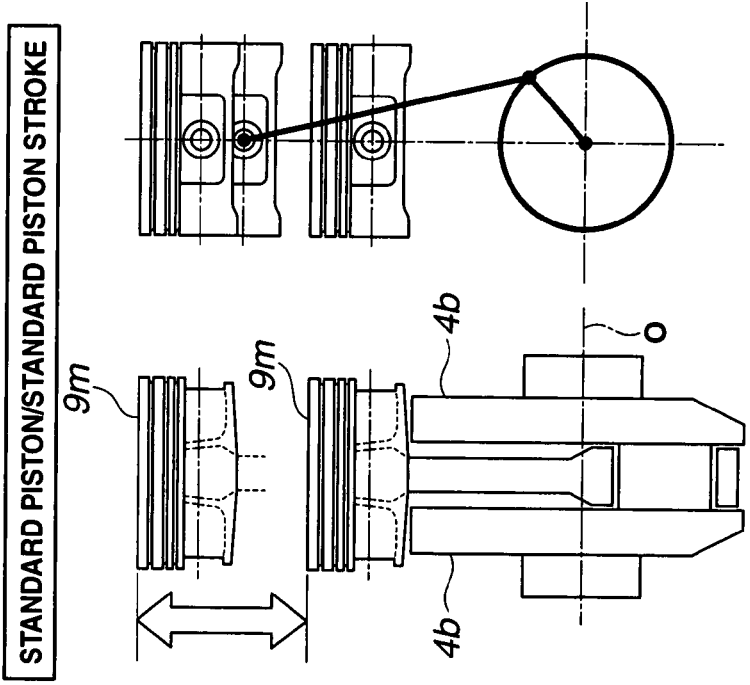

FIGS. 37A-37B are comparative diagrams, respectively showing a single-link type reciprocating piston crank mechanism and a multi-link type reciprocating piston crank mechanism that produces an enlarged piston stroke by a combination of a very short piston (super low piston) having a very short axial length and the compression ratio control system.

Figure 38A:
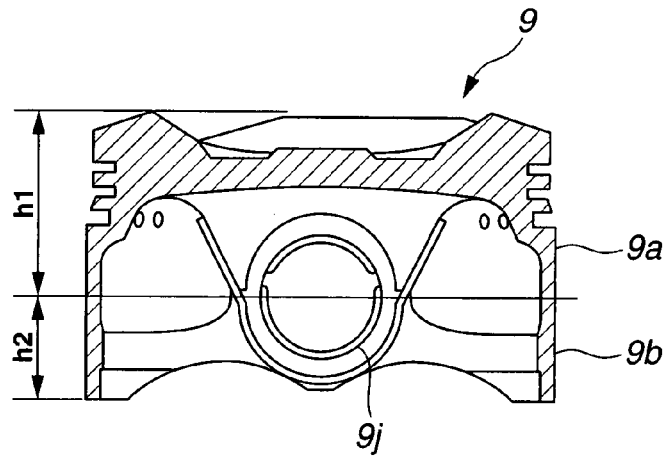
Figure 38B:
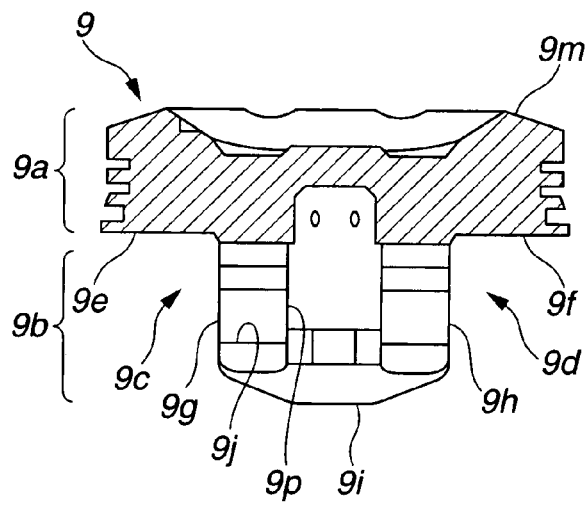
Figure 38C:
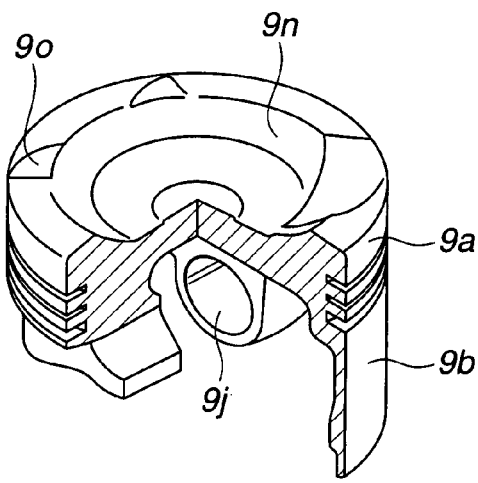

FIG. 38A is a longitudinal cross-sectional view of the very short height piston (viewed from the front end of the reciprocating engine), cut along a plane perpendicular to an axis of a piston-pin hole and including the piston-crown center, FIG. 38B is a longitudinal cross-sectional view of the very short height piston (viewed in the left-to-right direction of the reciprocating engine), cut along a plane including the axis of the piston-pin hole, and FIG. 38C is a perspective view of the very short height piston, partially cut out.

Figure 39:
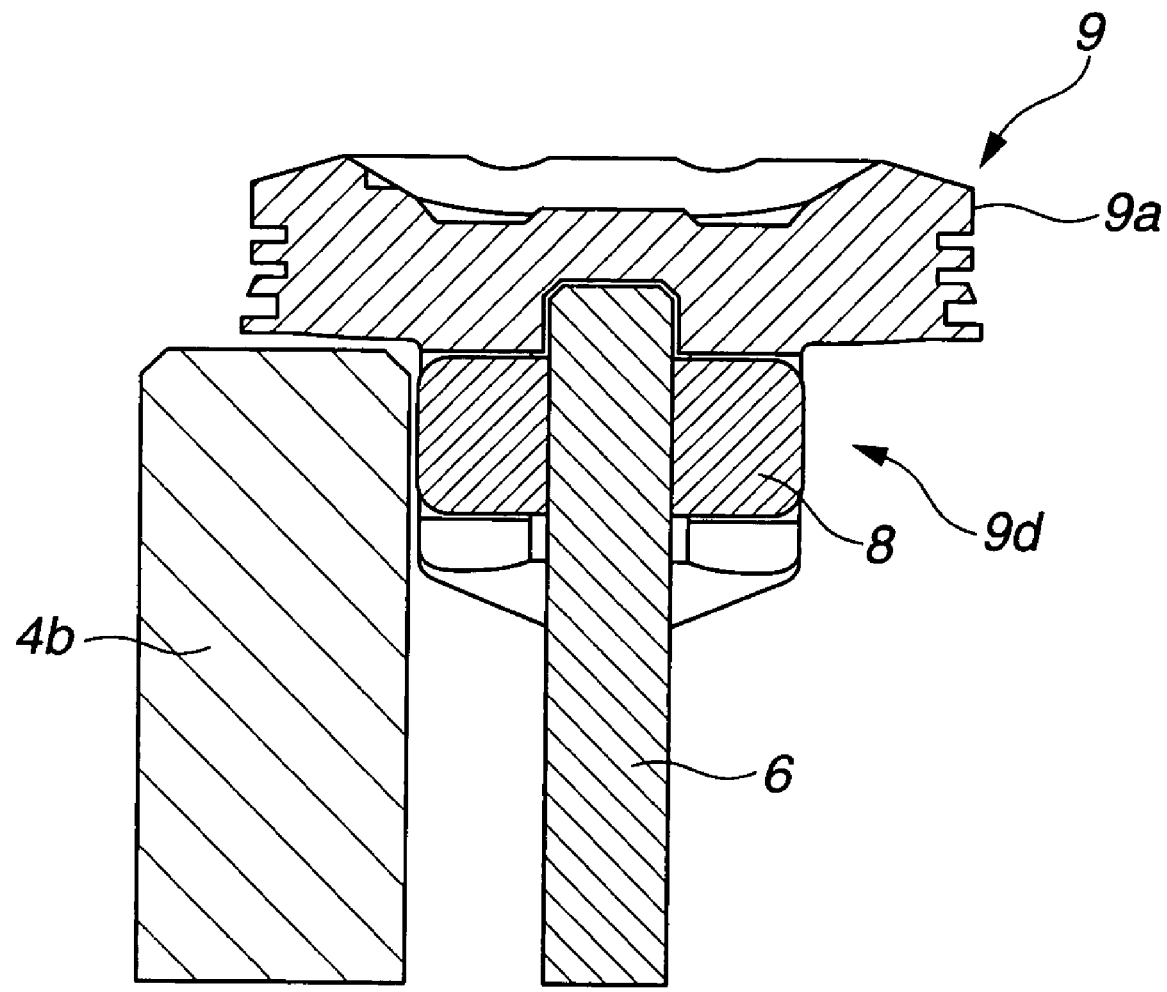

FIG. 39 is a cross section showing the relationship between a counterweight and the piston at BDC.

FIG. 40 is an explanatory view illustrating the principle (the history) before the very short height piston concept has been concluded.

FIG. 41A is a diagrammatic diagram showing the attitude change of the linkage of the multi-link type reciprocating piston crank mechanism (viewed from the rear end of the reciprocating engine) at three different piston stroke positions (i.e., at the piston TDC position, at the intermediate stroke position between TDC and BDC, and at the piston BDC position) at a piston-stroke enlargement ratio of 120% with a small leftward offset of cylinder centerline from crankshaft centerline, whereas FIG. 41B is a diagrammatic diagram showing the attitude change of the linkage of the multi-link type reciprocating piston crank mechanism (viewed from the rear end of the reciprocating engine) at the same three different piston stroke positions at a piston-stroke enlargement ratio of 140% with a large leftward offset of cylinder centerline from crankshaft centerline.

Figure 42A:
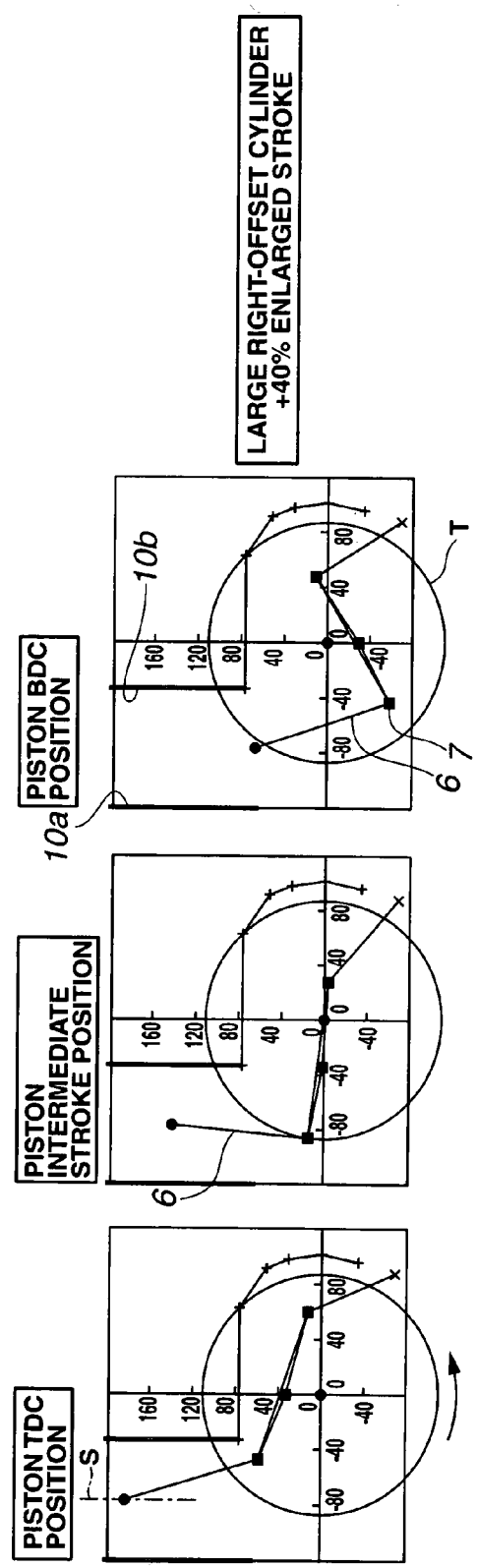
Figure 42B:
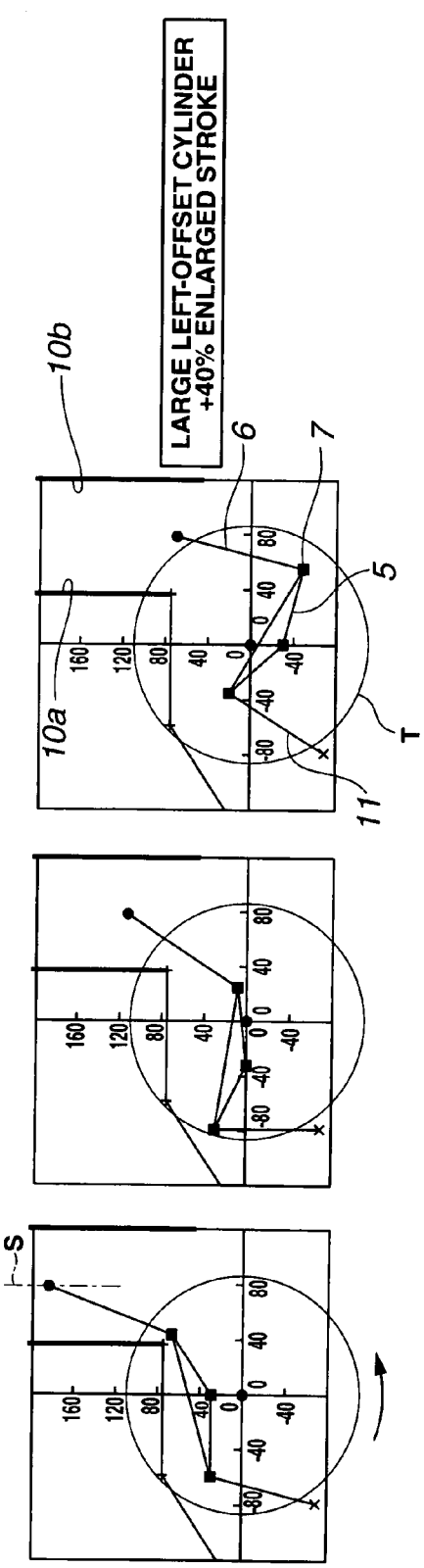

FIG. 42A is a diagrammatic diagram showing the attitude change of the linkage of the multi-link type reciprocating piston crank mechanism (viewed from the rear end of the reciprocating engine) at three different piston stroke positions at a piston-stroke enlargement ratio of 140% with a large rightward offset of cylinder centerline from crankshaft centerline, whereas FIG. 42B is a diagrammatic diagram showing the attitude change of the linkage of the multi-link type reciprocating piston crank mechanism (viewed from the rear end of the reciprocating engine) at the same three different piston stroke positions at a piston-stroke enlargement ratio of 140% with a large leftward offset of cylinder centerline from crankshaft centerline.

Figure 43A:
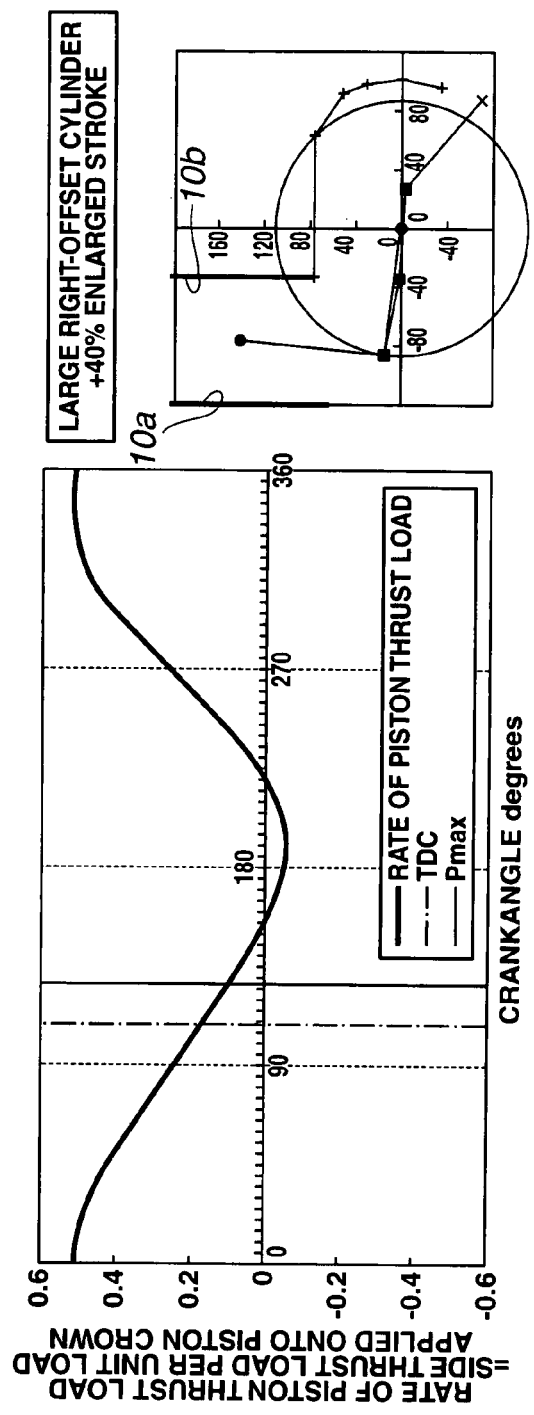
Figure 43B:
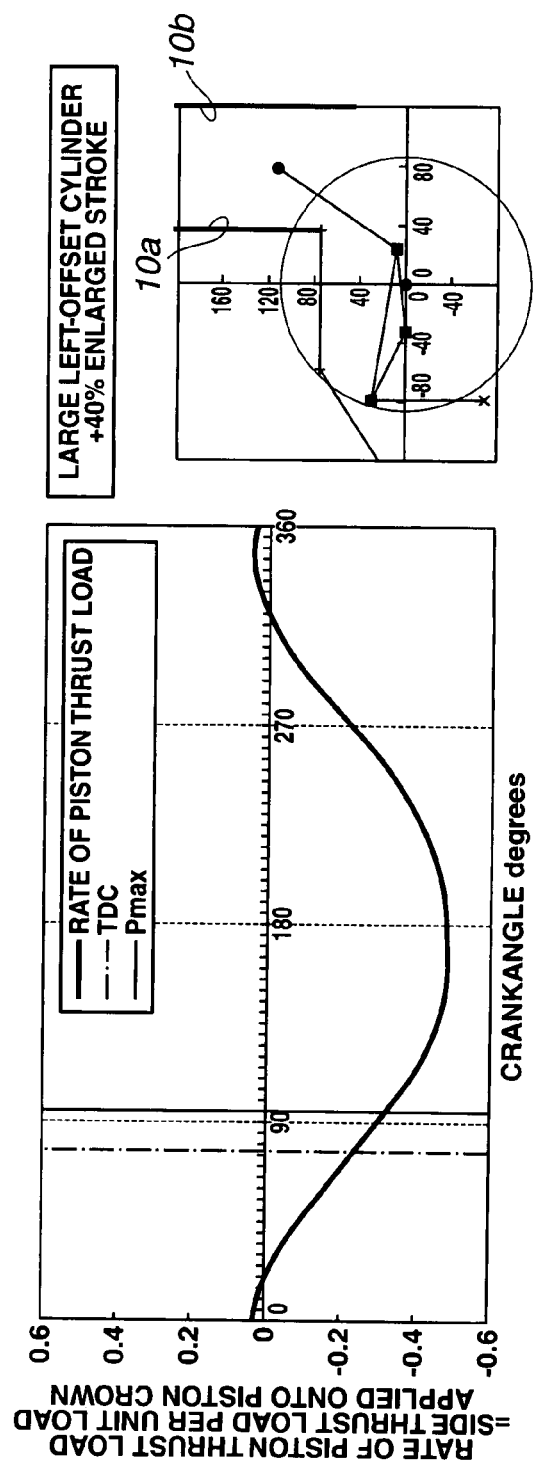

FIG. 43A is a piston thrust load rate characteristic diagram obtained by the multi-link reciprocating engine having a piston-stroke enlargement ratio of 140% and a large rightward offset of cylinder centerline from crankshaft centerline, whereas FIG. 43B is a piston thrust load rate characteristic diagram obtained by the multi-link reciprocating engine having a piston-stroke enlargement ratio of 140% and a large leftward offset of cylinder centerline from crankshaft centerline.

FIG. 44A is a piston-stroke characteristic diagram obtained by the multi-link reciprocating engine having a piston-stroke enlargement ratio of 140% and a large rightward offset of cylinder centerline from crankshaft centerline, whereas FIG. 44B is a piston-stroke characteristic diagram obtained by the multi-link reciprocating engine having a piston-stroke enlargement ratio of 140% and a large leftward offset of cylinder centerline from crankshaft centerline.

FIG. 45 is a comparative diagram showing the differences of material characteristics of aluminum and magnesium.

Figure 46:
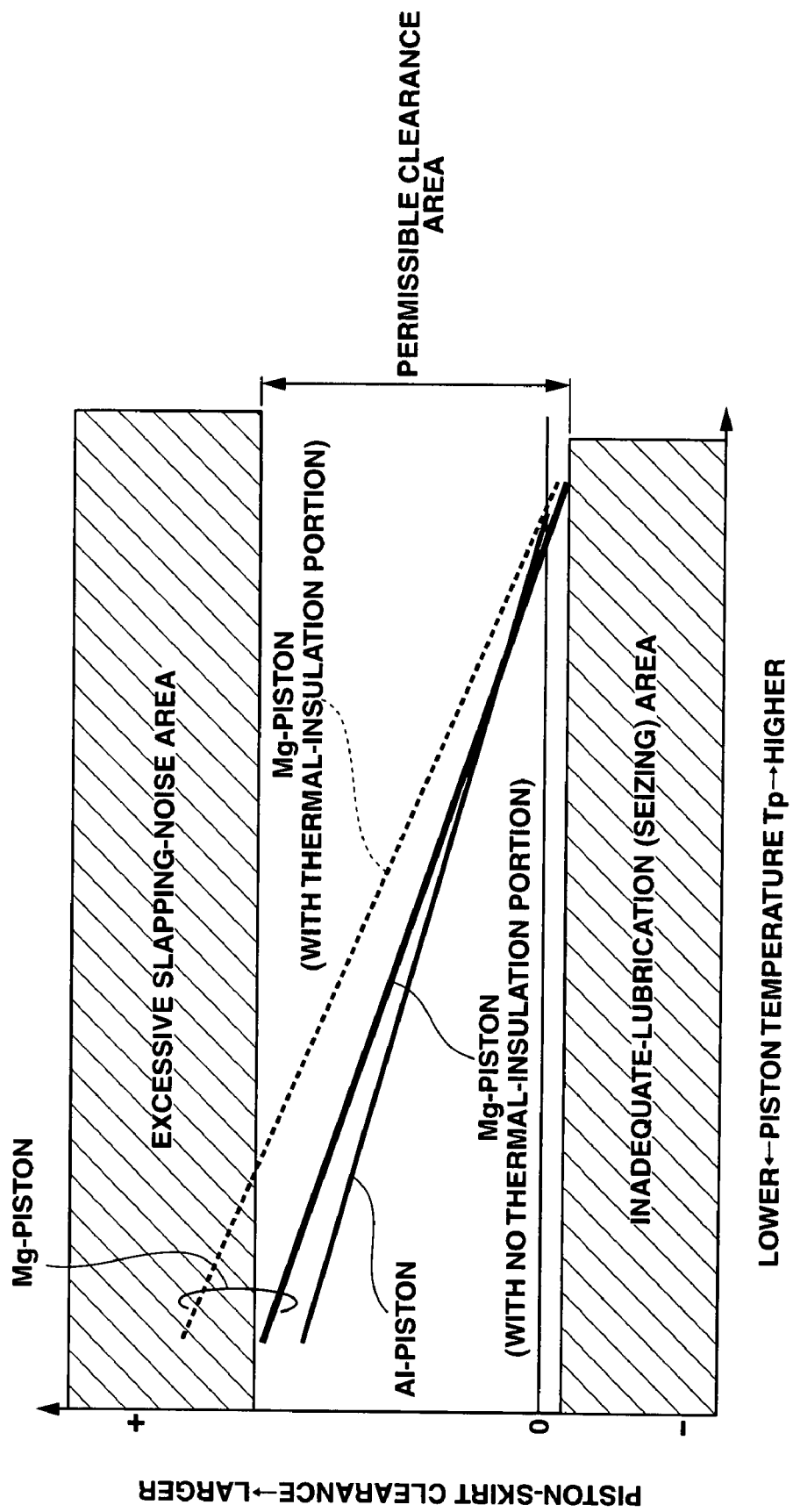

FIG. 46 is a characteristic diagram illustrating the relationship between a piston temperature (or a piston-crown temperature Tp) and a piston-skirt clearance.

Figure 47:
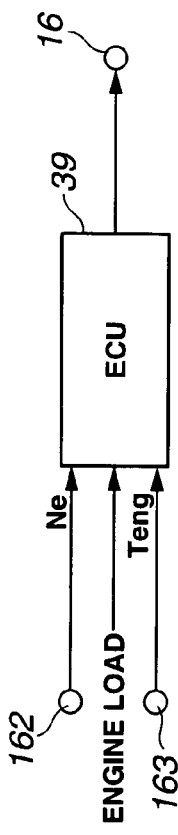

FIG. 47 is a schematic system block diagram illustrating an electronic engine control system for the reciprocating engine with the compression ratio control system.

Figure 48:
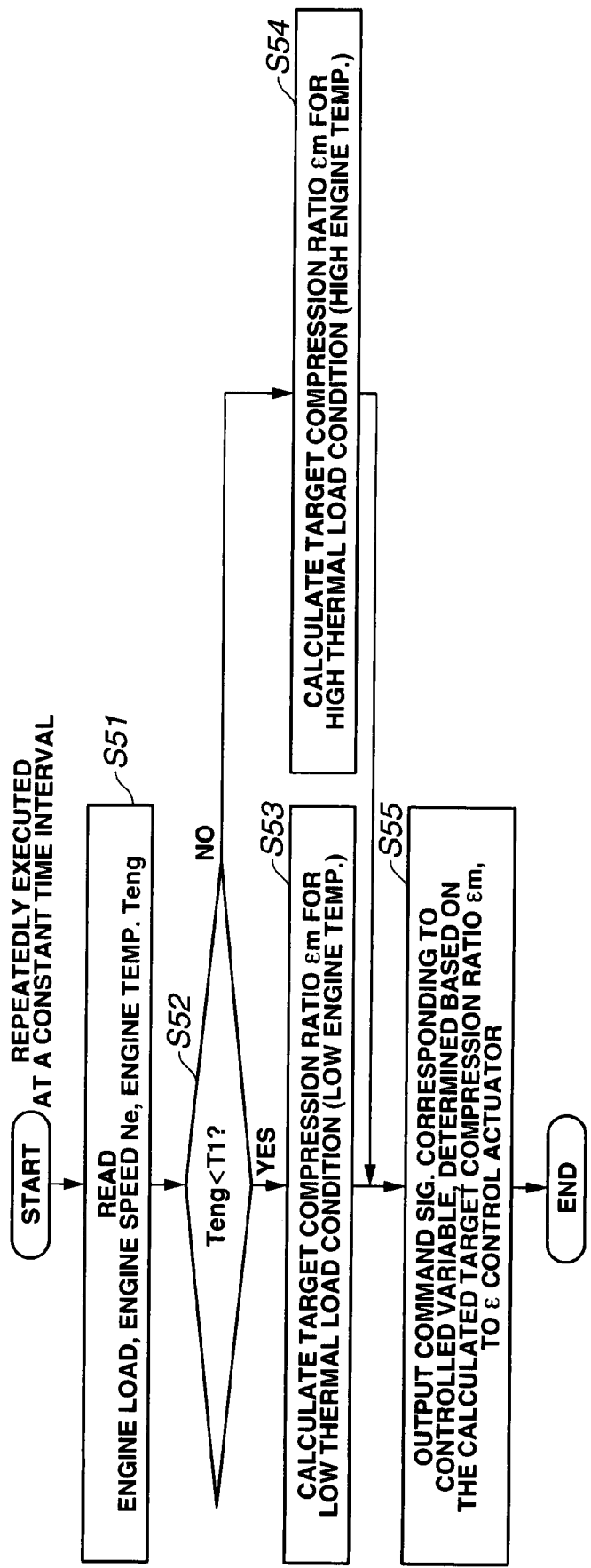

FIG. 48 is a flow chart illustrating a compression ratio control routine.

Figure 49:
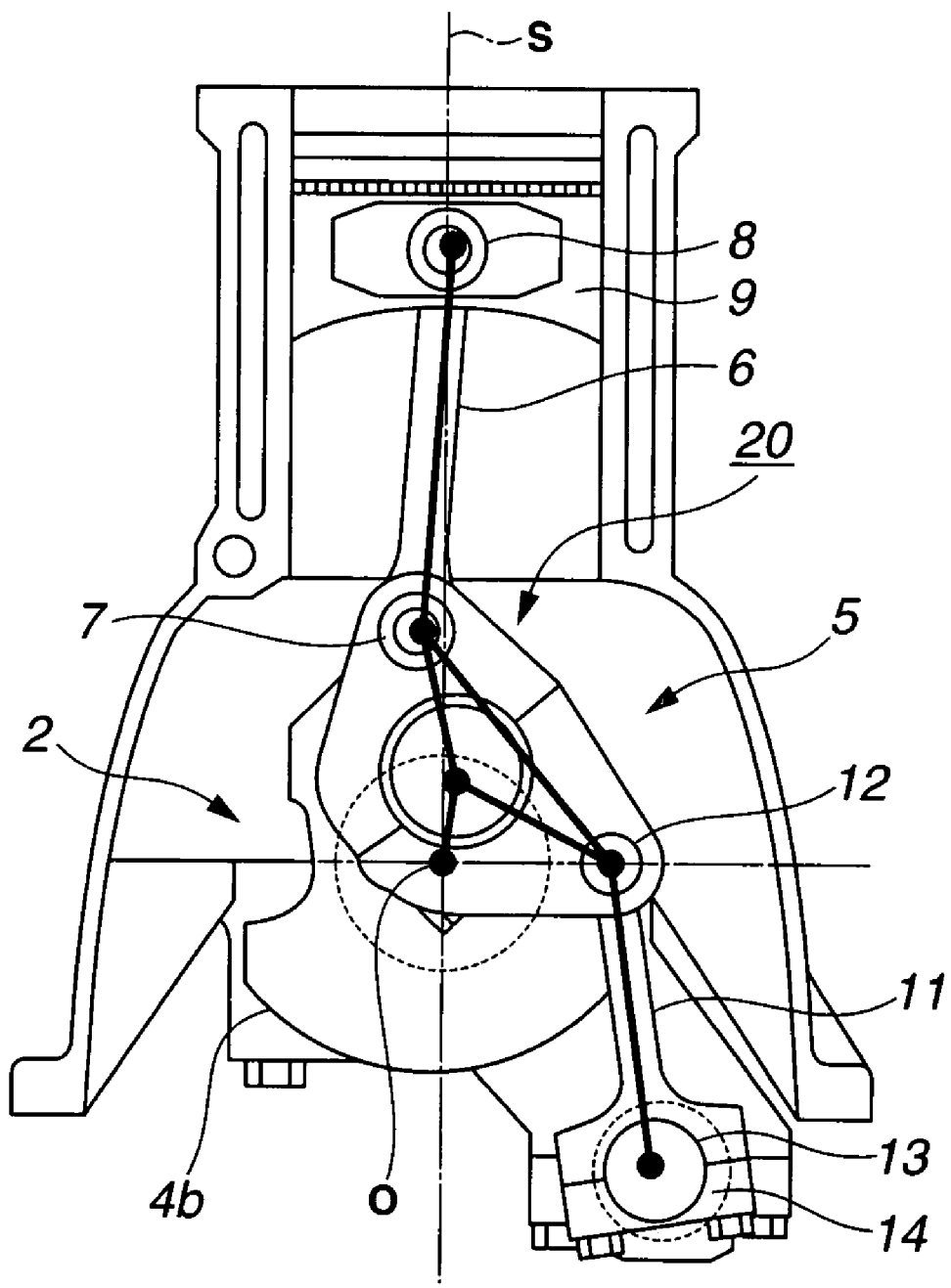

FIG. 49 is a schematic diagram illustrating a multi-link reciprocating piston engine with no offset of cylinder centerline from crankshaft centerline.

DESCRIPTION OF THE PREFERRED EMBODIMENTS

Figure 1:
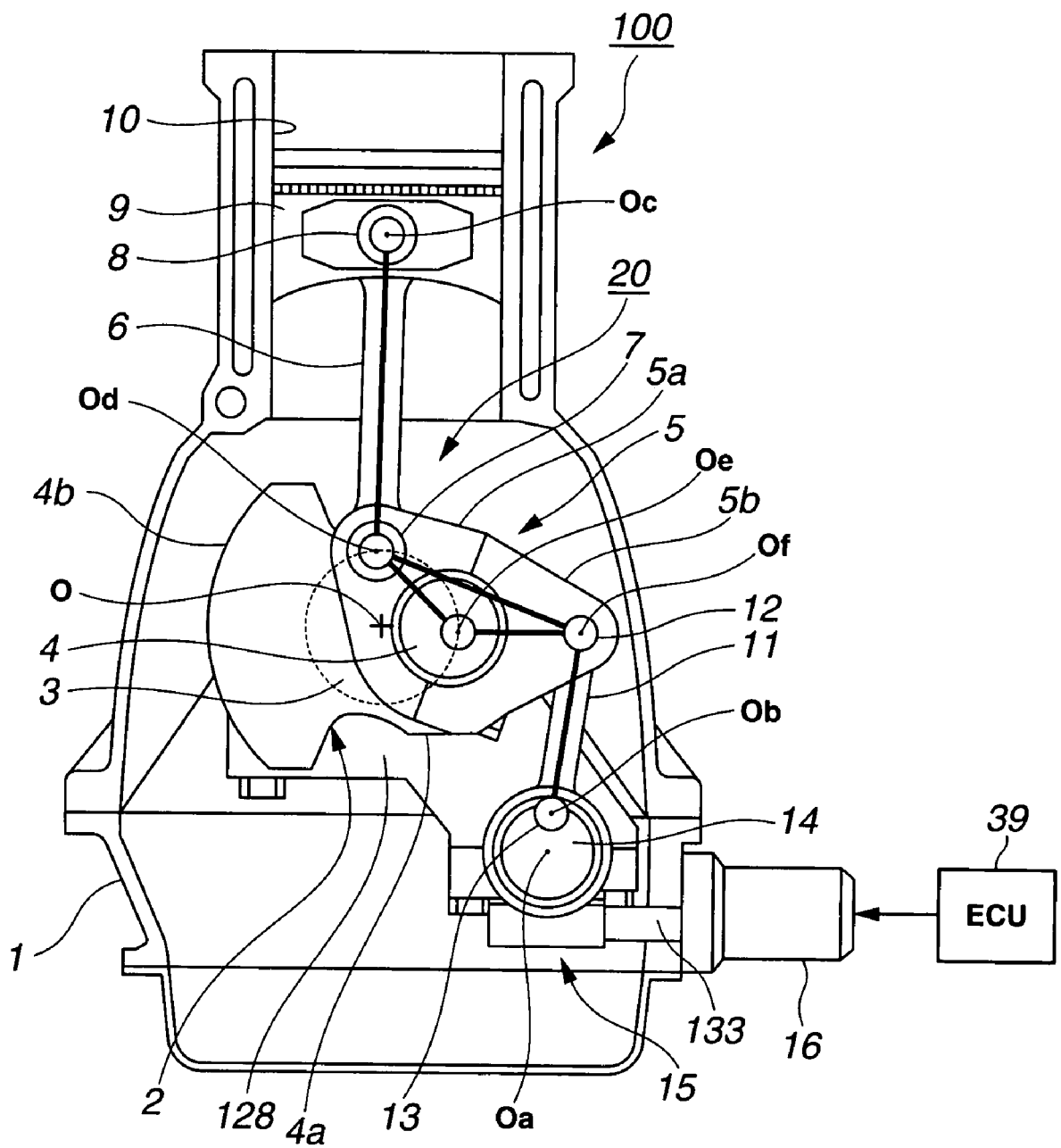
FIG. 1 is a schematic diagram illustrating an embodiment of a variable-compression-ratio reciprocating internal combustion engine.

Referring now to the drawings, particularly to FIG. 1, there is shown the simplified construction of a multi-link reciprocating internal combustion engine 100 of the invention. Engine 100 employs a variable compression ratio mechanism 20 that changes a compression ratio by changing a piston stroke characteristic (involving a piston top dead center (TDC) position and a piston bottom dead center (BDC) position). The aforementioned compression ratio means a nominal compression ratio or a geometrical or mechanical compression ratio often denoted by Greek letter "ε (epsilon)", which is generally defined as a ratio (V1+V2)/V1 of full volume (V1+V2) existing within the engine cylinder and combustion chamber with the piston at BDC to the clearance-space volume (V1) with the piston at TDC. The reciprocating piston engine having such a variable compression ratio mechanism (VCR) is conventional, typical details of such a VCR equipped reciprocating engine being set forth, for example, in Japanese Patent Provisional Publication No. 2001-227367 corresponding to U.S. Pat. No. 6,390,035 issued May 21, 2002 to Katsuya Moteki et al. and assigned to the assignee of the present invention, the teachings of which are hereby incorporated by reference. Thus, the construction of the VCR equipped reciprocating engine is hereunder described briefly.

Engine 100 has reciprocating pistons 9 each connected to an engine crankshaft 2 via a linkage composed of three links, namely an upper link (a first link) 6, a lower link (a second link) 5, and a control link (a third link) 11. As shown in FIG. 1, a crank journal (or a main bearing journal) 3 of crankshaft 2 is provided for each engine cylinder. Crank journals 3 are rotatably supported by means of main bearings (not shown) and main bearing caps (not shown), which are attached to an engine cylinder block 1 and a ladder frame 128 by cap screws. The axis O of each of crank journals 3 is identical to the axis (the rotation center) of crankshaft 2. The crank journals construct the rotating shaft portion of crankshaft 2 in contact with the main bearings.

Crankshaft 2 has a crank pin 4, a crank arm (or a crank throw) 4a, and a counterweight 4b, for each engine cylinder 10 formed in engine block 1. Crank pin 4 is connected via crank arm (or crank throw) 4a to crank journal 3. The axis Oe of crank pin 4 is eccentric to the axis O of each crank journal 3. Counterweight 4b is located opposite to the crank pin with respect to the axis O of the crank journal for attenuating the first-order vibration component of the vibrating system of reciprocating piston motion, synchronizing rotary motion of crankshaft 2. In the shown embodiment, crank arm 4a and counterweight 4b are integrally formed with each other. Reciprocating pistons 9 are slidably fitted into the respective cylinders 10. In the multi-link reciprocating piston engine of the embodiment, reciprocating piston 9 and crank pin 4 are mechanically linked to each other by means of a plurality of links, namely upper and lower links 6 and 5. The upper end of upper link 6 is attached to or fitted onto a piston pin 8 fixedly connected to piston 9, so as to permit relative rotation of the upper end of upper link 6 about the axis Oc of piston pin 8. As shown in FIG. 1, lower link 5 has a two-split structure, which is comprised of a first lower-link portion 5a and a second lower-link portion 5b bolted to the first lower-link portion in such a manner as to sandwich crank pin 4 between the half-round sections of two lower-link portions 5a-5b. The lower end of upper link 6 and the first lower-link portion 5a are connected to each other by means of a connecting pin 7, so as to permit relative rotation of the lower end of upper link 6 about the axis Od of connecting pin 7 and relative rotation of the first lower-link portion 5a about the axis Od of connecting pin 7. By way of the half-round sections of the first and second lower-link portions 5a-5b bolted to each other, lower link 5 is supported on the associated crank pin 4 to permit relative rotation of lower link 5 about the axis Oe of crank pin 4. The second lower-link portion 5b and the upper end of a control link 11 are connected to each other by means of a connecting pin 12, so as to permit relative rotation of the second lower-link portion 5b about the axis Of of connecting pin 12 and relative rotation of control link 11 about the axis Of of connecting pin 12.

The lower end of control link 11 is mechanically linked via a connecting pin 13 to a control shaft 14 so as to permit oscillating motion of control link 11 about the axis Ob of connecting pin 13. Control shaft 14 is rotatably supported on the lower portion of cylinder block 1, and connecting pin 13 is fixedly connected to control shaft 14, such that the axis Oa of control shaft 14 is eccentric to the axis Ob of connecting pin 13 by a predetermined distance. Control shaft 14 is formed on its circumference with a toothed portion. The toothed portion of control shaft 14 is in meshed-engagement with a worm 15 fixedly connected to the output shaft 133 of a compression ratio control actuator 16 (hereinafter is referred to as "ε control actuator"). When control shaft 14 is rotated or driven by means of ε control actuator 16 depending on engine operating conditions such as engine speed and engine load, connecting pin 13 (i.e., the connecting-pin axis Ob) revolves on the axis Oa of control shaft 14 to cause relative displacement of the connecting-pin axis Ob to cylinder block 1. Thus, connecting pin 13 (i.e., the connecting-pin axis Ob) is kept at a given angular position with respect to the axis Oa of control shaft 14 and therefore the geometrical compression ratio is controlled to a desired ratio based on latest up-to-date information concerning engine operating conditions.

With the previously-noted arrangement, during rotation of crankshaft 2, piston 9 moves up and down through a stroke in cylinder 10 via the linkage, comprised of crank pin 4, lower link 5, upper link 6, and piston pin 8, and also control link 11, mechanically linked to lower link 5, oscillates about the connecting-pin axis Ob.

Figure 2A:
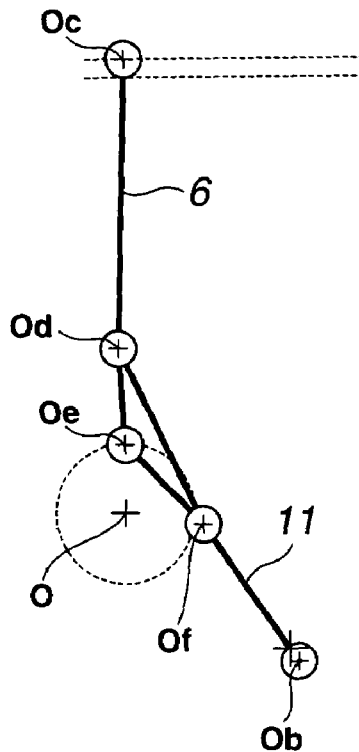
FIGS. 2A-2C are explanatory views illustrating two different multi-link attitudes at a high-compression-ratio position and at a low-compression-ratio position.
Figure 2B:
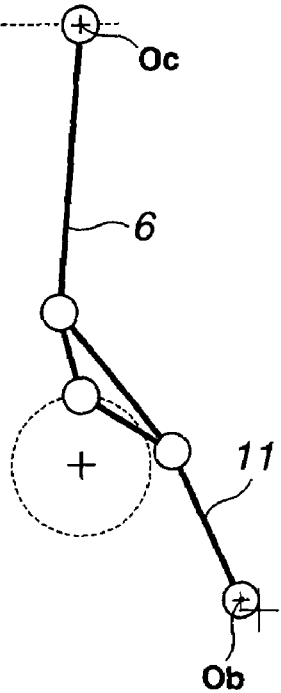
Figure 2C:
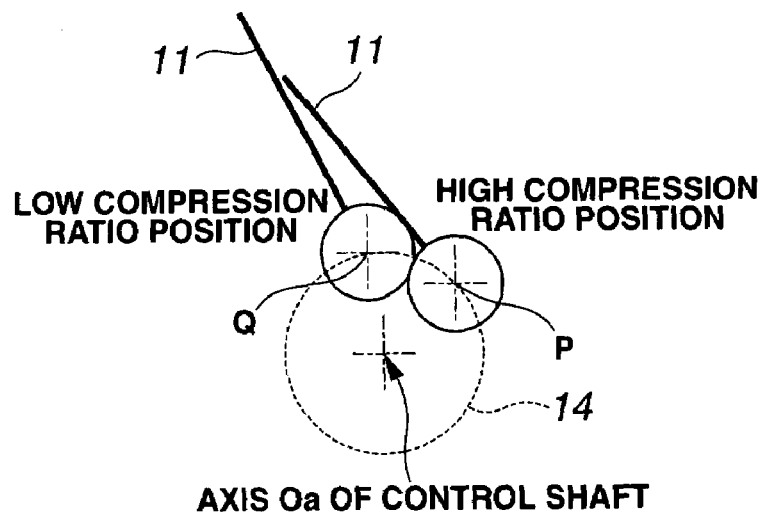

Referring now to FIGS. 2A-2C, there are shown the two different multi-link attitudes (i.e., attitudes of upper link 6, lower link 5, and control link 11) respectively corresponding to a high compression ratio and a low compression ratio, at a piston TDC position. In more detail, FIG. 2A shows the multi-link attitude corresponding to the high compression ratio position at TDC, whereas FIG. 2B shows the multi-link attitude corresponding to the low compression ratio position at TDC. On the other hand, FIG. 2C shows two different angular positions P and Q, namely the first angular position P of connecting-pin axis Ob corresponding to the high compression ratio and the second angular position Q of connecting-pin axis Ob corresponding to the low compression ratio. As previously described, in multi-link reciprocating engine 100, ε control actuator 16 is driven responsively to a compression-ratio control command signal from a controller or an electronic control unit (ECU) 39 (described later) depending on engine operating conditions to vary the angular position of connecting-pin axis Ob capable of revolving on control-shaft axis Oa, thus variably controlling the compression ratio (exactly, the geometrical compression ratio). For instance, when connecting-pin axis Ob is adjusted to and kept at the first angular position P, as shown in FIG. 2A, the piston TDC position becomes higher to realize a high compression ratio. Conversely when connecting-pin axis Ob is adjusted to and kept at the second angular position Q, as shown in FIG. 2B, control link 11 is pushed up and thus the position of connecting-pin axis Of is pushed up. As a result, lower link 5 slightly rotates anti-clockwise about the crank-pin axis Oe, the position of connecting-pin axis Od falls down, and thus the position of piston 9 at TDC falls down so as to realize a low compression ratio.

As set forth above, variable compression ratio mechanism 20 of multi-link reciprocating internal combustion engine 100 differs from the single-link type reciprocating piston crank mechanism that a crank pin of a crankshaft is connected to a piston pin of a piston usually by means of a single link known as a "connecting rod" and a compression ratio (exactly, a geometrical compression ratio) is fixed, as follows.

Variable compression ratio mechanism 20, which is comprised of the multi-link type reciprocating piston crank mechanism, is different from the single-link type reciprocating piston crank mechanism, in that piston 9 is connected to crankshaft 2 via at least two links, namely upper link 6 and lower link 5, and control link 11 is mechanically linked to lower link 5 for restricting or governing the behavior of lower link 5, and the center of oscillating motion of control link 11 can be varied by means of the control shaft unit (13, 14). That is, the piston stroke characteristic (involving a piston TDC position and a piston BDC position, in particular, the piston TDC position) can be varied by way of angular position control of connecting-pin axis Ob, and thus a compression ratio (exactly, a geometrical compression ratio) can be variably controlled. Additionally, by the use of variable compression ratio mechanism 20 of multi-link reciprocating internal combustion engine 100, it is possible to bring the piston stroke characteristic close to a simple harmonic motion. More concretely, as compared to the single-link type reciprocating piston crank mechanism whose piston stroke characteristic is fixed to the same TDC-to-BDC piston stroke as that of the variable compression ratio mechanism (the multi-link type piston crank mechanism) 20, in the case of variable compression ratio mechanism 20, reciprocating motion of piston 9 becomes a piston stroke characteristic close to a simple harmonic motion (a simple harmonic oscillation). Hereupon, the previously-noted single-link type reciprocating piston crank mechanism whose piston stroke characteristic is fixed to the same TDC-to-BDC piston stroke as that of variable compression ratio mechanism 20, intends for a general single-link reciprocating piston crank mechanism whose connecting-rod length ranges from three times longer than the crank radius to five times longer than the crank radius. That is, the previously-noted single-link type reciprocating piston crank mechanism never intends for an impracticable single-link reciprocating piston crank mechanism whose connecting-rod length is excessively longer. In the previously-noted variable compression ratio mechanism 20, a piston stroke characteristic at and near TDC and a piston stroke characteristic at and near BDC are approximately symmetric to each other. As compared to the single-link type piston crank mechanism, the piston stroke velocity of the engine employing variable compression ratio mechanism 20 before and after BDC becomes fast, and the piston stroke velocity of the engine employing variable compression ratio mechanism 20 before and after TDC becomes slow. The linkage alignment of each of the links 6, 5, 11 and each of the pivots including pin axes Oa, Ob, Oc, Od, Oe, and Of is set or designed, so that lower link 5 oscillates in a direction (a piston downstroke direction) for pulling down the piston in a crankangle range from a crankangle corresponding to BTDC (before TDC) to a crankangle corresponding to TDC and in a crankangle range from a crankangle corresponding to BBDC (before BDC) to a crankangle corresponding to BDC, and that lower link 5 oscillates in a direction (a piston upstroke direction) for pulling up the piston in a crankangle range from the crankangle corresponding to TDC to a crankangle corresponding to ATDC (after TDC) and in a crankangle range from the crankangle corresponding to BDC to a crankangle corresponding to ABDC (after BDC). On the one hand, this ensures a vibration-reduction effect by which there is a less necessity for a balancer shaft or balance weight adjustment (in four-cylinder engines). On the other hand, the piston stroke velocity of the engine employing variable compression ratio mechanism 20 near TDC tends to become slow in comparison with the piston stroke characteristic obtained by the single-link type piston crank mechanism. The slow piston stroke velocity of piston 9 near TDC, leads to an increased cooling loss.

In the shown embodiment, the control shaft unit used to displace the center of oscillating motion of control link 11 and constructing a part of variable compression ratio mechanism 20, is comprised of connecting pin 13 and the toothed control shaft 14 in meshed-engagement with worm 15 fixedly connected to the output shaft 133 of ε control actuator 16. In lieu thereof, the control shaft unit used to displace the center of oscillating motion of control link 11 may be comprised of a small-diameter control shaft portion and a large-diameter eccentric cam portion, which eccentric cam is fixed to the small-diameter control shaft portion and whose axis is eccentric to the axis of the small-diameter control shaft portion. In this case, the lower end of control link 11 is rotatably fitted onto the outer periphery of the eccentric cam portion to permit oscillating motion of control link 11 about the axis of the eccentric cam portion. On the other hand, the small-diameter control-shaft portion is rotatably supported on the cylinder block, such that the axis of the eccentric cam revolves on the axis of the small-diameter control-shaft portion by driving the small-diameter control-shaft portion by ϵ control actuator 16 and thus the center of oscillating motion of control link 11 is displaced to change a geometrical compression ratio.

Figure 3A:
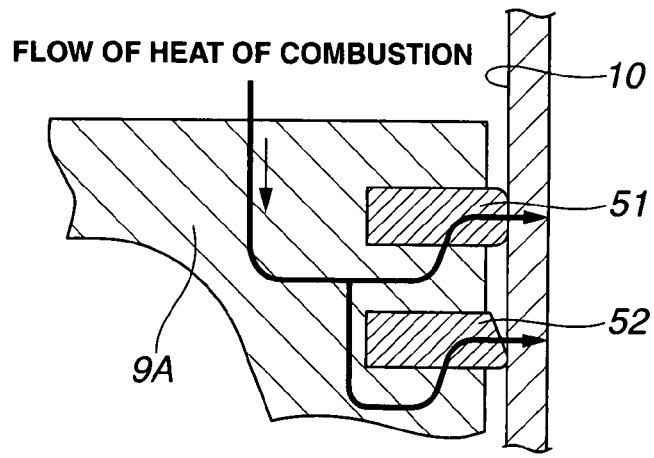
Figure 3B:
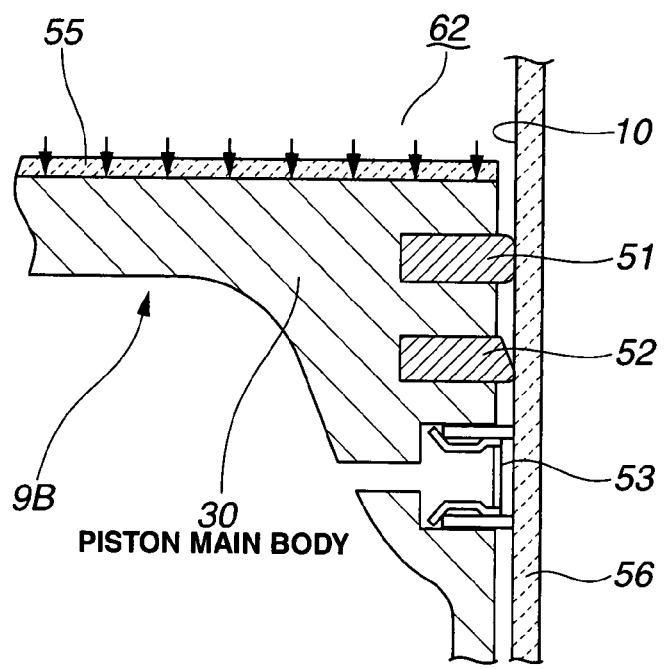
FIG. 3B is a partial cross-sectional view illustrating a thermal-insulation piston structure and a thermal-insulation cylinder liner structure of the engine of the first embodiment.

Referring now to FIG. 3B, there is shown the thermal-insulation piston and thermal-insulation cylinder liner structure, which is applicable to piston 9 and cylinder 10 of multi-link reciprocating internal combustion engine 100 of the first embodiment. In FIG. 3B, piston rings denoted by reference signs 51-52 are compression rings installed for sealing the compression into the combustion chamber 62, whereas a piston ring denoted by reference sign 53 is an oil-control ring installed to scrape excessive oil off the cylinder wall. As seen in FIG. 3B, a coating layer (or a thermal-insulation area or a thermal-insulation portion) 55 of a predetermined thickness, formed of a thermal insulation material (a non-metallic material) such as a ceramic material, is formed on the piston crown of a thermal-insulation piston 9B by way of thermal spraying or the like. Additionally, as can be seen from the cross section of FIG. 3B, a cylinder liner 56 is inserted in the engine cylinder block as a separate cylindrical sleeve, which serves as the cylinder 10. In a similar manner to the coating layer 55 formed on the piston crown of thermal-insulation piston 9B, cylinder liner 56 is also formed of a thermal insulation material (a non-metallic material) such as a ceramic material. The base material of the piston main body 30 of thermal-insulation piston 9B except coating layer 55 formed of a thermal insulation material (a non-metallic material) and the base material (the cylinder block main body) of the engine cylinder block except liner 56 formed of a thermal insulation material (a non-metallic material) are formed of a metallic material such as cast iron, aluminum (aluminum alloy), or magnesium (magnesium alloy). Regarding the reciprocating piston, from the viewpoint of light weight, it is desirable to use magnesium (magnesium alloy) as the base material of the piston.

In the case that the previously-discussed thermal-insulation piston and cylinder liner structure is applied to the single-link reciprocating piston engine whose geometrical compression ratio is fixed, it is well known hereby that a cooling loss can be reduced, thus improving a thermal efficiency of the reciprocating engine. In the first embodiment, the thermal-insulation piston-and-liner structure as shown in FIG. 3B is applied to multi-link reciprocating engine 100 employing variable compression ratio mechanism 20, capable of variably controlling the geometrical compression ratio ϵ responsively to a driving signal (a compression-ratio command) corresponding to a controlled variable for ϵ control actuator 16 and generated from ECU 39. On the other hand, FIG. 3A shows the usual piston and cylinder structure in which a piston 9A and cylinder 10 are both made of metallic materials. In the case of the usual piston 9A, as seen in FIG. 3A, heat of combustion is transferred and escaped from the piston 9A through piston rings (compression rings) 51-52 into cylinder 10, and thus there is an increased tendency for a cooling loss to increase. In contrast, in the case of thermal-insulation piston 9B and thermal-insulation cylinder liner 56 as shown in FIG. 3B, the thermal-insulation coating layer 55 such as a ceramic coating layer serves as a heat shield by which heat transfer is cut off, and thus heat transfer from thermal-insulation piston 9B to cylinder 10 can be largely suppressed, thereby largely reducing a cooling loss. As discussed previously, the ceramic material, which is used as a heat-insulating material, also serves as a heat-reserving material. Thus, the use of the ceramic material (thermal-insulation piston 9B) leads to increased knocking tendencies owing to an intake-air temperature rise under a high thermal load condition such as during wide open throttle (WOT). One way to simply suppress or avoid such knocking tendencies is to properly reduce geometrical compression ratio ϵ of variable compression ratio engine 100 by means of variable compression ratio mechanism 20. Simply reducing the geometrical compression ratio ϵ undesirably leads to another problem, that is, a deteriorated thermal efficiency. To avoid this, in combination with the thermal-insulation piston structure, it is desirable to use a high heat-transfer and heat-conduction area (or a high heat-transfer and heat-conduction material) in the right place, for example, a high heat-transfer, lower cylinder-liner portion (described later in reference to FIG. 4B), a piston-crown annulus cooling portion (described later in reference to FIGS. 29-30, 31, and 32), and a piston-crown crescent-shaped cooling portion (described later in reference to FIGS. 34-35). Advantages to using the high heat-transfer and heat-conduction material combined with the thermal-insulation material (e.g., ceramic material) are to largely suppress the geometrical compression ratio ϵ from being lowered for knocking avoidance, while effectively suppressing knocking from occurring.

Figure 4A:
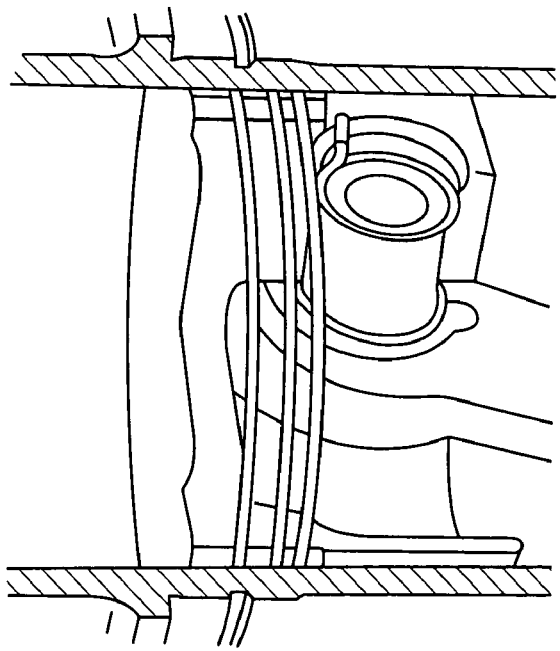
Figure 4B:
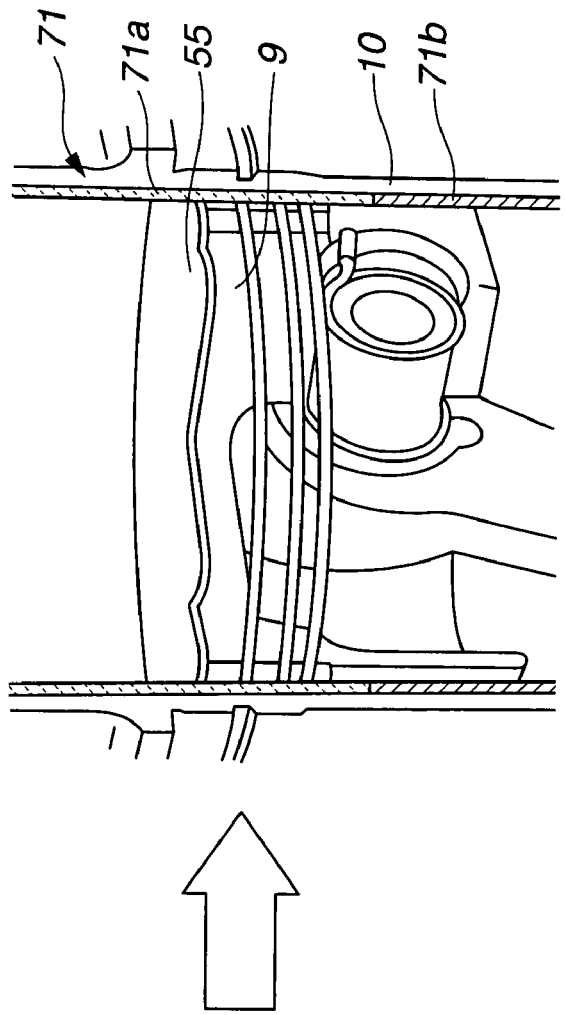
FIG. 4B is a perspective view of a thermal-insulation-piston structure and a two-split cylinder liner structure of the engine of the second embodiment.

Referring now to FIG. 4B, there is shown the thermal-insulation piston and two-split cylinder liner structure, used in the multi-link reciprocating internal combustion engine (variable compression ratio engine 100) of the second embodiment. As seen in FIG. 4B, reciprocating piston 9 of the engine of the second embodiment is constructed by thermal-insulation piston 9B (see FIG. 3B) whose crown (piston head) is coated by thermal-insulation coating layer 55 such as a ceramic coating layer. On the other hand, a cylinder liner 71 has a two-split structure. More concretely, cylinder liner 71 is constructed by a composite material, namely upper and lower liner portions 71a-71b, fully taking into account priority allocation. Actually, the upper liner portion 71a located on the side of the piston TDC position is constructed as a thermal-insulation area, while the lower liner portion 71b located on the side of the piston BDC position is constructed as a high heat-transfer and heat-conduction area. That is, the upper liner portion 71a has a thermal insulation structure, which is mainly formed of a thermal insulation material (a non-metallic material) such as a ceramic material. On the other hand, the lower liner portion 71b has a high heat-transfer and heat-conduction structure, which is mainly formed of a carbon nanotube (often abbreviated to "CNT") formed in or coated on or attached to the inner peripheral wall surface of lower liner portion 71b in sliding-contact with piston 9 (exactly, piston rings) by way of coating or blending or the like. Thus, the lower-half skirt portion of piston 9 has a high thermal-transfer and heat-conduction coefficient by virtue of lower liner portion 71b having a high heat-transfer and heat-conduction structure mainly formed of carbon nanotube (CNT). It is very important which level an engine designer sets the boundary line of upper and lower liner portions 71a-71b. Actually, the optimal setting of the boundary line of upper and lower liner portions 71a-71b varies depending on the type and specification of engine.

As discussed above, when cylinder liner 71 of each engine cylinder of multi-link reciprocating engine 100 employing variable compression ratio mechanism 20 is constructed by composite materials, namely upper and lower liner portions 71a-71b, fully taking into account priority allocation, the piston rings can be effectively cooled via lower liner portion 71b located on the side of the piston BDC position. Therefore, even when the surface temperature of upper liner portion 71a located on the side of the piston TDC position is rising, it is possible to avoid inadequate lubrication (inadequate lubricating oil), in other words, an excessive piston ring temperature rise, thus preventing piston 9 (or the piston ring) from being undesirably stuck to the wall surface of cylinder 10 (or cylinder liner 71) owing to the excessive piston-ring temperature rise. However, even in the case of the multi-link reciprocating engine (i.e., the variable compression ratio reciprocating engine) having the thermal-insulation piston-and-liner structure as shown in FIGS. 3B and 4B, the ceramic material, which is used as a heat-insulating material, also serves as a heat-reserving material. And thus, under a high thermal load condition, a compression temperature (or a combustion temperature) tends to rise, and there is a risk of the occurrence of knocking. The risk of the occurrence of knocking under the high thermal load condition can be eliminated by way of variable compression ratio control. That is, in the case of the multi-link reciprocating engine (i.e., the variable compression ratio reciprocating engine) having the thermal-insulation piston-and-liner structure as shown in FIGS. 3B and 4B, it is possible to realize knocking avoidance and engine performance enhancement by means of a variable compression ratio control system shown in FIG. 5.

Figure 5:
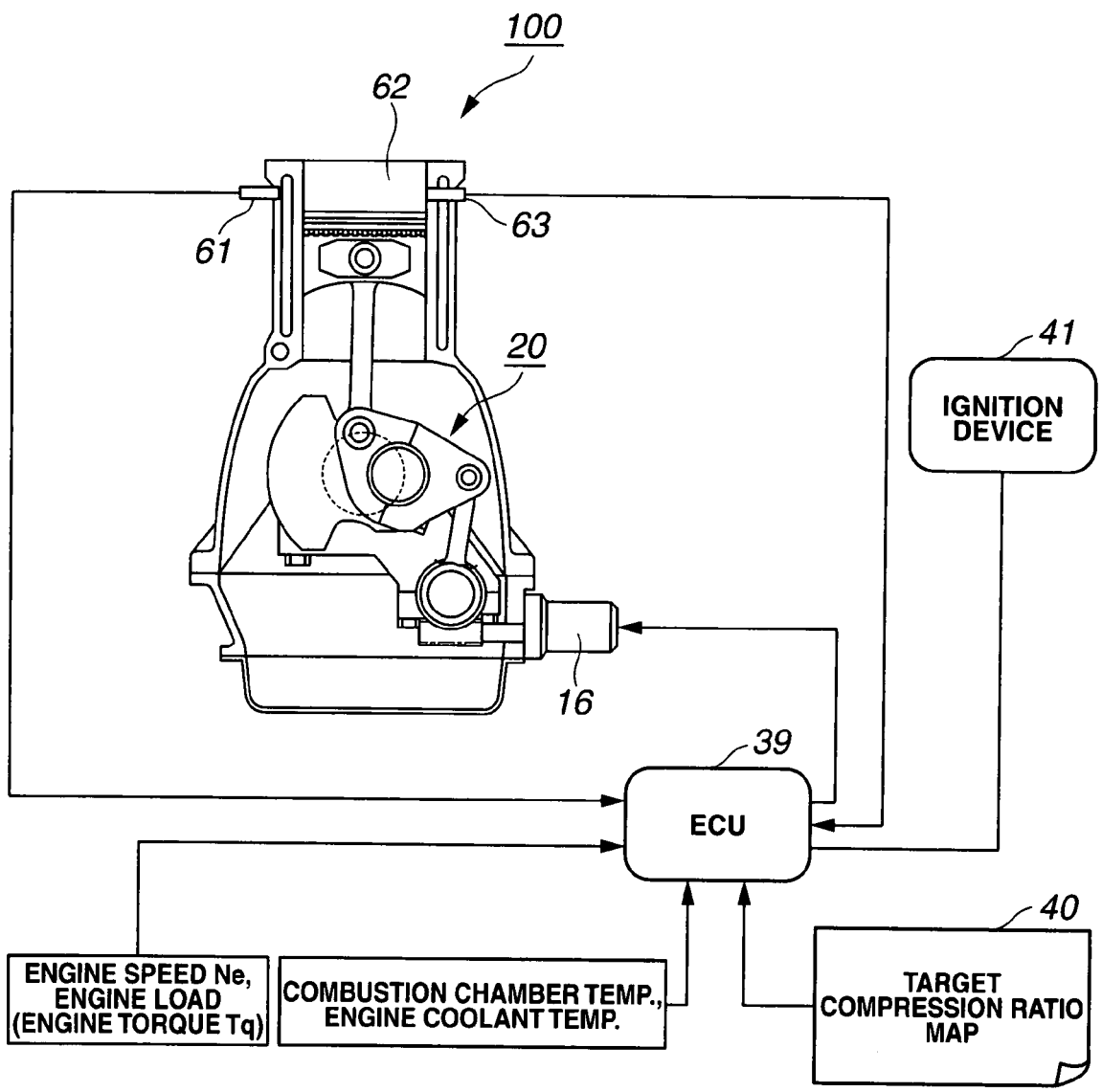
FIG. 5 is a system block diagram illustrating a compression ratio control system employed in the multi-link reciprocating engine of each of the first and second embodiments.

Referring to FIG. 5, the compression ratio control system includes electronic control unit (ECU) 39. ECU 39 generally comprises a microcomputer. ECU 39 includes an input/output interface (I/O), memories (RAM, ROM), and a microprocessor or a central processing unit (CPU). The input/output interface (I/O) of ECU 39 receives input information from various engine/vehicle sensors, namely a crank angle sensor (or a crankshaft position sensor), a throttle opening sensor (or an accelerator position sensor), a coolant temperature sensor (an engine temperature sensor), a combustion chamber temperature (an in-cylinder temperature or an in-combustion-chamber temperature), a knock sensor 61, a combustion-chamber wall temperature sensor 63, an intake-air negative pressure sensor (or a manifold pressure sensor), an exhaust temperature sensor and the like. Within ECU 39, the central processing unit (CPU) allows the access by the I/O interface of input informational data signals from the previously-discussed engine/vehicle sensors. The CPU of ECU 39 is responsible for carrying the engine control program stored in memories and is capable of performing necessary arithmetic and logic operations. Computational results (arithmetic calculation results), that is, calculated output signals are relayed through the output interface circuitry of ECU 39 to output stages, that is, $\epsilon$ control actuator 16 included in the variable compression ratio control system and an ignition device (or an igniter) 41 included in an electronic ignition system for a spark-ignited reciprocating piston internal combustion engine in which an electrical discharge created by igniter 41 ignites an air-and-fuel mixture in combustion chamber 62 formed above the piston reciprocating in the cylinder.

As seen from the system diagram of FIG. 5, the processor of ECU 39 calculates or retrieves a target compression ratio $\epsilon m$ based on the latest up-to-date information concerning engine operating conditions, that is, engine load and engine speed Ne input into the interface circuitry from the engine sensors, from a preprogrammed target compression ratio map 40 stored in the memory. ECU 39 controls or varies, based on the calculated target compression ratio $\epsilon m$, a controlled variable of the $\epsilon$ control system (that is, a compression-ratio command or a driving signal to be applied to $\epsilon$ control actuator 16), so as to bring the actual geometrical compression ratio closer to the calculated target compression ratio $\epsilon m$. In FIGS. 3B and 5, reference sign 62 denotes a combustion chamber.

Figure 6:
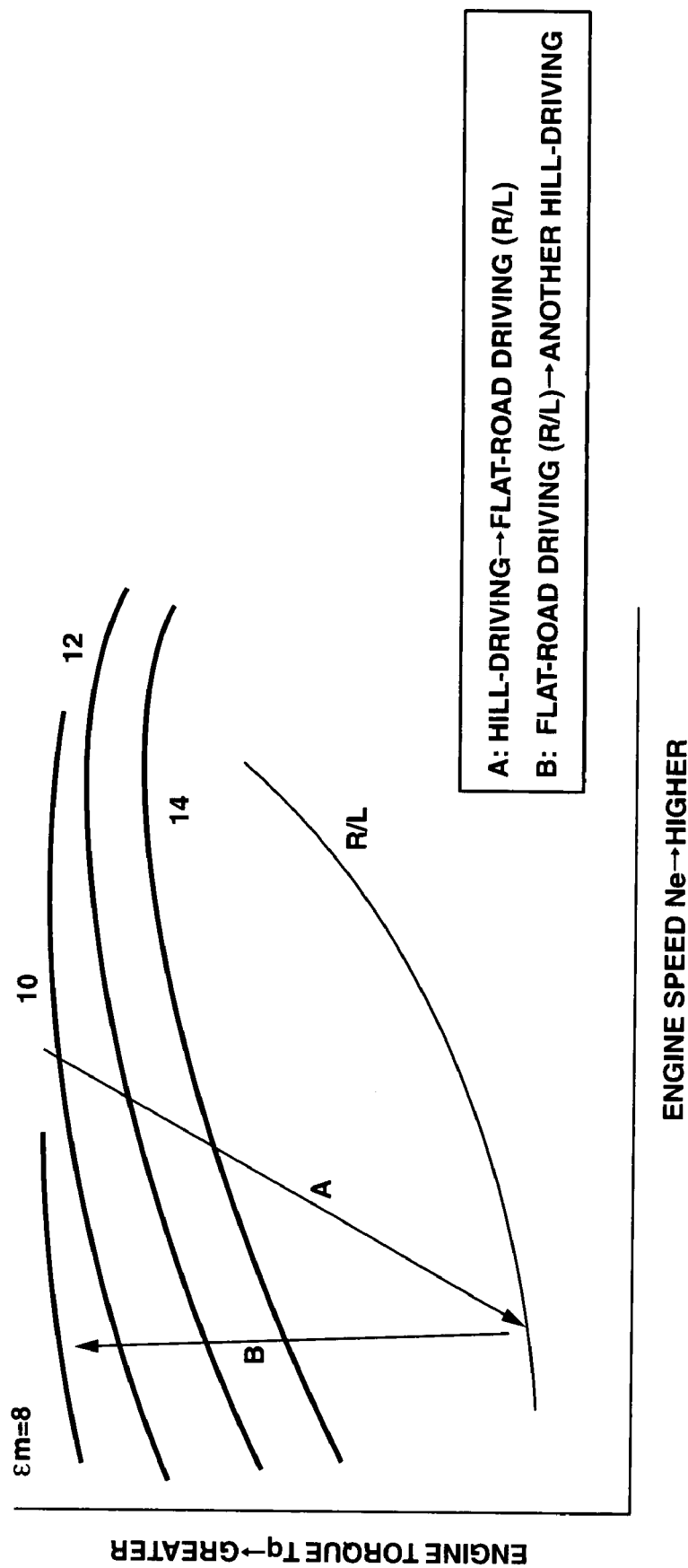
FIG. 6 is a target compression ratio ∈m characteristic map stored in memories of the compression ratio control system shown in FIG. 5.

Referring now to FIG. 6, there is shown the preprogrammed target compression ratio $\epsilon m$ characteristic map showing how target compression ratio $\epsilon m$ varies depending on engine torque (engine load) as well as engine speed Ne. As seen from the target compression ratio $\epsilon m$ characteristic map of FIG. 6, in a full engine load range at low engine speeds, the wall surface temperature of the combustion chamber, that is, the temperature of the ceramic thermal-insulating wall surface portion as shown in FIGS. 3B and 4B, becomes high and thus there is an increased tendency for engine knock to occur. Therefore, in the full engine load range at low speeds, target compression ratio $\epsilon m$ is set to "8". Of course, when the engine is still cold during engine warm-up, target compression ratio $\epsilon m$ may be set to a somewhat higher value (e.g., "10") than "8". Conversely, in a part engine load range whose condition is often abbreviated to "R/L (Road/load)" substantially corresponding to a ¼ throttle opening, such as during flat-road driving (R/L) of the vehicle, there is a less tendency of knocking. Therefore, in the part engine load range, target compression ratio $\epsilon m$ is risen up to approximately "14", for improved fuel economy. In a full engine load range at high engine speeds, there is a less tendency of knocking, and thus target compression ratio $\epsilon m$ is set to a comparatively high value, for enhanced thermal efficiency and increased engine power output.

As discussed above, according to the preprogrammed target compression ratio $\epsilon m$ characteristic map of FIG. 6, under a low engine load condition, target compression ratio $\epsilon m$ is set to a high value. Conversely, under a high engine load condition, target compression ratio $\epsilon m$ is set to a relatively low value, in comparison with the low engine load condition. In a high engine speed range, target compression ratio $\epsilon m$ is set to a high value. Conversely in a low engine speed range, target compression ratio $\epsilon m$ is set to a relatively low value, in comparison with the high-speed driving state.

Even during part load operation (even during flat-road driving (R/L)), owing to the history of the hill-driving state before the transition to the flat-road driving state, for example, the elapsed time after the transition from the hill-driving state to the flat-road driving state, there is the situation that combustion temperature is still high and thus it takes a long time until the combustion-chamber temperature falls to below a target temperature value (i.e., a target temperature level T0 described later in reference to FIGS. 8A-8E). In such a situation, it is possible to indirectly estimate the state of combustion-chamber temperature by detecting the history of engine load conditions, for example, the history of engine torque Tq (engine load) for a predetermined time interval just before the transition to the flat-road driving state. Hereunder described in detail is the previously-discussed situation by reference to the time charts shown in FIGS. 7 and 8A-8E.

Figure 7:
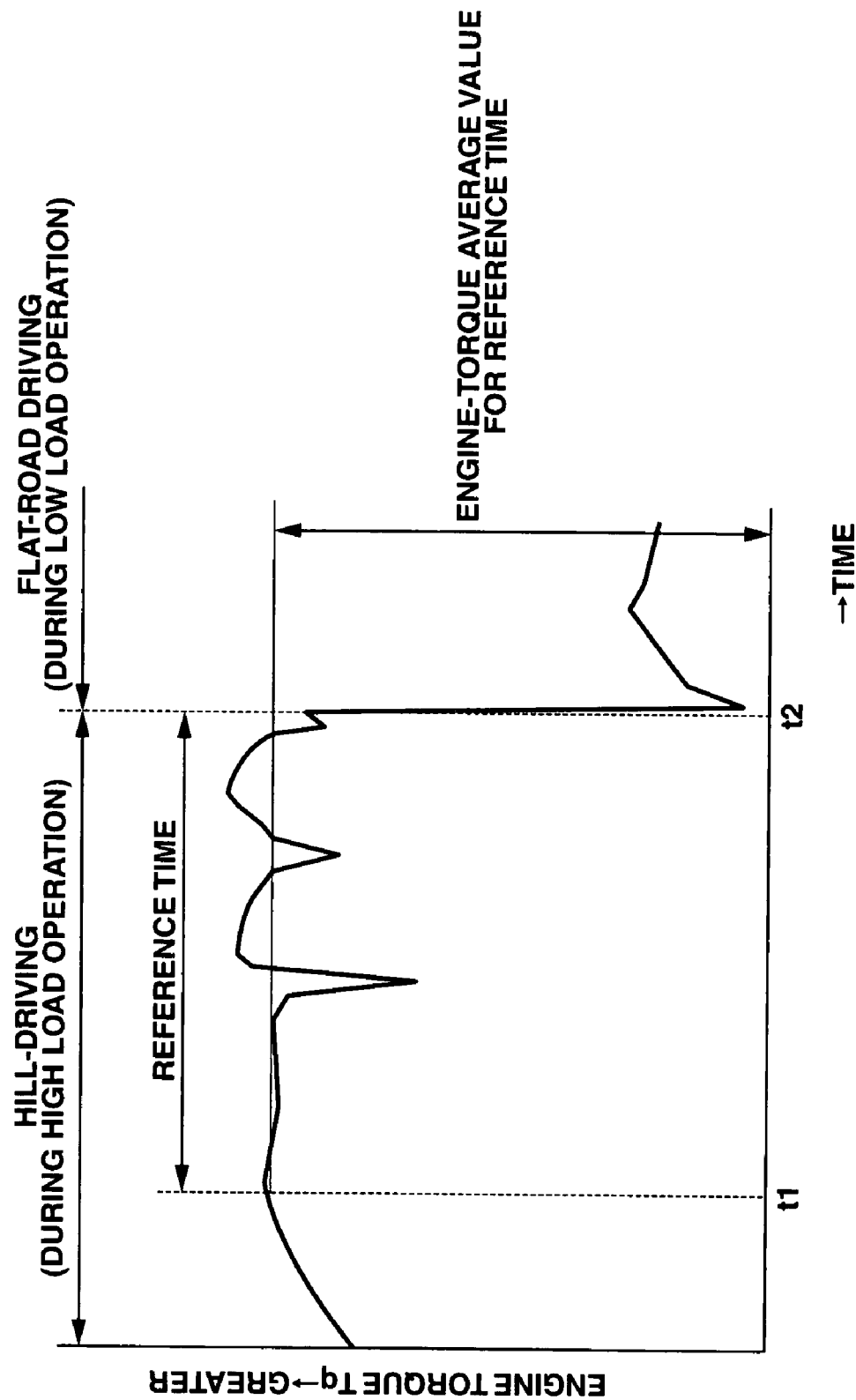
FIG. 7 is an engine-torque waveform characteristic diagram illustrating a change in engine torque obtained by the engines of the first and second embodiments, just before a transition from a hill driving state (high-load driving) to a flat-road steady-state driving state (low load driving or part load driving whose condition is often abbreviated to "R/L" substantially corresponding to a ¼ throttle opening).
Figure 8:
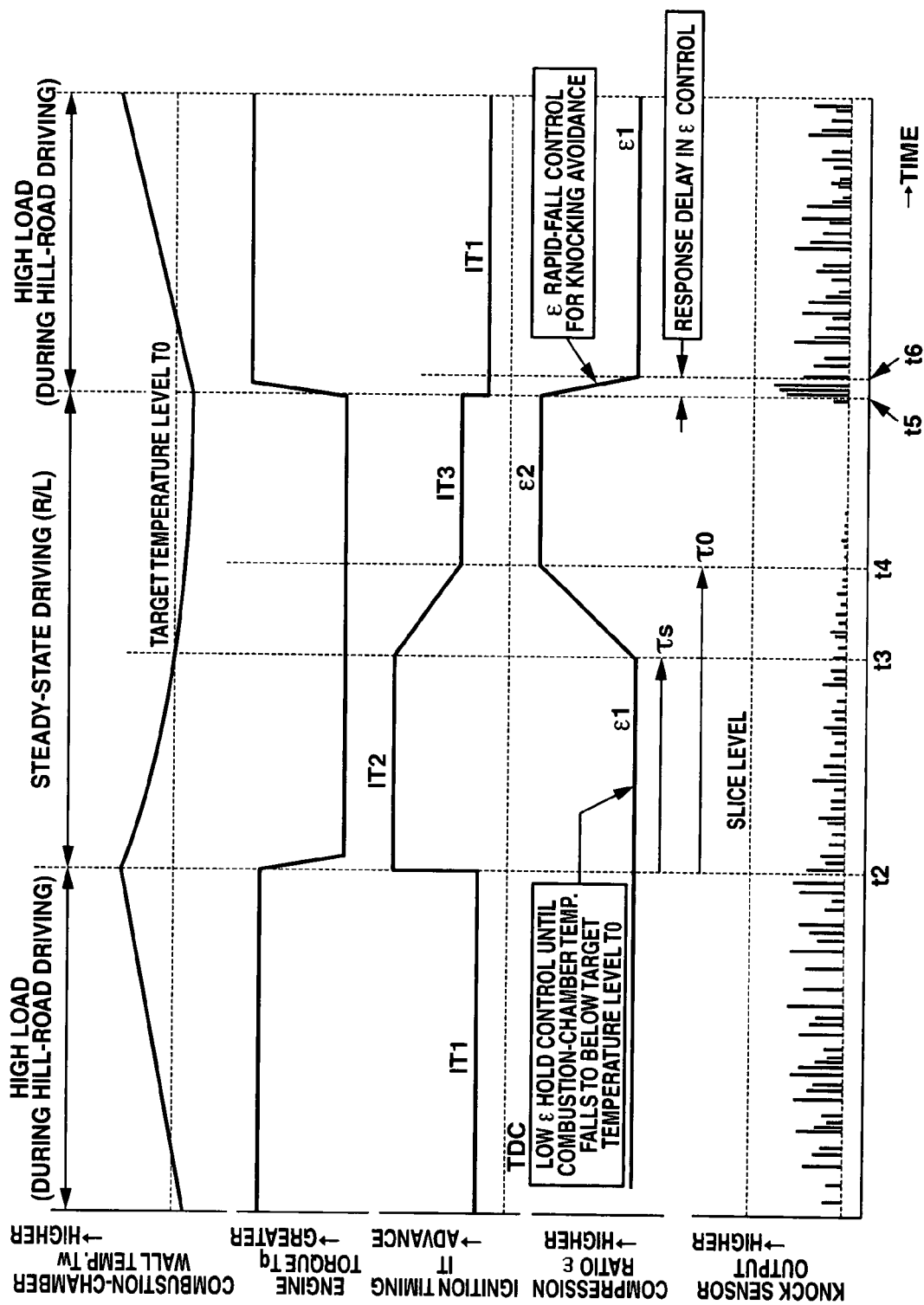
FIGS. 8A-8E are time charts respectively illustrating a combustion-chamber wall surface temperature (simply, a combustion-chamber wall temperature) Tw, engine torque Tq, ignition timing IT, engine compression ratio ∈, and knock sensor signal output, obtained by the engines of the first and second embodiments.

Referring to FIGS. 8A-8E, there are shown the time charts illustrating the respective changes in combustion-chamber wall temperature Tw (detected by combustion-chamber wall temperature sensor 63), engine torque Tq, ignition timing (ignition-timing command value IT), engine compression ratio (exactly, geometrical compression ratio) $\epsilon$, and sensor signal output from knock sensor 61, obtained by the engines of the first and second embodiments, in the presence of a transition from a high engine load condition (e.g., hill-driving) to a low engine load condition (e.g., flat-road steady-state driving) at a point of time t2 and a next transition from the low load condition to another high load condition at a point of time t5. On the other hand, FIG. 7 shows details of the engine-torque change during the high load condition just before the point of time t2 of the transition to the low load condition. In FIG. 7, the point of time denoted by "t1" means a point of time before a preset reference time (described later) from the time t2. As seen in FIGS. 8A, 8B, and 8D, target compression ratio $\epsilon m$ is set to a low value (i.e., a first compression ratio $\epsilon 1$) under the high engine load condition before the time t2. As best seen in FIG. 8A, when the engine is operating continuously at the high-load operating mode before the time t2, combustion-chamber wall temperature Tw greatly exceeds a target temperature level T0. Assuming that target compression ratio εm is switched to a high value (i.e., a second compression ratio ε2 suited to flat-road steady-state driving) at the time t2 of the transition to the low engine load condition, in spite of such an excessive combustion-chamber wall temperature greatly exceeding the target temperature level T0, undesirable knocking may take place. In other words, when combustion-chamber wall temperature Tw becomes above target temperature level T0 just before the transition to the low engine load condition, it is necessary to retard switching from $1^{st}$ compression ratio ε1 suited to high engine load operation to $2^{nd}$ compression ratio ε2 suited to low engine load operation, until combustion-chamber wall temperature Tw reaches target temperature level T0.

In setting a delay time τs, by which switching from $1^{st}$ compression ratio ε1 suited to high engine load operation to $2^{nd}$ compression ratio ε2 suited to low engine load operation is retarded after the transition (i.e., the time t2) from high engine load operation to low engine load operation, first of all, the processor of ECU 39 calculates an engine-torque average value (in other words, an average load factor Pm) for the preset reference time, that is, for the time interval t1-t2, retroactively to the point of time t1 before the preset reference time from the time t2. Next, on the basis of the calculated engine-torque average value for the preset reference time (i.e., for the time interval t1-t2), the processor estimates combustion-chamber wall temperature Tw. When the calculated engine-torque average value for the preset reference time (i.e., for the time interval t1-t2) is equal to a reference torque value, it is determined that combustion-chamber wall temperature Tw of the high engine load condition is identical to the target temperature level. The processor determines or estimates that a temperature difference (i.e., a temperature-rise rate) of combustion-chamber wall temperature Tw from the target temperature level increases, as the calculated engine-torque average value for the preset reference time t1-t2 exceeds the reference torque value and further increases. Therefore, as can be seen from the delay time τs characteristic diagram shown in FIG. 10, when the calculated engine-torque average value for the preset reference time t1-t2 is identical to the reference torque value, delay time τs is set to zero so as to quickly perform switching from $1^{st}$ compression ratio ε1 suited to high engine load operation to $2^{nd}$ compression ratio ε2 suited to low engine load operation. Delay time τs lengthens, as the calculated engine-torque average value for the preset reference time t1-t2 exceeds the reference torque value and further increases. FIG. 8D shows an example that switching from $1^{st}$ compression ratio ε1 suited to high engine load operation to $2^{nd}$ compression ratio ε2 suited to low engine load operation initiates from a point of time t3 with a delay time τs from the time t2 (from the transition to the low load condition).

As discussed above, even when combustion-chamber wall temperature Tw exceeds the target temperature level just before the transition from the high engine load condition to the low engine load condition, it is possible to effectively avoid, by way of retardation (see the delay time τs in FIG. 8D) of ε1-to-ε2 switching, undesirable knocking, which may occur owing to an excessive combustion-chamber wall temperature greatly exceeding target temperature level T0 when quickly immediately switching target compression ratio εm from ε1 to ε2 just after the transition from the high engine load condition to the low engine load condition.

Returning to the time charts of FIGS. 8A-8E, according to target compression ratio εm control processing executed within the processor of ECU 39, target compression ratio εm recovers or returns to $2^{nd}$ compression ratio ε2 gradually from the time t3. At a point of time t4 where a predetermined time τ0 has expired from the time t2, target compression ratio εm becomes identical to $2^{nd}$ compression ratio ε2 suited to low engine load operation. Thereafter, when the engine operating condition is switched again to a high engine load condition at a point of time t5, target compression ratio εm is immediately switched to $1^{st}$ compression ratio ε1 (suited to high engine load operation) for knocking avoidance. Actually, there is a response delay of ε control actuator 16, in other words, a response delay of ε control. Thus, the actual geometrical compression ratio ε is settled down to $1^{st}$ compression ratio ε1 suited to high engine load operation at a point of time t6 retarded from the time t5. Owing to such an ε-control response delay, during the time interval t5-t6, the sensor signal output level from knock sensor 61 tends to become high. Under engine/vehicle operating conditions except transient operating conditions, a variation in actual geometrical compression ratio ε becomes substantially identical to a variation in target compression ratio εm. As discussed above, during the transient operating condition, such as during switching between high and low engine load operations, a variation in actual geometrical compression ratio ε tends to deviate from a variation in target compression ratio εm. In particular, during the time interval t5-t6 in FIG. 8D, the target compression ratio εm has been rapidly switched to $1^{st}$ compression ratio ε1 suited to high engine load operation at the time t5, whereas the actual compression ratio ε has been controlled or adjusted to $1^{st}$ compression ratio ε1 suited to high engine load operation with a slight response delay from the time t5 to the time t6.

As discussed previously in reference to time charts shown in FIGS. 7 and 8A-8E, combustion-chamber wall temperature Tw is indirectly computed or derived as an estimated value determined based on the engine-torque average value (i.e., engine load factor Pm, serving as a parameter indicative of the state of combustion-chamber temperature) for the reference time (see the time interval t1-t2 in FIG. 7). Instead of using the estimated combustion-chamber wall temperature, the detected value of combustion-chamber wall temperature Tw, which is detected directly by means of combustion-chamber wall temperature sensor 63 shown in FIG. 5 may be used for the ε control. In the shown embodiment, combustion-chamber wall temperature sensor 63 is constructed by a thermocouple. Dissimilar conductors of the thermocouple (combustion-chamber wall temperature sensor 63) are located at cylinder block 1 or near the combustion chamber 62 of the engine cylinder head. On the other hand, ignition timing control is made as discussed hereunder.

Referring to FIG. 8C, at the time t2, the ignition timing (i.e., ignition-timing command value IT) is immediately advanced from a first ignition timing value IT1 suited to high engine load operation to a second ignition timing value IT2 suited to low engine load operation. In accordance with the gradual increase in target compression ratio εm during the time interval t3-t4, ignition timing IT is gradually retarded from $2^{nd}$ ignition timing IT2 to a third ignition timing value IT3 (an intermediate value between $1^{st}$ and $2^{nd}$ ignition timings IT1 and IT2). After the time t4, ignition timing IT is kept at $3^{rd}$ ignition timing IT3 for a while. At the time t5 when switching from the low engine load condition to the high engine load condition occurs, ignition timing IT is immediately retarded from $3^{rd}$ ignition timing IT3 to $1^{st}$ ignition timing IT1 suited to high engine load operation.

As previously explained in reference to the time charts of FIGS. 8A-8E, during a transient state wherein the engine/ vehicle operating condition is transferred from a hill-road driving condition (high engine load operation) to a flat-road steady-state driving condition (low engine load operation) and then transferred again to a hill-road driving condition (high engine load operation), when the first hill-driving time interval is long, the combustion-chamber wall surface temperature rises and thus the intake air temperature (or the air-fuel mixture temperature) also rises. In such a situation, undesirable knocking tends to occur. During the first hill-driving (high-engine-load) time interval, by virtue of target compression ratio εm set to a low value (e.g., ε1), there is a less risk of engine knock. Under these conditions, when the engine/vehicle operating condition transfers to the flat-road steady-state driving condition (part-load operation), ignition timing IT is advanced owing to an engine load decrease (see the time t2 of FIGS. 8B-8C). On the other hand, target compression ratio εm is not set rapidly to a high value (e.g., ε2), but kept at the low value (e.g., ε1) for the previously-noted delay time τs. From the point of time t3 when delay time τs has expired from the time t2 (the high-to-low engine load transition point), target compression ratio εm is gradually increased to the high value (e.g., ε2). Therefore, by way of low ε hold control (see the time interval t2-t3 in FIG. 8D) and gradual ε increase control (see the time interval t3-t4 in FIG. 8D), after the predetermined time τ0 has expired from the time t2, target compression ratio εm becomes adjusted to the high value (e.g., ε2) suited to part load operation. For the summed time interval of the time interval t2-t3 (i.e., delay time τs) needed for low ε hold control and the time interval t3-t4 (i.e., predetermined time τ0) needed for gradual ε increase control, the combustion-chamber wall temperature adequately falls to below the target temperature level T0. Thus, even when the transition from the flat-road steady-state driving condition (part load operation) to the second hill-driving condition (high load operation) occurs, it is possible to effectively avoid knocking to occur. Thus, at the time t5 (the low-to-high engine load transition point), target compression ratio εm is immediately switched to the low value (e.g., ε1) suited to high engine load operation. On the other hand, the actual geometrical compression ratio ε is controlled to the low value (e.g., ε1) with a slight response delay (of variable compression ratio mechanism 20) from the time t5 to the time t6. In the case of the adequate long flat-road steady-state driving period t2-t5, the combustion-chamber wall temperature (or the piston temperature) is still kept below the target temperature level T0 ad therefore the knocking level is effectively suppressed to a feeble knocking condition (a permissible level).

As can be appreciated, proper settings of the previously-noted predetermined time τ0 and delay time τs are greatly affected by the combustion-chamber wall temperature at the high-to-low engine load transition point. Thus, it is necessary to increase predetermined time τ0 (or delay time τs), as the combustion-chamber wall temperature increases. It is desirable to variably set the previously-noted predetermined time τ0 and delay time τs depending on the estimated value of combustion-chamber wall temperature Tw, indirectly computed based on the engine-torque average value (i.e., engine load factor Pm) for the reference time (see the time interval t1-t2 in FIG. 7), or the detected value of combustion-wall temperature Tw, detected directly by means of combustion-chamber wall temperature sensor 63 (e.g., a thermocouple).

Figure 9:
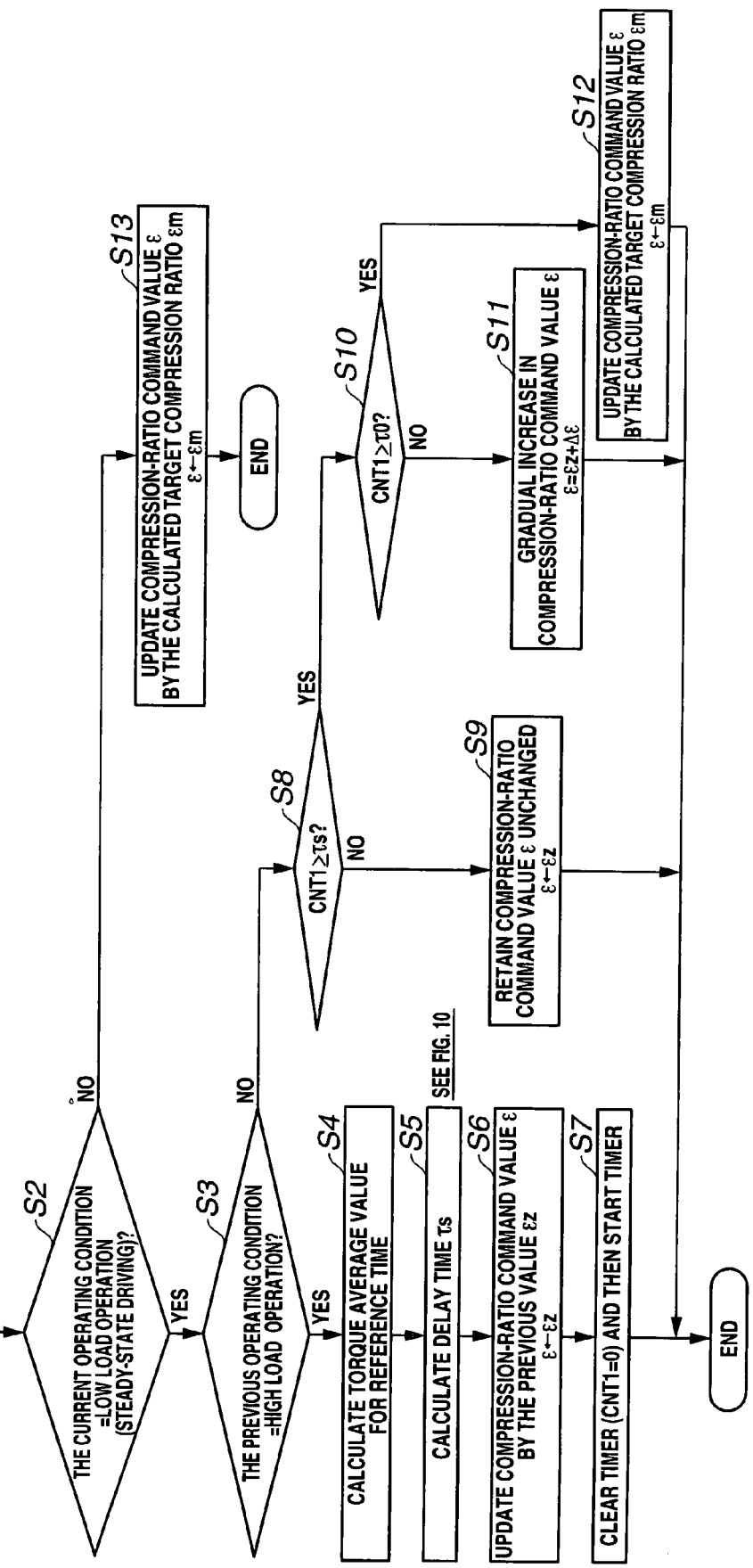
FIG. 9 is a flow chart illustrating an arithmetic routine used to determine a compression-ratio command value ∈ for the compression ratio control system employed in each of the engines of the first and second embodiments.

Referring now to FIG. 9, there is shown the compression-ratio command value ε arithmetic routine executed within the processor of ECU 39. The arithmetic processing shown in FIG. 9 is executed as time-triggered interrupt routines to be triggered every predetermined sampling time intervals (every execution cycles) such as 10 milliseconds.

At step S1, target compression ratio εm is calculated or retrieved, based on latest up-to-date information concerning engine speed Ne and engine load (i.e., engine torque Tq), from the preprogrammed target compression ratio εm characteristic map shown in FIG. 6.

At step S2, a check is made to determine whether the current engine operating condition (the latest up-to-date information concerning engine speed Ne and engine load) corresponds to a low engine load condition (e.g., flat-road steady-state driving). When the answer to step S2 is affirmative (YES), the routine proceeds from step S2 to step S3.

At step S3, a check is made to determine whether the previous engine operating condition (detected one execution cycle before) corresponds to a high engine load condition (e.g., hill-driving).

When the current engine operating condition corresponds to the low engine load condition and the previous engine operating condition corresponds to the high engine load condition, that is, just after a transition from the high engine load condition to the low engine load condition has occurred, the routine proceeds from step S3 to step S4. Conversely when the current engine operating condition corresponds to the low engine load condition and the previous engine operating condition does not correspond to the high engine load condition, the routine proceeds from step S3 to step S8.

At step S4, an engine-torque average value for the preset reference time is calculated. After step S4, step S5 occurs.

At step S5, delay time τs, by which switching from $1^{st}$ compression ratio ε1 suited to high engine load operation to $2^{nd}$ compression ratio ε2 suited to low engine load operation is retarded after the transition from high engine load operation to low engine load operation, is calculated or retrieved, based on the calculated engine-torque average value for the preset reference time, from the delay time τs characteristic diagram of FIG. 10. As previously described, even when switching from high engine load operation to low engine load operation has occurred, target compression ratio εm can be kept at $1^{st}$ compression ratio ε1 suited to high engine load operation for the delay time τs from the high-to-low load switching point. After step S5, step S6 occurs.

At step S6, the current value of compression-ratio command value ε is updated by the previous value εz, in other words, $1^{st}$ compression ratio ε1 suited to high engine load operation. After step S6, step S7 occurs.

At step S7, a count value of CNT1 of a timer is initialized to zero (that is, CNT1=0) and then the timer starts. The timer serves to measure the elapsed time from the high-to-low load switching point.

At the subsequent execution cycle occurring after a series of steps S1-S7, the answer to step S2 becomes affirmative (YES) and the answer to step S3 becomes negative (NO) and thus the routine proceeds from step S3 to step S8.

At step S8, a check is made to determine whether the timer count value CNT1 is greater than or equal to the calculated delay time τs (retrieved through step S5). At first (e.g., just after the timer starts), the timer count value CNT1 is less than the calculated delay time τs, and thus the routine flows from step S8 to step S9.

At step S9, compression-ratio command value ε is retained unchanged, that is, ε←εz. Steps S2, S3, S8, and S9 (see the flow from step S2 via steps S3 and S8 to step S9 in FIG. 9) are repeatedly executed, until the timer count value CNT1 reaches the calculated delay time τs under the low engine load condition. In other words, target compression ratio εm is maintained at $1^{st}$ compression ratio ε1 suited to high engine load operation, until the timer count value CNT1 reaches the calculated delay time τs under the low engine load condition.

As soon as the timer count value CNT1 reaches the calculated delay time τs, the routine proceeds from step S8 to step S10.

At step S10, a check is made to determine whether the timer count value CNT1 is greater than or equal to a predetermined time τ0. The difference (τ0−τs) between of predetermined time τ0 and the calculated delay time τs means a recovery time by which target compression ratio εm is gradually recovered from $1^{st}$ compression ratio ε1 suited to high engine load operation to $2^{nd}$ compression ratio ε2 suited to low engine load operation. Just after switching from the flow from step S2 via steps S3 and S8 to step S9 to the flow from step S2 via steps S3 and S8 to step S10, the timer count value CNT1 is still less than the predetermined time τ0, and thus the routine proceeds from step S10 to step S11.

At step S11, compression-ratio command value ε is incremented by a predetermined increment value Δε, as represented by the following expression (1).

$$\epsilon = \epsilon z + \Delta\epsilon \qquad (1)$$

where εz denotes the previous value of compression-ratio command value ε and Δε denotes an increment value per one execution cycle (i.e., per 10 milliseconds).

Steps S2, S3, S10, and S11 (see the flow from step S2 via steps S3 and S10 to step S11 in FIG. 9) are repeatedly executed, until the timer count value CNT1 reaches the predetermined time τ0. Repeatedly executing step S11 causes a gradual increase in compression-ratio command value ε.

Thereafter, as soon as the timer count value CNT1 reaches the predetermined time τ0, the routine flows from step S2 via steps S3, S8, and S10 to step S12.

At step S12, compression-ratio command value ε is updated by target compression ratio εm calculated through step S1. In this manner, switching of target compression ratio εm from $1^{st}$ compression ratio ε1 suited to high engine load operation to $2^{nd}$ compression ratio ε2 suited to low engine load operation has been completed.

In contrast to the above, when the answer to step S2 is negative (NO), that is, the current engine operating condition does not correspond to the low engine load condition, the routine proceeds from step S2 to step S13.

At step S13, compression-ratio command value ε is updated by target compression ratio εm calculated through step S1. For instance, when the engine operating condition has been switched to a high engine load condition after the timer count value CNT1 has reached the predetermined time τ0 under the low engine load condition, the routine advances from step S2 to step S13, thereby enabling immediate switching of the geometrical compression ratio (compression-ratio command value ε) to target compression ratio εm suited to high engine load operation (i.e., $1^{st}$ compression ratio ε1).

Compression ratio control actuator 16 is driven responsively to the compression-ratio command value ε calculated according to the arithmetic processing shown in FIG. 9 and generated from ECU 39.

Referring now to FIG. 11, there is shown the ignition-timing command value IT arithmetic routine executed within the processor of ECU 39. The arithmetic processing shown in FIG. 11 is also executed as time-triggered interrupt routines to be triggered every predetermined sampling time intervals (every execution cycles) such as 10 milliseconds. The ignition-timing command value IT arithmetic processing of FIG. 11 utilizes the arithmetic calculation results (computational results) obtained through the compression-ratio command value ε arithmetic routine of FIG. 9. Thus, the IT arithmetic routine of FIG. 11 is executed subsequently to the ε arithmetic routine of FIG. 9.

At step S21, a target ignition timing value ITm (simply, target ignition timing ITm) is calculated or retrieved, based on latest up-to-date information concerning engine speed Ne and engine load (i.e., engine torque Tq), from a predetermined or programmed target ignition timing ITm characteristic map (not shown). Generally, there is a risk of knocking during a high engine load condition at a low compression ratio, and thus the ignition timing is retarded in comparison with a low engine load condition at a high compression ratio (see $1^{st}$ ignition timing IT1 suited to high engine load operation and retarded in comparison with $3^{rd}$ ignition timing IT3 in FIG. 8C).

At step S22, a check is made to determine whether the current engine operating condition (the latest up-to-date information concerning engine speed Ne and engine load) corresponds to a low engine load condition (e.g., flat-road steady-state driving). When the answer to step S22 is affirmative (YES), the routine proceeds from step S22 to step S23.

At step S23 of FIG. 11, in a similar manner to step S8 of FIG. 9, a check is made to determine whether the timer count value CNT1 is greater than or equal to the calculated delay time τs (retrieved through step S5 of FIG. 9).

At step S24 of FIG. 11, in a similar manner to step S10 of FIG. 9, a check is made to determine whether the timer count value CNT1 is greater than or equal to the predetermined time τ0.

When the answer to step S22 is affirmative (YES) and the answer to step S23 is negative (NO), that is, when the current engine operating condition corresponds to the low engine load condition and the timer count value CNT1 does not yet reach the calculated delay time τs, the routine proceeds from step S22 via step S23 to step S28.

At step S28, ignition-timing command value IT is updated by $2^{nd}$ ignition timing IT2 suited to low engine load operation, that is, IT←IT2. Concretely, ignition-timing command value IT is kept at $2^{nd}$ ignition timing IT2 suited to low engine load operation, as discussed below. Steps S22, S23, and S28 (see the flow from step S22 via step S23 to step S28 in FIG. 11) are repeatedly executed, until the timer count value CNT1 reaches the calculated delay time τs under the low engine load condition. That is, ignition-timing command value IT is kept at the phase-advanced $2^{nd}$ ignition timing IT2 suited to low engine load operation until switching of target compression ratio εm to a high compression ratio (i.e., $2^{nd}$ compression ratio ε2 suited to flat-road steady-state driving) starts under the low engine load condition. The $2^{nd}$ ignition timing IT2 is phase-advanced rather than the $3^{rd}$ ignition timing IT3. This is because, according to the low ε hold control (see the flow from step S3 via step S8 to step S9 in FIG. 9 and the compression-ratio change during the time interval t2-t3 in FIG. 8D), target compression ratio εm (or compression-ratio command value ε) is kept at a low compression ratio (i.e., $1^{st}$ compression ratio ε1 suited to high engine load operation such as hill-driving), until the timer count value CNT1 reaches the calculated delay time τs under the low engine load condition.

During a time interval from the point of time (see the time t3 in FIGS. 8A-8E) when the timer count value CNT1 reaches the calculated delay time τs under the low engine load condition to the point of time (see the time t4 in FIGS. 8A-8E) when the timer count value CNT1 reaches the predetermined time τ0, steps S22, S23, S24, and S25 (see the flow from step S22 via steps S23 and S24 to step S25 in FIG. 11) are repeatedly executed.

At step S25, ignition-timing command value IT is decremented by a predetermined decrement value ΔIT, as represented by the following expression (2).

$$IT = ITz - \Delta IT \quad (2)$$

where ITz denotes the previous value of ignition-timing command value IT and ΔIT denotes a decrement value per one execution cycle (i.e., per 10 milliseconds).

The unit of ignition-timing command value IT is generally represented in terms of crank angle before top dead center, that is, degBTDC. Therefore, an increase in ignition-timing command value IT means a phase-advance of ignition timing. In contrast, a decrease in ignition-timing command value IT means a phase-retard of ignition timing.

As previously discussed, steps S22, S23, S24, and S25 (see the flow from step S22 via steps S23-S24 to step S25 in FIG. 11) are repeatedly executed, until the timer count value CNT1 reaches the predetermined time τ0. Repeatedly executing step S25 causes a gradual decrease (i.e., a gradual retard) in ignition-timing command value IT.

Thereafter, as soon as the timer count value CNT1 reaches the predetermined time τ0, the routine flows from step S22 via steps S23-S24 to step S26.

At step S26, ignition-timing command value IT is retained unchanged. Concretely, ignition-timing command value IT is updated by the previous value ITz, that is, IT←ITz. More concretely, after the timer count value CNT1 has reached the predetermined time τ0, steps S22, S23, S24, and S26 (see the flow from step S22 via steps S23-S24 to step S26 in FIG. 11) are repeatedly executed, and as a result ignition-timing command value IT is kept at the ignition-timing command value calculated at the point of time when the timer count value CNT1 had reached the predetermined time τ0.

In contrast to the above, when the answer to step S22 is negative (NO), that is, the current engine operating condition does not correspond to the low engine load condition, the routine proceeds from step S22 to step S27.

At step S27, ignition-timing command value IT is updated by target ignition timing value ITm calculated through step S21. For instance, when the engine operating condition has been switched to a high engine load condition after the timer count value CNT1 has reached the predetermined time τ0 under the low engine load condition, the routine advances from step S22 to step S27, thereby enabling immediate switching of the ignition timing (ignition-timing command value IT) to target ignition timing ITm suited to high engine load operation (i.e., $1^{st}$ ignition timing IT1).

Ignition device 41 is controlled responsively to the ignition-timing command value IT calculated according to the arithmetic processing shown in FIG. 11 and generated from ECU 39.

Hereinafter described in detail are the operation and effects of the engines of the first and second embodiments.

According to the first and second embodiments, in the engine having reciprocating piston 9 movable through a stroke in cylinder 10, variable compression ratio mechanism 20 configured to be linked to reciprocating piston 9 for variably adjusting a compression ratio (exactly, a geometrical compression ratio) by varying at least the piston top dead center (TDC) position responsively to a controlled variable corresponding to a driving signal applied to ε control actuator 16, and controller 39 configured to be electronically connected to variable compression ratio mechanism 20 for controlling variable compression ratio mechanism 20 by changing the controlled variable depending on an engine operating condition, a part of a wall surface of combustion chamber 62 (for example, the surface layer of the piston crown, the inner periphery of the cylinder, the inside wall surface of the valve head portion of an intake valve and/or an exhaust valve, and the like) is formed of a non-metallic material (such as a ceramic material) having a higher heat-insulating and heat-reserving effect as compared to a base material of each of combustion chamber 62 and reciprocating piston 9. Therefore, it is possible to reduce a cooling loss under a low thermal load condition, thus enhancing a thermal efficiency of the engine.

According to the first and second embodiments, at low engine load operation, target compression ratio εm is set to a high value. Conversely at high engine load operation, target compression ratio εm is set to a relatively low value, as compared to the target compression ratio set at the low engine load operation. For instance, from a predetermined engine-load versus target compression ratio εm map, target compression ratio εm is calculated or retrieved based on engine load (see step S1 in FIG. 9). Controller 39 controls or changes a controlled variable of the ε control system, that is, a driving signal applied to ε control actuator 16 of variable compression ratio mechanism 20, to bring the actual geometrical compression ratio ε closer to the calculated target compression ratio εm, determined based on the engine load (e.g., engine torque Tq). Thus, during the low engine load operation, it is possible to enhance the thermal efficiency while reducing the cooling loss by keeping compression ratio ε high. Conversely during the high engine load operation, it is possible to suppress the occurrence of knocking by keeping compression ratio ε low. By way of a combination of compression ratio control (simply, ε control) based engine operating conditions (in particular, engine load) and the use of the non-metallic material having a high heat-insulating and heat-reserving effect and constructing a part of the combustion chamber, it is possible to achieve improved fuel economy (reduced fuel consumption) by a synergistic effect of knocking avoidance and enhanced thermal insulation (enhanced heat insulation).

According to the first and second embodiments, at high engine speed operation, target compression ratio εm is set to a high value. Conversely at low engine speed operation, target compression ratio εm is set to a relatively low value, as compared to the target compression ratio set at the high engine speed operation. For instance, from a predetermined engine-speed versus target compression ratio εm map, target compression ratio εm is calculated or retrieved based on engine speed Ne (see step S1 in FIG. 9). Controller 39 controls or changes a controlled variable of the ε control system, that is, a driving signal applied to ε control actuator 16 of variable compression ratio mechanism 20, to bring the actual geometrical compression ratio ε closer to the calculated target compression ratio εm, determined based on the engine speed Ne. Thus, during the low speed operation, it is possible to suppress the occurrence of knocking. Conversely during the high speed operation during which there is a less tendency for engine knock to occur, it is possible to enhance engine power output by enhancing a thermal efficiency.

As set out above, in the engine of each of the first and second embodiments, employing variable compression ratio mechanism 20 (the multi-link type reciprocating piston crank mechanism), when the piston stroke characteristic is set or brought closer to a simple harmonic oscillation, on the one hand, it is possible to provide a vibration-reducing effect that eliminates the necessity for a balancer shaft or balance weight adjustment (in four-cylinder engines). On the other hand, the piston stroke velocity of the engine employing variable compression ratio mechanism 20 near the piston TDC position becomes slow, as compared to the typical single-link type piston crank mechanism whose piston stroke characteristic is fixed to the same TDC-to-BDC piston stroke as that of the variable compression ratio mechanism (the multi-link type piston crank mechanism) 20. The slow piston stroke velocity near TDC means an increase in cooling loss. In the reciprocating engines of the first and second embodiments shown in FIGS. 3B and 4B, a part of the wall surface of combustion chamber 62 is formed of the non-metallic material (such as a ceramic material) having a high heat-insulating and heat-reserving effect. Thus, in the reciprocating engine having the piston stroke characteristic close to a simple harmonic oscillation, it is possible to avoid the cooling loss from increasing.

In the first and second embodiments, the reciprocating engine may further include the following elements.

(1) Knock sensor 61 (a knock detector) is further provided for detecting a frequency σ of occurrences of knocking and/or an intensity (or a level) of knocking and for generating a knock sensor signal indicating the frequency σ of occurrences of knocking and/or the knocking level. When a level of the knock sensor signal becomes greater than a predetermined threshold value, compression-ratio command value ϵ calculated or computed through the arithmetic routine shown in FIG. 9 is compensated and decreased.

(2) Wall temperature sensor 63 (a combustion-chamber wall temperature detector) is further provided for detecting a wall surface temperature Tw of combustion chamber 62 and for generating a wall temperature sensor signal indicating the combustion-chamber wall temperature Tw. When a signal value of the wall temperature sensor signal becomes greater than a predetermined temperature value, compression-ratio command value ϵ (in other words, target compression ratio ϵm) which is calculated or computed through the arithmetic routine shown in FIG. 9, is compensated and decreased.

(3) A margin-of-safety estimation circuit is further provided for estimating, based on a history of an engine operating condition including at least the engine load (engine torque Tq), an index of a margin for occurrences of knocking, and for estimating, based on the estimated index, a rate of occurrences of knocking. When the estimated rate of occurrences of knocking exceeds a predetermined rate, the processor (i.e., an engine-knock prediction section) of controller 39 determines or predicts that knocking takes place, and then compression-ratio command value ϵ (in other words, target compression ratio ϵm) calculated or computed through the arithmetic routine shown in FIG. 9 is compensated and decreased.

Figure 12A:
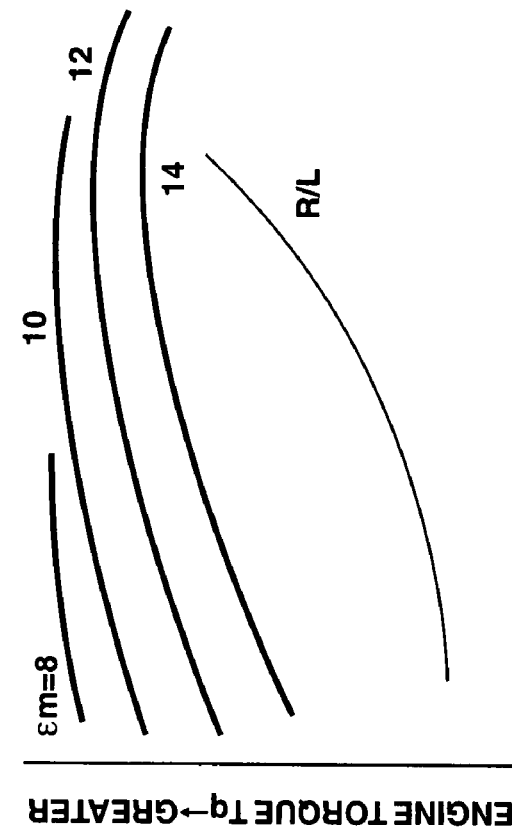
FIGS. 12A-12B are two different target compression ratio characteristic diagrams, respectively suited to a low engine thermal load condition (e.g., wall temperatures Tw of 150° C.
Figure 12B:
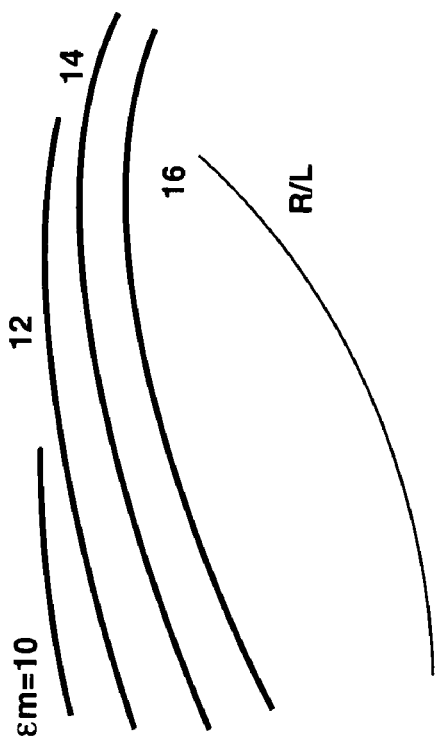

Referring now to FIGS. 12A-12B, there are shown the two different target compression ratio ϵm characteristic maps used within ECU 39 incorporated in the engine of the third embodiment. The third embodiment slightly differs from the first and second embodiments, in that ECU 39 incorporated in the engine of each of the first and second embodiments uses the target compression ratio ϵm characteristic map shown in FIG. 6, whereas ECU 39 incorporated in the engine of the third embodiment uses the two different target compression ratio ϵm characteristic maps shown in FIGS. 12A-12B. Basically, the construction of the reciprocating engine of the third embodiment is similar to that of each of the first and second embodiments, in that the thermal-insulation piston and liner structure shown in FIG. 3B or the thermal-insulation piston and two-split cylinder liner structure shown in FIG. 4B is applied to the reciprocating engine employing variable compression ratio mechanism 20 shown in FIG. 1. Concretely, regarding a method to control both of compression ratio (exactly, geometrical compression ratio) ϵ and ignition timing IT, the third embodiment somewhat differs from the first and second embodiments. More concretely, ECU 39 of the reciprocating engine of the third embodiment selectively uses either one of a first Ne-Tq-ϵm map suited to a low thermal load condition and a second Ne-Tq-ϵm map suited to a high thermal load condition, depending on a thermal load condition such as combustion-chamber wall temperature Tw, engine temperature or the like. The $1^{st}$ Ne-Tq-ϵm map of FIG. 12A shows how target compression ratio ϵm (that is, a first target compression ratio ϵm1 described later in reference to the flow chart shown in FIG. 15) has to be varied with respect to engine load (engine torque Tq) and engine speed Ne under the low thermal load condition (e.g., at combustion-chamber wall temperatures Tw of 150° C. or less), whereas the $2^{nd}$ Ne-Tq-ϵm map of FIG. 12B shows how target compression ratio ϵm (that is, a second target compression ratio ϵm2 described later in reference to the flow chart shown in FIG. 15) has to be varied with respect to engine load (engine torque Tq) and engine speed Ne under the high thermal load condition (e.g., at combustion-chamber wall temperatures Tw exceeding 150° C.). For the same engine load and engine speed, the value of target compression ratio ϵm retrieved from the $1^{st}$ Ne-Tq-ϵm map of FIG. 12A is set to be higher than that retrieved from the $2^{nd}$ Ne-Tq-ϵm map of FIG. 12B. Therefore, ECU 39 incorporated in the engine of the third embodiment is configured to select the $1^{st}$ Ne-Tq-ϵm map of FIG. 12A under the low thermal load condition, and to select the $2^{nd}$ Ne-Tq-ϵm map of FIG. 12B under the high thermal load condition. Thus, ECU 39 calculates or retrieves, based on latest up-to-date information concerning engine speed Ne and engine load (i.e., engine torque Tq), target compression ratio ϵm from the Ne-Tq-ϵm map selected depending on the thermal load condition. Thereafter, ECU 39 controls or changes a controlled variable of the ϵ control system, that is, a driving signal applied to ϵ control actuator 16 of variable compression ratio mechanism 20, to bring the actual geometrical compression ratio ϵ closer to the calculated target compression ratio ϵm, determined by the Ne-Tq-ϵm map selected depending on the thermal load condition. In the third embodiment, ECU 39 uses a temperature of a wall surface of cylinder 10 (e.g., a temperature of the combustion-chamber wall surface formed of the non-metallic material such as a ceramic material). Actually, in the third embodiment, the processor (i.e., a thermal-load condition determination section) of ECU 39 determines the magnitude of thermal load on the basis of combustion-chamber wall temperature Tw detected directly by combustion-chamber wall temperature sensor 63 as shown in FIG. 5.

Details of the $1^{st}$ and $2^{nd}$ Ne-Tq-ϵm characteristic maps of FIGS. 12A-12B used in the engine of the third embodiment are hereunder described.

As can be seen from the $1^{st}$ and $2^{nd}$ maps respectively shown in FIGS. 12A-12B, the basic tendency of target compression ratio ϵm varying with respect to engine load (engine torque Tq) and engine speed Ne is similar to that of Ne-Tq-ϵm characteristic map shown in FIG. 6 used in the engines of the first and second embodiments. That is, as can be appreciated from the characteristic curves of the $1^{st}$ and $2^{nd}$ Ne-Tq-ϵm characteristic maps shown in FIGS. 12A-12B, under a low engine load condition, target compression ratio ϵm is set to a high value. Conversely, under a high engine load condition, target compression ratio ϵm is set to a relatively low value, in comparison with the low engine load condition. In a high engine speed range, target compression ratio ϵm is set to a high value. Conversely in a low engine speed range, target compression ratio ϵm is set to a relatively low value, in comparison with the high-speed driving state.

As can be seen from comparison between the two different Ne-Tq-εm characteristic maps shown in FIGS. 12A-12B, for the same engine operating condition (that is, for the same engine load and engine speed), the value of target compression ratio εm retrieved from the $1^{st}$ Ne-Tq-εm map of FIG. 12A is set to be relatively higher than that retrieved from the $2^{nd}$ Ne-Tq-εm map of FIG. 12B. This is because, under the same engine operating condition (the same engine load and speed), the engine tends to knock under a high thermal load condition rather than under a low thermal load condition.

As can be seen from comparison of the Ne-Tq-εm characteristics of FIGS. 12A-12B with the Ne-Tq-εm characteristics of FIG. 6, the $2^{nd}$ Ne-Tq-εm characteristic map (suited to the high thermal load condition) shown in FIG. 12B is set to be identical to the Ne-Tq-εm characteristic map of FIG. 6 used in the first and second embodiments. On the other hand, the value of target compression ratio εm retrieved from the $1^{st}$ Ne-Tq-εm characteristic map (suited to the low thermal load condition) shown in FIG. 12A is set to be relatively higher than that retrieved from the Ne-Tq-εm map of FIG. 6 used in the first and second embodiments. By changing or selecting the target compression ratio εm characteristic, fully taking into account the thermal load condition as well as engine load (engine torque Tq) and engine speed Ne, in the reciprocating engine of the third embodiment, it is possible to suppress combustion knock from occurring in the engine owing to an intake air temperature rise under the high thermal load condition, for example, during wide open throttle (WOT). On the other hand, under the low thermal load condition where there is a less tendency of combustion chamber knocking, the engine of the third embodiment can enhance a thermal efficiency, thus enhancing engine power output.

As discussed above, according to the engine of the third embodiment, it is possible to select an optimal one of the two different Ne-Tq-εm characteristic maps of FIGS. 12A-12B depending on whether the thermal load condition is high or low. However, regardless of switching between the two different Ne-Tq-εm characteristic maps shown in FIGS. 12A-12B depending on the thermal load condition, more concretely, regardless of the use of the $2^{nd}$ Ne-Tq-εm characteristic map (suited to the high thermal load condition) shown in FIG. 12B, a knocking condition often takes place owing to some factors. Therefore, it is desirable to execute knock-avoidance control (ε control and ignition-timing IT control) by way of which it is possible to avoid a combustion chamber knocking condition occurring under the high thermal load condition. The knock-avoidance control is hereunder described in detail in reference to the time charts shown in FIGS. 13A-13C.

In the time charts of FIGS. 13A-13C, assuming that the output level of the knock sensor signal from knock sensor 61 has exceeded a slice level at a point of time t11 under the high thermal load condition, the processor of ECU 39 determines that a combustion chamber knocking condition occurs. Immediately at the time t11, ignition timing IT is quickly temporarily compensated and decreased from a fourth ignition timing value IT4 (set just before the point of time t11 of the occurrence of knocking) to a fifth ignition timing value IT5 (<IT4) less than $4^{th}$ ignition timing IT4, for avoiding the knocking condition from undesirably continuing. Additionally, from the time t11, ε control is performed such that target compression ratio εm (or compression-ratio command value ε) is gradually decreased from a fourth compression ratio ε4 (set just before the point t11 of knocking occurrence) to a fifth compression ratio ε5 (<ε4) from the time t11. By virtue of the gradual decrease in target compression ratio εm from the time t11, a margin for occurrences of knocking tends to increase.

Thus, in accordance with the gradual decrease in target compression ratio εm, from the time t11 ignition timing IT is gradually recovered or phase-advanced from $5^{th}$ ignition timing IT5 to a sixth ignition timing value IT6 corresponding to a so-called trace-knock limit of trace-knock control that a change in ignition timing IT is substantially inversely proportional to a change in the compression ratio (target compression ratio εm or compression-ratio command value ε).

Referring now to FIG. 14, there is shown the compression ratio control routine related to knock-avoidance control of FIGS. 13A-13B, which control is initiated when the knock sensor signal output level exceeds the slice level at the time t11. FIG. 14 shows a control flow in time series.

At step S31, latest up-to-date information concerning engine load (i.e., engine torque Tq), engine speed Ne, wall temperature Tw detected by combustion-chamber wall temperature sensor 63, and sensor signal output from knock sensor 61, is read.

At step S32, target compression ratio εm is calculated. Concretely, arithmetic processing for target compression ratio εm is executed in accordance with the subroutine shown in FIG. 15.

At step S41 of FIG. 15, showing the subroutine related to step S32 of FIG. 14, a check is made to determine whether wall temperature Tw is less than or equal to a predetermined temperature value (e.g., 150° C.). When the answer to step S41 is affirmative (Tw≦150° C.), that is, during the low thermal load condition, the subroutine proceeds from step S41 to step S42.

At step S42, ECU 39 incorporated in the engine of the third embodiment selects the $1^{st}$ Ne-Tq-εm characteristic map (suited to the low thermal load condition) shown in FIG. 12A, under the condition of Tw≦150° C. After step S42, step S43 occurs.

At step S43, target compression ratio εm (exactly, $1^{st}$ target compression ratio εm1) is calculated or retrieved, based on latest up-to-date information concerning engine speed Ne and engine load (i.e., engine torque Tq), from the $1^{st}$ Ne-Tq-εm characteristic map (suited to the low thermal load condition) shown in FIG. 12A.

Subsequently to step S43, at step S44 compression-ratio command value ε is updated by $1^{st}$ target compression ratio εm1 calculated through step S43.

Conversely when the answer to step S41 is negative (Tw>150° C.), that is, during the high thermal load condition, the subroutine proceeds from step S41 to step S45.

At step S45, ECU 39 incorporated in the engine of the third embodiment selects the $2^{nd}$ Ne-Tq-εm characteristic map (suited to the high thermal load condition) shown in FIG. 12B, under the condition of Tw>150° C. After step S45, step S46 occurs.

At step S46, target compression ratio εm (exactly, $2^{nd}$ target compression ratio εm2) is calculated or retrieved, based on latest up-to-date information concerning engine speed Ne and engine load (i.e., engine torque Tq), from the $2^{nd}$ Ne-Tq-εm characteristic map (suited to the high thermal load condition) shown in FIG. 12B.

Subsequently to step S46, at step S47 compression-ratio command value ε is updated by $2^{nd}$ target compression ratio εm2 calculated through step S46.

Immediately when target compression ratio εm has been determined or calculated depending on whether the thermal load condition is high (Tw>150° C.) or low (Tw≦150° C.), that is, just after one execution cycle of the subroutine of FIG. 15 has terminated, the program advances to step S33 of FIG. 14.

At step S33, a check is made to determine whether combustion-chamber wall temperature Tw is less than target temperature level T0 (see FIG. 8A). Target temperature level T0 is a temperature criterion value above which combustion knocking tends to easily occur. For the reasons discussed above, ECU 39 determines that there is a less tendency for knocking to occur when wall temperature Tw is less than target temperature level T0 (i.e., Tw<T0), and thus one execution cycle of the $\epsilon$ control flow of FIG. 14 terminates.

When wall temperature Tw is greater than or equal to target temperature level T0 (i.e., Tw$\geqq$T0), ECU 39 determines that there is a possibility of occurrences of combustion-chamber knocking. Thereafter, the routine proceeds from step S33 to step S34.

At step S34, a frequency $\sigma$ of occurrences of knocking is calculated based on the knock sensor signal output. After step S34, step S35 occurs.

At step S35, a predetermined target compression ratio range is calculated or determined based on the calculated frequency $\sigma$ of occurrences of knocking and wall temperature Tw. As can be seen from the reference compression ratio characteristic diagram shown in FIG. 16, the previously-noted predetermined target compression ratio range is determined based on a reference compression ratio $\epsilon$ref, which ratio $\epsilon$ref is calculated or retrieved based on the calculated frequency $\sigma$ of occurrences of knocking and wall temperature Tw. Actually, the predetermined target compression ratio range is determined as a specified range ($\epsilon$ref−$\Delta\epsilon$ref$\leqq\epsilon$m$\leqq\epsilon$ref+$\Delta\epsilon$ref) defined between a lower permissible deviation −$\Delta\epsilon$ref from the calculated reference compression ratio $\epsilon$ref and an upper permissible deviation +$\Delta\epsilon$ref from the calculated reference compression ratio $\epsilon$ref. As shown in FIG. 16, for the same reference combustion-chamber wall temperature, reference compression ratio $\epsilon$ref tends to decrease, as the frequency $\sigma$ of occurrences of knocking increases. The reason for this is that the frequency $\sigma$ of occurrences of knocking can be reduced to below the slice level by decreasing reference compression ratio $\epsilon$ref in accordance with an increase in frequency $\sigma$ of occurrences of knocking. Additionally, when the detected combustion-chamber wall temperature Tw exceeds its reference combustion-chamber wall temperature, the frequency $\sigma$ of occurrences of knocking, corresponding to the detected combustion-chamber wall temperature Tw, tends to become higher than that corresponding to the reference combustion-chamber wall temperature. For the reasons discussed above, when the detected combustion-chamber wall temperature Tw becomes higher than its reference combustion-chamber wall temperature, reference compression ratio $\epsilon$ref is set to be smaller than that corresponding to the reference combustion-chamber wall temperature.

Returning to FIG. 14, at step S36, a check is made to determine whether target compression ratio $\epsilon$m calculated through step S32 is within the predetermined target compression ratio range ($\epsilon$ref−$\Delta\epsilon$ref$\leqq\epsilon$m$\leqq\epsilon$ref+$\Delta\epsilon$ref). There is a possibility that the calculated target compression ratio. $\epsilon$m is not in the predetermined target compression ratio range, because of individual differences of variable compression ratio (VCR) mechanisms manufactured, individual differences of fuel injection devices manufactured, individual differences of VCR's operating characteristics, individual differences of injection device's operating characteristics, and/or an aged deterioration in each of the fuel injection device and VCR. Without the previously-noted problem (e.g., the injection device deteriorated with age, the VCR deteriorated with age, the individual differences of VCRs manufactured, and/or the individual differences of fuel injection devices manufactured), usually, the calculated target compression ratio $\epsilon$m is within the predetermined target compression ratio range, and thus the answer to step S36 becomes affirmative (YES). In this manner, one execution cycle terminates.

For instance, when the previously-noted problem (in particular, the VCR deteriorated with age and/or the individual differences of VCRs manufactured) occurs and as a result the actual geometrical compression ratio exceeds target compression ratio $\epsilon$m, the frequency $\sigma$ of occurrences of knocking tends to exceed the slice level. In contrast, when the quantity of fuel sprayed from a fuel injector of the fuel injection device becomes excessive owing to the previously-noted problem (in particular, the injection device deteriorated with age, and/or the individual differences of fuel injection devices manufactured), there is an increased tendency of an excessive rise in combustion-chamber wall temperature Tw above the target temperature level T0. When such a situation occurs, the previously-discussed predetermined target compression ratio range ($\epsilon$ref−$\Delta\epsilon$ref$\leqq\epsilon$m$\leqq\epsilon$ref+$\Delta\epsilon$ref), which range is determined based on reference compression ratio $\epsilon$ref calculated based on both of the calculated frequency $\sigma$ of occurrences of knocking and wall temperature Tw, indicates compression ratios smaller than target compression ratio $\epsilon$m. That is, target compression ratio $\epsilon$m tends to exceed the upper limit (i.e., $\epsilon$ref+$\Delta\epsilon$ref) of the predetermined target compression ratio range ($\epsilon$ref−$\Delta\epsilon$ref$\leqq\epsilon$m$\leqq\epsilon$ref+$\Delta\epsilon$ref). Thus, the routine proceeds from step S36 to step S37.

At step S37, target compression ratio $\epsilon$m (calculated through step S32) is compensated and decremented by a predetermined decrement value $\Delta\epsilon$1. After step S37, step S38 occurs.

At step S38, $\epsilon$ control actuator 16 is operated to bring the actual geometrical compression ratio closer to the compensated target compression ratio $\epsilon$m decremented by the predetermined decrement value $\Delta\epsilon$1 through step S37. After $\epsilon$ control actuator 16 has been actuated, step S39 occurs.

At step S39, a check is made to determine whether the compensated target compression ratio $\epsilon$m obtained through step S37 is within the predetermined target compression ratio range ($\epsilon$ref−$\Delta\epsilon$ref$\leqq\epsilon$m$\leqq\epsilon$ref+$\Delta\epsilon$ref). When the answer to step S39 is negative (NO), that is, when the compensated target compression ratio $\epsilon$m is not in the predetermined target compression ratio range, steps S37-S38 are repeatedly executed, until the compensated target compression ratio $\epsilon$m becomes within the predetermined target compression ratio range. Repeatedly executing steps S37-S38 causes a gradual decrease in target compression ratio $\epsilon$m, and thus the compensated target compression ratio becomes within the predetermined target compression ratio range. In this manner, one execution cycle ends.

The operation and effects of the engine of the third embodiment are hereunder described.

According to the engine of the third embodiment, ECU 39 has and utilizes two different Ne-Tq-$\epsilon$m characteristic maps shown in FIGS. 12A-12B, in which, for the same engine operating condition (that is, for the same engine load Tq and engine speed Ne), the value of target compression ratio $\epsilon$m1 retrieved from the $1^{st}$ Ne-Tq-$\epsilon$m map of FIG. 12A (suited to a low thermal load condition and using engine speed Ne and engine load (engine torque Tq) as parameters) is set to be relatively higher than the value of target compression ratio $\epsilon$m2 retrieved from the $2^{nd}$ Ne-Tq-$\epsilon$m map of FIG. 12B (suited to a high thermal load condition and using engine speed Ne and engine load (engine torque Tq) as parameters). The processor (i.e., a map selection section) of ECU 39 is configured to select, based on a thermal load condition, either one of the $1^{st}$ and $2^{nd}$ Ne-Tq-$\epsilon$m maps of FIGS. 12A-12B. Concretely, the processor (i.e., a map selection section) of ECU 39 selects the $1^{st}$ Ne-Tq-εm map of FIG. 12A under the low thermal load condition, and selects the $2^{nd}$ Ne-Tq-εm map of FIG. 12B under the high thermal load condition (see steps S41-S42, and S45 in FIG. 15). Thereafter, ECU 39 calculates target compression ratio εm based on engine load (engine torque Tq) and engine speed Ne, both serving as parameters, from the selected target compression ratio εm map (see steps S41-S47 in FIG. 15). ECU 39 controls or changes a controlled variable of the ε control system, that is, a driving signal applied to ε control actuator 16 of variable compression ratio mechanism 20, to bring the actual geometrical compression ratio ε closer to the calculated target compression ratio εm, determined by the Ne-Tq-εm map selected depending on the thermal load condition. Thus, during the low thermal load condition, it is possible to enhance the thermal efficiency while reducing the cooling loss by keeping compression ratio ε high. Conversely during the high thermal load condition, it is possible to suppress the occurrence of knocking by keeping compression ratio ε low.

Assuming that the actual geometrical compression ratio ε exceeds target compression ratio εm owing to the variable compression ratio (VCR) mechanism deteriorated with age and/or the individual differences of VCRs manufactured, the frequency σ of occurrences of knocking tends to exceed the slice level. Alternatively, assuming that en excessive fuel supply from a fuel injector of the fuel injection device takes place owing to the injection device deteriorated with age and/or the individual differences of fuel injection devices manufactured, an excessive rise in combustion-chamber wall temperature Tw above the target temperature level T0 tends to occur. When such a situation occurs, a predetermined target compression ratio range (εref−Δεref≦εm≦εref+Δεref), which range is determined based on reference compression ratio εref calculated based on both of the calculated frequency σ of occurrences of knocking and wall temperature Tw, tends to indicate compression ratios smaller than target compression ratio εm. Target compression ratio εm is not in the predetermined target compression ratio range and thus target compression ratio εm tends to exceed the upper limit (i.e., εref+Δεref) of the predetermined target compression ratio range (εref−Δεref≦εm≦εref+Δεref). However, according to the third embodiment, for gasoline engines, knock sensor 61 (a knocking detector) and combustion-chamber wall temperature sensor 63 (a combustion-chamber wall temperature detector) are also provided. The processor (i.e., a predetermined target compression ratio range arithmetic processing section) of ECU 39 calculates the appropriate target compression ratio range (corresponding to the predetermined target compression ratio range defined by the inequality εref−Δεref≦εm≦εref+Δεref and see step S35 in FIG. 14) based on the frequency σ of occurrences of knocking, detected by knock sensor 61 and combustion-chamber wall temperature Tw detected by combustion-chamber wall temperature sensor 63. ECU 39 controls or compensates for a controlled variable of the ε control system including ε control actuator 16 of variable compression ratio mechanism 20, to adjust target compression ratio εm (either one of $1^{st}$ and $2^{nd}$ target compression ratios εm1 and εm2) retrieved from the selected target compression ratio characteristic map within the predetermined target compression ratio range (see steps S36-S39 in FIG. 14). Therefore, even in the presence of individual differences of variable compression ratio (VCR) mechanisms manufactured and/or individual differences of fuel injection devices manufactured, or even in the case of the injection device deteriorated with age and/or the VCR deteriorated with age, it is possible to bring or adjust the actual geometrical compression ratio ε within the appropriate target compression ratio range (i.e., predetermined target compression ratio range of εref−Δεref≦εm≦εref+Δεref).

The third embodiment is exemplified in gasoline engines, the inventive concept of the third embodiment can be applied to Diesel engines. More concretely, even when the inventive concept of the third embodiment is applied to Diesel engines, a part of a combustion-chamber wall surface, formed of a non-metallic material (such as a ceramic material), has a high heat-reserving effect as well as a high thermal-insulating effect. The high heat-reserving effect causes an intake air temperature rise under high engine load operation (or under high thermal load condition). In such a situation (under high engine load operation or under high thermal load condition), on Diesel engines, the combustion mode transfers from a premixed combustion to a diffusion combustion owing to the high intake air temperature. Thus, on Diesel engines, it is very effective to appropriately decrease the compression ratio according to ε control as shown in FIG. 14.

In the previously-described embodiments, variable compression ratio mechanism 20 has a function that variably adjusts at least the TDC position of piston 9 by varying the attitude of the linkage (6, 5, 11) by way of angular position control for the control shaft unit (13, 14). Variable compression ratio mechanism 20 has a further function that the piston stroke characteristic can be set or brought closer to a simple harmonic oscillation (see the piston stroke characteristic curve indicated by the solid line in FIG. 17). With the piston stroke characteristic closer to a simple harmonic oscillation, on the one hand, it is possible to provide a vibration-reducing effect that eliminates the necessity for a balancer shaft or balance weight adjustment (in four-cylinder engines). On the other hand, the piston stroke velocity of the engine employing variable compression ratio mechanism 20 near the piston TDC position becomes slow, as compared to the typical single-link type piston crank mechanism whose piston stroke characteristic is fixed to the same TDC-to-BDC piston stroke as that of the variable compression ratio mechanism (the multi-link type piston crank mechanism) 20. The slow piston stroke velocity near TDC causes an increase in cooling loss. As a countermeasure against the increased cooling loss arising from the slow piston stroke velocity, as set out above, the thermal-insulation piston and liner structure shown in FIG. 3B or the thermal-insulation piston and two-split cylinder liner structure shown in FIG. 4B is applied to the reciprocating engine employing variable compression ratio mechanism 20 shown in FIG. 1. Note that the previously-noted single-link type reciprocating piston crank mechanism whose piston stroke characteristic is fixed to the same TDC-to-BDC piston stroke as that of variable compression ratio mechanism 20, intends for a general single-link reciprocating piston crank mechanism whose connecting-rod length ranges from three times longer than the crank radius to five times longer than the crank radius. That is, the previously-noted single-link type reciprocating piston crank mechanism never intends for an impracticable single-link reciprocating piston crank mechanism whose connecting-rod length is excessively longer.

In the case of the previously-noted piston stroke characteristic having a comparatively slow piston stroke velocity near TDC, when the combustion chamber becomes flattened during compression stroke under a condition of the geometrical compression ratio adjusted to considerably high by way of ε control, one the one hand, a flame propagation velocity becomes slow, and, on the other hand (as a merit), a burning duration becomes long. In particular, in the case of the reciprocating engines of the shown embodiments, aiming at a very high compression ratio by way of application of the thermal-insulation piston and liner structure shown in FIG. 3B or the thermal-insulation piston and two-split cylinder liner structure shown in FIG. 4B, a degree of flatness (or a flattened rate) of the combustion chamber at TDC must be increased, in other words, a height of the combustion chamber at TDC must be reduced. For instance, in a direct-injection (DI) Diesel engine shown in FIG. 18, the maximum flattened rate (the maximum geometrical compression ratio) of the combustion chamber at TDC is set at 25:1. On DI Diesel engines having the maximum geometrical compression ratio adjustable to a very high compression ratio, such as 25:1, it is very effective or advantageous to lengthen the burning duration. As a fuel injection device suitable for such Diesel engines, it is preferable to use a generally-known common-rail fuel injection device as shown in FIG. 19.

Referring now to FIG. 20B, there is shown the comparative piston-stroke characteristic diagram illustrating the difference between the piston stroke characteristic (see the characteristic curve indicated by the one-dotted line in FIG. 20B) obtained by a general single-link reciprocating engine that a crank pin of a crankshaft is connected to a piston pin usually by means of a single link known as a "connecting rod" and a geometrical compression ratio is fixed, and the piston stroke characteristics (see the two characteristic curves indicated by the solid line in FIG. 20B) obtained by the multi-link reciprocating internal combustion engine (i.e., the variable compression ratio reciprocating engine) 100 employing variable compression ratio mechanism 20. FIG. 20A is the partially enlarged view of each of the three different piston-stroke characteristic curves shown in FIG. 20B near TDC. In FIGS. 20A-20B, the characteristic curve indicated by the fine solid line is the piston-stroke characteristic obtained by variable compression ratio reciprocating engine 100 at the compression-ratio command value (the actual geometrical compression ratio) $\epsilon$ controlled to a low compression ratio, whereas the characteristic curve indicated by the heavy solid line is the piston-stroke characteristic obtained by variable compression ratio reciprocating engine 100 at the compression-ratio command value $\epsilon$ controlled to a high compression ratio.

As can be seen from the three piston-stroke characteristic curves in FIGS. 20A-20B, as compared to the piston-stroke characteristic (see the characteristic curve indicated by the one-dotted line) of the typical single-link reciprocating engine (hereinafter is referred to as a "normal reciprocating engine"), the piston stroke velocity of variable compression ratio reciprocating engine 100 near the piston TDC position becomes slow. In other words, the slow piston stroke velocity means that a time period during which piston 9 is staying near TDC becomes long. As seen in FIG. 20B, the geometrical compression ratio of the normal reciprocating engine is fixed to the same compression ratio as variable compression ratio reciprocating engine 100 operating at the low compression ratio mode (see the characteristic curve indicated by the fine solid line).

As indicated by the one-dotted line in FIGS. 20A-20B, in the case of the normal reciprocating engine, the piston stroke velocity becomes fast near TDC and becomes slow near BDC. The fast piston stroke velocity near TDC means a great piston stroke acceleration, whereas the slow piston stroke velocity near BDC means a small piston stroke acceleration.

In contrast, in the case of variable compression ratio reciprocating engine 100, it is possible to realize the piston stroke characteristic close to a simple harmonic motion by way of proper setting of the multi-link configuration and design. On the one hand, this ensures a vibration-reduction effect by which there is a less necessity for a balancer shaft or balance weight adjustment (in four-cylinder engines). On the other hand, the piston stroke acceleration tends to be equalized and thus the piston stroke velocity near TDC tends to become slower than that obtained by the normal reciprocating engine. As a result of this, as compared to the single-link reciprocating engine (the normal reciprocating engine) whose piston stroke characteristic is fixed to the same TDC-to-BDC piston stroke as that of variable compression ratio reciprocating engine 100, in the case of variable compression ratio reciprocating engine 100, the time period during which piston 9 is staying near TDC tends to become longer.

Near the piston TDC position, scavenging action, charging action, and formation of air/fuel mixture are made by virtue of high-pressure fresh air supplied through an intake valve. Spark-ignition action is also made near TDC. On the one hand, the slow piston stroke velocity near TDC at which various actions or plural piston strokes are concentrated, contributes to an increase in rotational speed that can be outputted by the engine. On the other hand, the slow piston stroke velocity near TDC undesirably results in an increase in cooling loss.

Details of a variable valve operating system 200, which is applied to an intake port valve 211 of variable compression ratio reciprocating engine 100, are hereunder described in detail in reference to FIGS. 21-22. FIG. 21 shows the whole system configuration of variable valve operating system 200, while FIG. 22 shows the details of a continuously variable valve event and lift control (VEL) mechanism (in other words, a continuously variable valve lift and working angle control mechanism) 210 that constructs a part of variable valve operating system 200. As shown in FIG. 21, variable valve operating system 200 is comprised of a variable phase control mechanism (or a variable valve timing control (VTC) mechanism) 240 and the previously-noted VEL mechanism 210 combined to each other. For the sake of simplicity, a pair of intake valves 211 for only one engine cylinder are shown, along with their related component parts, namely, related rocker arms, pushrods, and valve lifters. VEL mechanism 210 functions to change (increase or decrease) both a valve lift and a working angle of intake valve 211, depending on engine/vehicle operating conditions. On the other hand, VTC mechanism 240 functions to change (advance or retard) the angular phase at the maximum valve lift point (at the central angle $\phi$ of intake valve 211).

The fundamental structure of VEL mechanism 210 is hereunder described in detail in reference to FIGS. 21-22.

Although it is not clearly shown in FIGS. 21-22, a pair of intake valves 211 and a pair of exhaust valves (not shown) are provide for each individual engine cylinder. A cylindrical-hollow drive shaft 213 is installed above the intake valves 211, in such a manner as to extend in the cylinder-row direction. A driven sprocket 242 is fixedly connected to one axial end of drive shaft 213. Drive shaft 213 is mechanically linked through driven sprocket 242 via a timing belt or a timing chain (not shown) to the engine crankshaft, such that driven sprocket 242 has a driven connection with the crankshaft. Rotatably supported on drive shaft are a pair of rockable cams 220, 220 for each individual engine cylinder, whose cam operation will be hereinafter described in detail. Briefly speaking, by way of oscillating motion of the rockable cam pair (220, 220) about the axis $P_3$ of drive shaft 213 within a predetermined angular range, a pair of intake-valve lifters 219, 219, located below the respective rockable cams, are pushed, and thus intake valves 211 move downwards. Rockable cams 220, 220, installed on the same cylinder, are fixedly connected to each other by means of a cylindrical hollow member, such that these two rockable cams 220, 220 move in phase.

As best seen in FIG. 22, rockable cam 220 is formed at its lower base portion with a support hole (a through hole) 222a loosely fitted onto the outer periphery of the cylindrical-hollow drive shaft 213, so as to permit oscillating motion of rockable cam 220 on drive shaft 213. Rockable cam 220 is also formed at its radially-protruding end portion (or a cam nose portion 223) with a pivot-pin hole (a through hole) 223a. Rockable cam 220 is formed on its lower surface with a base-circle surface portion 224a being concentric to drive shaft 213, and a moderately-curved cam surface portion 224b being continuous with base-circle surface portion 224a and extending toward the cam nose portion 223. Base-circle surface portion 224a and cam surface portion 224b are designed to be brought into abutted-contact with (sliding-contact) with a designated point or a designated position of the upper surface of the associated intake-valve lifter 219, depending on an angular position of rockable cam 220 oscillating.

Also provided is a cylindrical drive cam (or a first eccentric cam) 215 fixedly connected onto the outer periphery of drive shaft 213 by way of press-fitting. Drive cam 215 is cylindrical in shape and the central axis $P_4$ of the cylindrical outer peripheral surface of drive cam 215 is eccentric to the axis $P_3$ of drive shaft 213 by a predetermined eccentricity. Drive cam 215, fixedly connected to drive shaft 213, is axially spaced apart from the rockable cam 220 by a predetermined axial distance. A link arm 225 is rotatably fitted onto the outer peripheral surface of drive cam 215. Link arm 225 has a comparatively large-diameter, substantially annular base portion 225a, rotatably fitted onto the outer periphery of drive cam 215, and a protruded end portion 225b partly protruded from annular base portion 225a. Protruded end portion 225b is formed with a pivot-pin hole (a through hole) 225c. A control shaft 216 is provided at the upper right of drive shaft 213, and rotatably supported by the same bracket above drive shaft 213 and arranged parallel to the drive shaft in such a manner as to extend in the cylinder-row direction.

Control shaft 216 is driven within a predetermined angular range by means of a lift amount and working angle control actuator (simply, a VEL hydraulic actuator) 230 (see FIG. 21). A controlled pressure applied to VEL hydraulic actuator 230 is regulated or modulated by way of a first hydraulic unit (or a first hydraulic control modulator) 301, which is responsive to a control signal from ECU 39. The control signal value is determined based on the engine operating condition. Also provided is a control cam (or a second eccentric cam) 217 fixedly connected onto the outer periphery of control shaft 216 by way of press-fitting. The central axis $P_1$ of the cylindrical outer peripheral surface of control cam 217 is eccentric to the axis $P_2$ of control shaft 216 by a predetermined eccentricity $\alpha$ (see FIG. 22). A rocker arm 218 is rotatably fitted onto the outer peripheral surface of control cam 217. Rocker arm 218 oscillates about the central axis $P_1$ of control cam 217.

Rocker arm 218 is constructed by a central base portion 218a rotatably fitted onto the outer peripheral surface of control cam 217, a first tab-shaped portion 218b extending from the lower right of central base portion 218a, and a second tab-shaped portion 218c extending from the upper left of central base portion 218a (see FIG. 22). The first and second tab-shaped portions 218b-218c extend in the direction perpendicular to the axial direction of control shaft 216. The $1^{st}$ tab-shaped portion 218b is formed with a pivot-pin hole (a through hole) 218d, whereas the $2^{nd}$ tab-shaped portion 218c is formed with a pivot-pin hole (a through hole) 218e. The $1^{st}$ tab-shaped portion 218b of rocker arm 218 and the protruded end portion 225b of link arm 225 are mechanically linked to each other by means of a connecting pin 221, inserted into both of pivot-pin hole 218d and pivot-pin hole 225c, such that rocker arm 218 is located above link arm 225.

The $2^{nd}$ tab-shaped portion 218c of rocker arm 218 and a first end 226a of a link member 226 are mechanically linked to each other by means of a connecting pin 228 inserted into pivot-pin hole 218e.

A second end 226b of link member 226 and the radially-protruding cam nose end portion 223 of rockable cam 220 are mechanically linked to each other by means of a connecting pin 229 inserted into pivot-pin hole 223a.

Snap rings are installed on the respective ends of connecting pins 221, 228, and 229, for limiting or restricting axial movement of each of link arm 225 and link member 226.

The fundamental structure of VTC mechanism 240 is hereunder described in detail in reference to FIG. 21.

The variable phase control system employing VTC mechanism 240 is comprised of a phase control actuator (simply, a VTC hydraulic actuator) 241 and a second hydraulic unit (or a second hydraulic control modulator) 302.

VTC hydraulic actuator 241 is a phase converter capable of varying a relative phase of sprocket 242 (i.e., the engine crankshaft) to drive shaft 213, thus permitting rotary motion of drive shaft 213 relative to sprocket 242 within a predetermined angular range.

$2^{nd}$ hydraulic unit 302 is responsive to a control signal from ECU 39, whose signal value is determined based on the engine operating condition, such as engine load and/or engine speed. By way of hydraulic control for hydraulic pressure applied to VTC hydraulic actuator 241 via $2^{nd}$ hydraulic unit 302, relative phase of drive shaft 213 to sprocket 242 is changed so as to cause a phase advance or a phase retard for the angular phase at the maximum valve lift point (at the central angle $\phi$ of intake valve 211).

The previously-noted VEL mechanism 210 operates as follows.

When drive shaft 213 is driven and rotated by the crankshaft, link arm 225 moves up and down by virtue of cam action of drive cam 215. The up-and-down motion of link arm 225 causes oscillating motion of rocker arm 218 about the central axis $P_1$ of control cam 217. The oscillating motion of rocker arm 218 is transmitted via link member 226 to rockable cam 220, and thus rockable cam 220 oscillates. By virtue of cam action of rockable cam 220 oscillating, intake-valve lifter 219 is pushed and therefore intake valve 211 lifts. If the angular position of control shaft 216 is varied by means of VEL hydraulic actuator 230, the central axis $P_1$ of control cam 217, whose axis $P_1$ serves as a fulcrum of oscillating motion of rocker arm 218, varies, and as a result of this an initial position or a starting point of oscillating motion of rockable cam 220 also varies. Thus, the initial contact point of rockable cam 220 in contact with intake-valve lifter 219 varies, and thus the maximum lift amount varies (hereinafter described in detail in reference to FIGS. 23A-23B), since an oscillating angle of oscillating motion of rockable cam 220 per one revolution of the crankshaft is a fixed value.

FIGS. 23A-23B are the explanatory views illustrating the variable valve event and lift control executed by VEL mechanism 210, as viewed in the axial direction drive shaft 213. FIG. 23A is the explanatory view showing the two different linkage attitudes given at the two angular positions of rockable cam 220, respectively corresponding to the minimum and maximum oscillating motions, under a zero-lift condition, while FIG. 23B is the explanatory view showing the two different linkage attitudes given at the two angular positions of rockable cam 220, respectively corresponding to the minimum and maximum oscillating motions, under a full-lift condition. Hereupon, the term "zero lift" means that there is no lifting motion of intake valve 211 and thus a lift amount of intake valve 211 is zero. On the other hand, the term "full lift" means that the valve lift at the maximum valve lift point (at the central angle φ of intake valve 211) is adjusted or controlled to a maximum permissible valve lift amount.

As shown in FIG. 23A, when the central axis $P_1$ of control cam 217 is located above the axis $P_2$ of control shaft 216 and thus the thick-walled portion 117a is displaced upwards, as a whole rocker arm 218 shifts upwards. As a result, the radially-protruding cam nose end portion 223 of rockable cam 220 is relatively pulled upwards. That is, the initial position of rockable cam 220 is displaced or shifted so that the rockable cam itself is inclined in a direction that the cam surface portion 224b of rockable cam 220 moves apart from intake-valve lifter 219 (see the left-hand side (i.e., the minimum-oscillation angular position) in FIG. 23A). With rocker arm 218 shifted upwards, when rockable cam 220 oscillates during rotation of drive shaft 213, the base-circle surface portion 224a of rockable cam 220 is held in contact with intake-valve lifter 219 for a comparatively long time period. In other words, a time period, during which the cam surface portion 224b of rockable cam 220 is held in contact with intake-valve lifter 219, becomes short. As a consequence, a maximum lift amount of intake valve 211 becomes small (see the right-hand side (i.e., the maximum-oscillation angular position) in FIG. 23A). Additionally, a lifted period (i.e., a working angle) from intake-valve open timing IVO to intake-valve closure timing (IVC) becomes reduced or contracted.

As shown in FIG. 23B, conversely when the central axis $P_1$ of control cam 217 is located below the axis $P_2$ of control shaft 216 and thus the thick-walled portion 117a is displaced downwards, as a whole rocker arm 218 shifts downwards. As a result, the radially-protruding cam nose end portion 223 of rockable cam 220 is relatively pushed down. That is, the initial position of rockable cam 220 is displaced or shifted so that the rockable cam itself is inclined in a direction that the cam surface portion 224b of rockable cam 220 moves towards intake-valve lifter 219 (see the left-hand side (i.e., the minimum-oscillation angular position) in FIG. 23B). With rocker arm 218 shifted downwards, when rockable cam 220 oscillates during rotation of drive shaft 213, a portion of rockable cam 220 that is brought into contact with intake-valve lifter 219 shifts from the base-circle surface portion 224a quickly to the cam surface portion 224b. As a consequence, a maximum lift amount of intake valve 211 becomes large (see the right-hand side (i.e., the maximum-oscillation angular position) in FIG. 23B). Additionally, a lifted period (i.e., a working angle) from intake-valve open timing IVO to intake-valve closure timing (IVC) becomes increased or expanded. The angular position of control cam 217 can be continuously varied within limits by means of VEL hydraulic actuator 230, and thus valve lift characteristics (valve lift and working angle) also vary continuously.

Referring now to FIG. 24, there are shown the intake-valve lift characteristics obtained by variable valve operating system 200, constructed by VEL mechanism 210 and VTC mechanism 240 combined to each other. As previously explained, the initial position of control cam 217 can be continuously varied and thus valve lift characteristics of intake valve 211 can be continuously varied. That is, as can be seen from the valve lift characteristic curves indicated by the solid line in FIG. 24, VEL mechanism 210 of variable valve operating system 200 can scale up and down both the valve lift amount and the working angle of intake valve 211 continuously simultaneously. As clearly seen in FIG. 24, in the VEL mechanism incorporated of variable valve operating system 200, which is applied to the intake valve side of variable compression ratio reciprocating engine 100, intake-valve open timing IVO and intake-valve closure timing IVC vary symmetrically with each other in accordance with a change in valve lift and a change in working angle.

Additionally, as can be seen from the two valve lift characteristic curves (two phase-change characteristic curves) indicated by the broken line in FIG. 24, VTC mechanism 240 of variable valve operating system 200 can change (advance or retard) the angular phase at the maximum valve lift point (at the central angle φ of intake valve 211).

As discussed previously, variable valve operating system 200, constructed by VEL mechanism 210 and VTC mechanism combined to each other, can open intake valve 211 at an arbitrary crank angle and close the same at an arbitrary crank angle. That is, it is possible to set or variably adjust intake-valve closure timing IVC to an arbitrary timing value.

By utilizing the previously-noted variable intake-valve operating system 200, it is possible to realize a so-called Miller-cycle reciprocating engine capable of enhancing a ratio of an actual expansion ratio (determined by exhaust-valve open timing EVO) with respect to an actual compression ratio (determined by intake-valve closure timing IVC), In other words, capable of adjusting the actual compression ratio determined based on intake valve closure timing IVC to a smaller value than the actual expansion ratio determined based on exhaust valve open timing EVO. Hereupon, the previously-noted actual compression ratio determined by intake-valve closure timing IVC means an effective compression ratio, often denoted by Greek letter "ε'", which is generally defined as a ratio of the effective cylinder volume corresponding to the maximum working medium volume to the effective clearance volume corresponding to the minimum working medium volume. Note that the previously-described geometrical compression ratio often denoted by Greek letter "ε" and the effective compression ratio often denoted by Greek letter "ε'" are thermodynamically distinguished from each other. Also, the previously-noted actual expansion ratio means an effective expansion ratio, which is determined by exhaust valve open timing EVO as well as a geometrical expansion ratio. In more detail, the geometrical expansion ratio is generally defined as a ratio of cylinder volume with piston at BDC to cylinder volume with piston at TDC, whereas the effective expansion ratio is greatly affected by an effective exhaust stroke determined by exhaust valve open timing EVO and thus differs from the geometrical expansion ratio.

The Miller-cycle engine can stop intake-air-supply of intake air drawn into the cylinder in a substantially middle of intake stroke during a so-called early intake-valve closing Miller-cycle operating mode at which intake valve 211 is closed at approximately 90 degrees of crankangle before the piston BDC position on the intake stroke, and thus the intake air can be adiabatically expanded and compressed before and after the piston BDC position, and the effective piston stroke can be reduced. This contributes to a reduced pumping loss, thus improving fuel economy.

Referring now to FIG. 25, there are shown two different pressure-volume diagrams, namely a PV diagram obtained by a Miller-cycle engine whose intake valve closure timing IVC is controlled to approximately 90 degrees of crankangle BBDC (before bottom dead center) by means of variable intake-valve operating system 200, and a PV diagram obtained by a reciprocating internal combustion engine (a standard Otto-cycle engine) whose IVC is fixed to approximately 40 degrees of crankangle ABDC (after bottom dead center). In FIG. 25, the PV diagram obtained by the Miller-cycle engine whose IVC is controlled to approximately 90 degrees of crankangle BBDC, is indicated by the solid line, whereas the PV diagram obtained by the Otto-cycle engine whose IVC is fixed to approximately 40 degrees of crankangle ABDC, is indicated by the broken line.

As previously discussed, the Miller-cycle engine can stop intake-air-supply of intake air drawn into the cylinder in a substantially middle of intake stroke during the early intake-valve closing Miller-cycle operating mode at which intake valve 211 is closed at approximately 90 degrees of crankangle BBDC on the intake stroke. Therefore, adiabatic expansion of the intake air introduced into the cylinder occurs during a time period from the intake valve closure timing IVC (i.e., approximately 90° crankangle BBDC) to BDC. As a result, as shown in FIG. 25, the in-cylinder gas pressure falls, and thus the in-cylinder temperature also falls.

After the piston passes through BDC and starts up again, the compression stroke begins and thus the in-cylinder gas pressure begins to build up, but merely returns to the in-cylinder pressure value of the starting point of the aforementioned adiabatic expansion. Therefore, the further upward movement of the piston actually compresses the trapped air-fuel mixture from the point of time of return to the in-cylinder pressure value of the adiabatic-expansion starting point. For this reason, the effective compression ratio $\epsilon'$ tends to reduce, as intake valve closure timing IVC advances.

The reduced effective compression ratio results in a fall in in-cylinder temperature at TDC, thus causing deteriorated combustion, that is, decreased combustion velocity. For the reasons discussed above, the improvement of fuel economy cannot be got from the fall of pumping loss.

As set out above, when intake valve closure timing IVC is phase-advanced from BDC by means of variable intake-valve operating system 200, on the one hand, it is possible to reduce a pumping loss. On the other hand, the effective compression ratio $\epsilon'$ reduces, thus causing an intake air temperature fall at TDC on the compression stroke, in other words, deteriorated combustion.

Referring now to FIG. 26, there is shown the relationship between intake valve closure timing IVC and engine compression ratio $\epsilon$, which ratio $\epsilon$ is a nominal compression ratio (a geometrical compression ratio), generally defined as a ratio (V1+V2)/V1 of full volume (V1+V2) existing within the engine cylinder and combustion chamber with the piston at BDC to the clearance-space volume (V1) with the piston at TDC. The IVC-$\epsilon$ characteristic curve of FIG. 26 shows engine compression ratio (geometrical compression ratio) $\epsilon$ required to compensate for a reduction in effective compression ratio $\epsilon'$ occurring due to intake valve closure timing IVC phase-advanced from BDC.

As previously discussed, the effective compression ratio $\epsilon'$ tends to reduce, as intake valve closure timing IVC phase-advances. Thus, as can be seen from the IVC-$\epsilon$ characteristic diagram of FIG. 26, it is necessary to increase engine compression ratio (geometrical compression ratio) $\epsilon$, for retaining the effective compression ratio $\epsilon'$ unchanged regardless of the phase-advancing action of IVC. For instance, suppose that engine compression ratio (geometrical compression ratio) $\epsilon$ is "10" with intake valve closure timing IVC controlled to BDC. When intake valve closure timing IVC has been controlled to 90° crankangle BBDC, engine compression ratio (geometrical compression ratio) $\epsilon$ has to be controlled to "20" in order to retain the effective compression ratio $\epsilon'$ unchanged, regardless of such a phase-advance of IVC to a timing value of 90° crankangle BBDC.

According to the fourth embodiment in which variable compression ratio reciprocating piston engine 100 is combined with at least variable valve operating system 200, it is possible to increase geometrical compression ratio $\epsilon$ depending on intake valve closure timing IVC by means of variable compression ratio mechanism 20 of variable compression ratio engine 100. However, when geometrical compression ratio $\epsilon$ is controlled to a high value, the clearance space shape of the combustion chamber with the piston at TDC on the compression stroke becomes excessively flattened, thus increasing a cooling loss at TDC on the compression stroke. Therefore, on the one hand, increasing the engine compression ratio (geometrical compression ratio $\epsilon$) improves an undesirable compression temperature fall at TDC on the compression stroke. On the other hand, increasing the engine compression ratio $\epsilon$ leads to an increase in cooling loss. This does not lead to the improvement of the thermal efficiency.

In order to avoid the cooling loss from increasing owing to such an excessively flat shape of combustion chamber, arising from the engine compression ratio $\epsilon$ controlled to a high value, the reciprocating piston engine of the fourth embodiment further utilizes a heat-insulating and heat-reserving piston-and-cylinder-liner structure as shown in FIG. 3B, in which a part of the wall surface of the combustion chamber (for example, the surface layer of the piston crown, the inner periphery of the cylinder, the inside wall surface of the valve head portion of each engine valve, and the like) is formed of a non-metallic material (such as a ceramic material) having a higher heat-insulating and heat-reserving effect as compared to a base material of each of the combustion chamber and the reciprocating piston. By virtue of the heat-insulating effect of the heat-insulating and heat-reserving piston-and-cylinder-liner structure shown in FIG. 3B, it is possible to more effectively prevent heat transfer into the cylinder, thus reducing the cooling loss.

Additionally, by virtue of the heat-reserving effect of the heat-insulating and heat-reserving piston-and-cylinder-liner structure shown in FIG. 3B, intake air is warmed, thus resulting in an intake air temperature rise. Therefore, when the heat-insulating and heat-reserving piston-and-cylinder-liner structure shown in FIG. 3B is applied to the previously-noted Miller-cycle engine, it is possible to effectively suppress the intake air temperature fall at TDC on the compression stroke, occurring owing to a reduction in effective compression ratio $\epsilon'$, by way of the intake air temperature rise arising from the heat-reserving effect. As a result, it is possible to suppress a fall of compression temperature at TDC on the compression stroke without excessively increasing the engine compression ratio (geometrical compression ratio $\epsilon$) by variable compression ratio engine 100.

According to the reciprocating piston engine 100 of the fourth embodiment wherein the heat-insulating and heat-reserving piston-and-cylinder-liner structure, variable compression ratio mechanism 20, and variable intake-valve operating system 200 (VEL and VTC mechanisms 210, 240) are combined to each other, it is possible to variably control or set the engine compression ratio (geometrical compression ratio $\epsilon$) to a high compression ratio suited to the engine operating condition, and simultaneously to largely reduce the cooling loss during combustion at the engine compression ratio $\epsilon$ controlled to high.

Additionally, it is possible to reduce the pumping loss by phase-advancing intake valve closure timing IVC by means of variable intake-valve operating system 200. Furthermore, by virtue of the heat-reserving effect, which is the side effect of the thermal-insulation piston-and-cylinder liner structure, it is possible to positively reserve heat created during the combustion stroke and the exhaust stroke, thus heating the intake air. This effectively suppress a fall of compression temperature at TDC on the compression stroke. At this time, suppose that the current engine/vehicle operating condition corresponds to such a high thermal load condition where there is a risk of the occurrence of knocking owing to the high temperature of the heated intake-air. Under such a situation, it is possible to avoid engine knock from occurring by compensating and reducing the compression ratio in the reciprocating engine of the fourth embodiment.

That is, according to the reciprocating engine of the fourth embodiment, it is possible to improve fuel economy by way of a reduction in cooling loss and a reduction in pumping loss, achieved by fully utilizing both the high heat-insulating effect and the high heat-reserving effect of the heat-insulating and heat-reserving combustion-chamber structure, while greatly enhancing the Miller-cycle engine performance.

FIG. 27 shows the engine control system diagram of variable compression ratio reciprocating piston engine 100 employing the heat-insulating and heat-reserving piston-and-cylinder-liner structure, variable compression ratio mechanism 20, and variable intake-valve operating system 200 (VEL and VTC mechanisms 210, 240) combined to each other.

As shown in FIG. 27, the engine control system of variable compression ratio reciprocating piston engine 100 is comprised of variable compression ratio mechanism 20, combustion-chamber wall temperature sensor 63, knock sensor 61, variable intake-valve operating system 200, ignition device 41, and ECU 39. As can be seen from comparison between the control system configurations shown in FIGS. 5 and 27, in the variable compression ratio reciprocating piston engine 100 employing the heat-insulating and heat-reserving piston-and-cylinder-liner structure, variable compression ratio mechanism 20, and variable intake-valve operating system 200 (VEL and VTC mechanisms 210, 240) combined to each other, ECU 39 is further connected to the first and second hydraulic units 301-302, to be able to execute variable valve event and lift control (VEL control) and phase control (VTC control) and to achieve the previously-noted early intake-valve closing Miller-cycle operating mode, in addition to $\epsilon$ control and ignition timing control (containing trace-knock control) as previously described in reference to FIGS. 6-16).

ECU 39 of the engine control system of FIG. 27 pre-stores the previously-described two different thermal-load-condition based Ne-Tq-$\epsilon$m characteristic maps shown in FIGS. 12A-12B. For instance, during wide open throttle (WOT) at low engine speeds after warm-up, the cylinder wall temperature becomes high and thus a knocking condition tends to occur. Thus, during wide open throttle (WOT) at low engine speeds after warm-up, target compression ratio $\epsilon$m is set to a low value, for example "8" (see FIG. 12B). Conversely during the early stages of engine warm-up or during a cold engine start, the cylinder wall temperature is low and thus there is no risk of knocking. Thus, during the early stages of engine warm-up, target compression ratio $\epsilon$m is set to a somewhat high value, for example "10" (see FIG. 12A). On the other hand, during part load operation (i.e., during flat-road steady-state driving (R/L)), there is a less tendency of knocking, and thus target compression ratio $\epsilon$m is set to a considerably high value such as "14" or more (see FIG. 12B), for improving fuel economy. In contrast, during wide open throttle (WOT) at high engine speeds, there is a less tendency of knocking and thus target compression ratio $\epsilon$m is set to a comparatively high value, for example "10" or more (see FIG. 12B), for enhancing thermal efficiency, thereby increasing engine power output.

In the case that a knocking condition still occurs even during execution of $\epsilon$ control based on engine operating conditions, as previously described in reference to FIGS. 13A-13C, ignition timing control (the previously-discussed trace-knock control) is executed in addition to $\epsilon$ control for knocking avoidance.

In addition to the previously-described two different thermal-load-condition based Ne-Tq-$\epsilon$m characteristic maps shown in FIGS. 12A-12B, ECU 39 of the engine control system of FIG. 27 further pre-stores a preprogrammed Ne-Tq-IVC characteristic map showing how intake valve closure timing has to be varied with respect to an engine operating condition (engine speed and engine load).

Referring now to FIGS. 28A-28C, there are shown the three different intake-valve lift characteristic curves obtained by VEL+VTC control for intake valve 211, under respective engine operating conditions. In FIGS. 28A-28C, the maximum valve lift point denoted by "$\phi$" means the central angle of the valve lift characteristic of intake valve 211. FIG. 28A shows the intake-valve lift characteristic curve suited to low engine load operation during which intake valve closure timing IVC has to be phase-advanced. As seen from the intake-valve lift characteristic curve of FIG. 28A, during the low engine load operation, the intake-valve lift characteristic is controlled to a low lift and small working angle characteristic and simultaneously the central angle $\phi$ (the maximum valve lift point) of intake valve 211 is controlled to a maximum phase-advance timing value (represented in terms of "crankangle"). In contrast, FIG. 28C shows the intake-valve lift characteristic curve suited to high engine load operation during which intake valve closure timing IVC has to be phase-retarded. As seen from the intake-valve lift characteristic curve of FIG. 28C, during the high engine load operation, the intake-valve lift characteristic is controlled to a high lift and large working angle characteristic and simultaneously the central angle $\phi$ (the maximum valve lift point) of intake valve 211 is controlled to a maximum phase-retard timing value. On the other hand, FIG. 28B shows the intake-valve lift characteristic curve suited to middle engine load operation during which intake valve closure timing IVC has to be phase-changed to an intermediate phase between the maximum phase-advance timing value and the maximum phase-retard timing value. As seen from the intake-valve lift characteristic curve of FIG. 28B, during the middle engine load operation, the intake-valve lift characteristic is controlled to a middle lift and middle working angle characteristic and simultaneously the central angle $\phi$ (the maximum valve lift point) of intake valve 211 is controlled to an intermediate phase. In the fourth embodiment, as can be seen from the same three exhaust valve lift characteristic curves shown in FIGS. 28A-28C, the exhaust valve lift characteristic is fixed.

According to the reciprocating piston engine 100 of the fourth embodiment wherein the heat-insulating and heat-reserving piston-and-cylinder-liner structure, variable compression ratio mechanism 20, and variable intake-valve operating system 200 (VEL and VTC mechanisms 210, 240) are combined to each other, it is possible to enhance a thermal efficiency.

Additionally, in the variable compression ratio reciprocating piston engine 100 of the fourth embodiment, the engine compression ratio (geometrical compression ratio) $\epsilon$ can be variably controlled by means of variable compression ratio mechanism 20. Thus, during part load operation (i.e., during flat-road steady-state driving (R/L)), it is possible to enhance a thermal efficiency by reducing a cooling loss by way of the engine compression ratio $\epsilon$ kept high. Conversely during wide open throttle (WOT) or when detecting the knock sensor signal output level exceeding its slice level, the engine compression ratio is compensated and reduced, thus certainly avoiding or suppressing the occurrence of knocking.

Furthermore, in the variable compression ratio reciprocating piston engine 100 of the fourth embodiment, the effective compression ratio ∈' can be variably controlled by means of variable intake-valve operating system 200 (VEL and VTC mechanisms 210, 240). Thus, it is possible to reduce a pumping loss by reducing the effective compression ratio ∈'. At the same time, it is possible to improve combustion, while effectively suppressing the intake air temperature fall at TDC on the compression stroke, occurring owing to the reduced effective compression ratio ∈', by virtue of the high heat-reserving effect of the heat-insulating and heat-reserving combustion-chamber structure.

Moreover, in the case of variable compression ratio reciprocating engine 100 of the fourth embodiment, it is possible to realize the piston stroke characteristic close to a simple harmonic motion by way of proper setting of the multi-link configuration and design of variable compression ratio mechanism 20, thus eliminating the problem of unbalanced piston stroke velocities at TDC and BDC, consequently reducing a second-order vibration component of a vibrating system of reciprocating motion of each of pistons 9 of a plurality of engine cylinders. This ensures an improved noise-and-vibration reduction effect. The piston stroke velocity near TDC tends to become slower than that obtained by the normal reciprocating engine (the typical single-link reciprocating engine). As a merit, the slower piston stroke velocity near TDC contributes to a comparatively long burning duration, in other words, an increase in rotational speed that can be outputted by the engine. As a demerit, the slower piston stroke velocity near TDC may result in an increase in cooling loss. By virtue of the heat-insulating and heat-reserving piston-and-cylinder-liner structure of variable compression ratio reciprocating engine 100 of the fourth embodiment, it is possible to effectively avoid or suppress such an undesirable cooling loss from increasing.

Referring now to FIGS. 29-30, there is shown the thermal-insulation but heat-conduction piston structure, used in the multi-link reciprocating internal combustion engine (variable compression ratio engine 100) of the fifth embodiment. As shown in FIGS. 29-30, reciprocating piston 9 of the engine of the fifth embodiment is constructed as a thermal-insulation but heat-conduction piston 9C (hereinafter referred to as a "thermal-insulation plus cooling-ring piston 9C"). The base material of the piston main body 30 of thermal-insulation plus cooling-ring piston 9C is formed of a metallic material such as cast iron, aluminum (aluminum alloy), or magnesium (magnesium alloy). In a similar manner to thermal-insulation piston 9B shown in FIG. 3B, almost all area of the piston crown of thermal-insulation plus cooling-ring piston 9C is coated by thermal-insulation coating layer 55 (functioning as a thermal-insulation portion 31) such as a ceramic coating layer. However, only the outermost piston-crown annulus portion (the outermost piston-crown diameter portion) of thermal-insulation plus cooling-ring piston 9C is formed as a piston-crown cooling-ring portion 32A (functioning as a heat-conduction portion 32 formed of a high heat-conduction material) having a heat conductivity that is much higher than the thermal-insulation coating layer 55 (i.e., thermal-insulation portion 31), and higher than the base material of the piston main body 30 of thermal-insulation plus cooling-ring piston 9C. In the fifth embodiment, cooling-ring portion 32A is formed of a composite material, whose base material is a metallic material such as iron, aluminum, or copper, and in which a carbon nanotube (often abbreviated to "CNT") is blended with the metallic base material to provide a high heat-conduction piston-crown annulus portion of piston 9C. In the fifth embodiment, as seen in FIG. 29, cooing-ring portion 32A, which is fixedly fitted to or integrally formed as the piston-crown annulus portion of piston 9C, is rectangular in cross section. As seen in FIG. 30, the radial width (or the radial distance) between two concentric circles defining the outermost piston-crown annulus portion (i.e., cooing-ring portion 32A annularly continuously extending along the circumference of the piston crown) is constant around the entire circumference. Thus, the top face of cooling-ring portion 32A constructs a part of the piston crown, while the outer peripheral surface of cooling-ring portion 32A constructs a part of the substantially cylindrical outer peripheral surface of piston 9C. In the fifth embodiment, as clearly shown in FIG. 29, the top face of cooling-ring portion 32A is flush with the piston crown, while the outer peripheral surface of cooling-ring portion 32A is flush with the substantially cylindrical outer peripheral surface of piston 9C. In the fifth embodiment, used as the previously-noted carbon nanotube (CNT) is a multi-wall carbon nanotube (MWNT), which is formed by graphitic carbons arranged in multiple layers. The heat conductivity of the multi-wall carbon nanotube (MWNT) is approximately five times higher than that of copper. Thus, by the use of such a multi-wall carbon nanotube (MWNT) as the cooling-ring portion 32A, it is possible to set the heat conductivity of heat-conduction portion 32 of piston 9C to a value much higher than that of the metallic material (e.g., cast iron, aluminum alloy, or magnesium alloy) of the base material of the main piston body 30 of piston 9C.

Knocking (or engine knock) is a phenomenon that aldehyde and hydrogen peroxide are generated in unburned gas (air-fuel mixture) under high in-cylinder temperatures or high combustion-chamber wall temperatures and thus the end gas (the unburned mixture) self-ignites and explodes before the flame front arrives the last part of the unburned mixture. In gasoline spark-ignited engines, generally, such engine knock tends to occur at an outermost combustion-chamber annulus portion (an outermost combustion-chamber diameter portion) 62A of combustion chamber 62, corresponding to the last burning portion of propagation of flame traveling outward in all directions through the compressed air-fuel mixture. In the variable compression ratio engine 100 of the fifth embodiment, cooling-ring portion 32A is provided at the outermost piston-crown annulus portion that is brought into contact with high-temperature burned gas at the outermost combustion-chamber annulus portion 62A. Thus, it is possible to effectively suppress knocking to occur by locally enhancing a heat-exchange and cooling effect of outermost combustion-chamber annulus portion 62A by means of cooling-ring portion 32A, while effectively reducing a cooling loss by forming almost all area of the piston crown of thermal-insulation plus cooling-ring piston 9C as the thermal-insulation portion 31. Therefore, in the case of variable compression ratio engine 100 of the fifth embodiment, it is possible to set geometrical compression ratio ∈ of the reciprocating engine to a high value by the use of thermal-insulation plus cooling-ring piston 9C.

That is, it is possible, on the one hand, to enhance an engine thermal efficiency by reducing a cooling loss by forming or coating most of the crown of piston 9C by thermal-insulation coating layer 55 (thermal-insulation portion 31) such as a ceramic coating layer, and, on the other hand, to enhance the thermal efficiency by increasing the engine compression ratio ∈ during part load operation by way of variable control of geometrical compression ratio ∈ (or the engine expansion ratio), and also to suppress the lowering rate of geometrical compression ratio ∈ to be reduced for knocking avoidance to a minimum by means of cooling-ring portion 32A provided at the outermost combustion-chamber annulus portion 62A, while lowering the engine compression ratio for knocking avoidance during high engine load operation. This contributes to the largely-improved fuel economy and largely-enhanced engine power output performance.

Referring now to FIG. 31, there is shown the first modified thermal-insulation plus cooling-ring piston structure, used in variable compression ratio engine 100 of the sixth embodiment. As shown in FIG. 31, reciprocating piston 9 of the engine of the sixth embodiment is constructed as a thermal-insulation plus cooling-ring piston 9D. In a similar manner to thermal-insulation piston 9B shown in FIG. 3B, almost all area of the piston crown of thermal-insulation plus cooling-ring piston 9D is coated by thermal-insulation coating layer 55 (functioning as thermal-insulation portion 31) such as a ceramic coating layer. In a similar manner to thermal-insulation plus cooling-ring piston 9C of the fifth embodiment shown in FIGS. 29-30, the outermost piston-crown annulus portion is formed as a cooing-ring portion 32B (functioning as heat-conduction portion 32 formed of a high heat-conduction material) annularly extending along the circumference of the piston crown. In the sixth embodiment, as seen in FIG. 31, cooing-ring portion 32B, which is fixedly fitted to or integrally formed as the piston-crown annulus portion of piston 9D, is substantially C-shaped in cross section. The lower-half section of cooing-ring portion 32B of the C-shaped cross section has a piston-ring groove 33 formed therein. The upper pressure ring 51 is fitted to piston-ring groove 33. As can be seen from the cross section of FIG. 31, the radial width between two concentric circles defining the lower-half section (in other words, the radially-inward thick-walled section) of cooing-ring portion 32B is dimensioned to be greater than that between two concentric circles defining the annular top face of the upper-half section (having a trapezoidal cross section) of cooing-ring portion 32B. In FIG. 31, reference sign 31 denotes a frusto-conical sloped face interconnecting the innermost end of the annular top face of the upper-half section and the uppermost end of the inner periphery of the lower-half section. According to thermal-insulation plus cooling-ring piston 9D of the sixth embodiment whose cooling-ring portion formed with piston-ring groove 33, heat transfer from cooling-ring portion 32B via the upper compression ring 51 to cylinder 10 can be more remarkably promoted. The piston-ring-groove equipped cooling-ring portion 32B can more greatly enhance the cooling effect.

Referring now to FIG. 32, there is shown the second modified thermal-insulation plus cooling-ring piston structure, used in variable compression ratio engine 100 of the seventh embodiment. As shown in FIG. 32, reciprocating piston 9 of the engine of the seventh embodiment is constructed as a thermal-insulation plus cooling-ring piston 9E. The structure of thermal-insulation plus cooling-ring piston 9E of FIG. 32 is similar to that of thermal-insulation plus cooling-ring piston 9D of FIG. 31, except that thermal-insulation plus cooling-ring piston 9E further includes a jetted cooling oil receiving passage (a vertical cooling-oil passage) 35 and an annular cooling oil passage 36 communicated with each other. In more detail, oil receiving passage 35 is provided to receive the jetted cooling oil 71 sprayed from an oil jet nozzle (simply, an oil jet) 70 toward the underside (the backface) of piston 9E. In the seventh embodiment, oil receiving passage 35 is formed by way of casting with a salt core. The jetted cooling oil passing through oil receiving passage 35 flows into annular cooling oil passage 36 formed in a cooling-ring portion 32C (functioning as heat-conduction portion 32). Annular cooling oil passage 36 is configured to be substantially conformable to the annular shape of cooling-ring portion 32C. According to thermal-insulation plus cooling-ring piston 9E of the seventh embodiment whose cooling-ring portion formed with piston-ring groove 33 and annular cooling oil passage 36, it is possible to highly enhance the cooling effect of cooling-ring portion 32C.

Referring now to FIG. 33, there is shown the relationship between a piston-crown temperature Tp and the coordinate (the radial position) of a point on the piston crown in a radial coordinate system in which a center of the piston crown is taken as an origin and the coordinate of a point on the piston crown is represented as a radial distance r from the piston-crown center. As seen from the characteristic diagram of FIG. 33, in the case of thermal-insulation plus cooling-ring piston 9D of the sixth embodiment having cooling-ring portion 32B, the central portion of piston 9D except the outermost piston-crown annulus portion is hermetically covered by thermal-insulation coating layer 55 (thermal-insulation portion 31) and, on the one hand, it is possible to provide the heat-insulating effect slightly inferior to thermal-insulation piston 9B shown in FIG. 3B such that the piston-crown temperature Tp can be kept at a high temperature level. On the other hand, heat-transfer from the piston crown to piston main body 30 is suppressed by thermal-insulation coating layer 55 (thermal-insulation portion 31), but the outermost piston-crown annulus portion of piston 9D is formed by cooling-ring portion 32B having a high heat-exchange and cooling effect, and thus the piston-crown temperature Tp tends to further fall within the large radial coordinates in comparison with usual piston 9A (see FIG. 3A) made of a metallic material. Therefore, by the use of thermal-insulation plus cooling-ring piston 9D of FIG. 31, it is possible to reliably reconcile the cooling-loss reduction effect attained by thermal-insulation coating layer 55 (functioning as thermal-insulation portion 31) and the knocking-avoidance effect attained by cooling-ring portion 32B with the geometrical compression ratio ε controlled to high. Although only the piston-crown-position versus piston-crown temperature Tp characteristic of thermal-insulation plus cooling-ring piston 9D of the sixth embodiment of FIG. 31 is explained previously in reference to the three different characteristics shown in FIG. 33, notice that piston 9C of the fifth embodiment of FIGS. 29-30 and piston 9E of the seventh embodiment of FIG. 32 exhibit almost the same piston-crown-position versus piston-crown temperature Tp characteristic of thermal-insulation plus cooling-ring piston 9D of the sixth embodiment of FIG. 31.

Referring now to FIGS. 34-35, there is shown the third modified thermal-insulation plus cooling-ring piston structure, used in variable compression ratio engine 100 of the eighth embodiment. As shown in FIGS. 34-35, reciprocating piston 9 of the engine of the eighth embodiment is constructed as a thermal-insulation plus cooling-crescent piston 9F. The thermal-insulation plus cooling-crescent piston structure is suited to a four-valve reciprocating piston internal combustion engine employing two intake valves 211 and two exhaust valves 250 for each engine cylinder (see FIG. 35), for the reasons discussed below. Generally, on four-valve reciprocating piston internal combustion engines, in particular the area of the outermost piston-crown annulus portion of piston 9F near exhaust valves 250 that must pass the very hot burned gases, becomes very hot. Thus, knocking tends to occur within the specific very hot piston-crown area near exhaust valves 250. Thus, in the eighth embodiment, only the substantially crescent-shaped area of the outermost piston-crown annulus portion of piston 9F near exhaust valves 250 is formed as a crescent-shaped cooling area 32D (functioning as heat-conduction portion 32). By way of proper localized setting of heat-conduction portion 32 (crescent-shaped cooling area 32D), it is possible to efficiently reduce the temperature of the specific very hot area of the outermost piston-crown annulus portion of piston 9F near exhaust valves 250, thereby effectively suppressing knocking from occurring.

In the fifth, sixth, and seventh embodiments (see FIGS. 29-32), as heat-conduction portion 32 of the reciprocating piston (9C, 9D, 9E), the annular-shaped cooling-ring portion (32A, 32B, 32C) is formed around the entire circumference of the piston crown in such a manner as to annularly extend along the circumference. On the other hand, in the eighth embodiment (see FIGS. 34-35), as heat-conduction portion 32 of the reciprocating piston 9F, the crescent-shaped cooling portion 32D is localized at the specific piston-crown area near exhaust valves 250. In order to enhance the accuracy of knocking avoidance, more preferably, the annular-shaped cooling-ring portion (32A, 32B, 32C) may be combined with the crescent-shaped cooling portion 32D. Furthermore, in order to more certainly avoid a knocking condition from occurring, the thermal-insulation plus cooling-ring piston structure (see FIGS. 29-32) and/or the thermal-insulation plus cooling-crescent piston structure (see FIGS. 34-35) may be combined with the previously-described $\epsilon$ control achieved through variable compression ratio mechanism 20. For instance, under a first condition where a rate of occurrences of knocking, estimated based on an index of a margin for occurrences of knocking determined based on a history of an engine operating condition including at least the engine load (engine torque Tq), exceeds a predetermined rate, or under a second condition where a frequency $\sigma$ of occurrences of knocking, calculated based on a knock sensor signal output, exceeds a predetermined threshold value, or under a third condition where combustion-chamber wall temperature Tw, detected directly by wall temperature sensor 63, exceeds a predetermined temperature value, geometrical compression ratio $\epsilon$ may be reduced according to $\epsilon$ control, in variable compression ratio engine 100 having the thermal-insulation plus cooling-ring piston structure (see FIGS. 29-32) and/or the thermal-insulation plus cooling-crescent piston structure.

Referring now to FIGS. 36A-36B, there are shown the two different operating states (or the multi-link attitudes) of the multi-link reciprocating piston engine of the ninth embodiment employing variable compression ratio mechanism 20, which is comprised of a multi-link type reciprocating piston crank mechanism. FIGS. 36A-36B are the front views of the reciprocating engine. FIG. 36A shows the multi-link attitude at the intermediate stroke position between TDC and BDC, whereas FIG. 36B shows the multi-link attitude at the piston BDC position. Briefly speaking, as can be appreciated from comparison between the schematic diagrams of FIGS. 36A-36B and FIG. 1 (or FIG. 49), the multi-link type reciprocating piston crank mechanism of the variable compression ratio engine of the ninth embodiment shown in FIGS. 36A-36B has an offset cylinder structure that the centerline S of cylinder 10 is offset rightwards from the centerline of crankshaft 2, that is, the axis O of each of crank journals 3, in other words, the rotation center of crankshaft 2, whereas the multi-link type reciprocating piston crank mechanism of the variable compression ratio engine shown in FIGS. 1 and 49 has a non-offset cylinder structure that the centerline S of cylinder 10 is identical to the centerline of crankshaft 2. In the engine front-end views of FIGS. 36A-36B, the direction of rotation of crankshaft 2 is clockwise (see the direction of the arrow in FIG. 36A). In the case of the multi-link type reciprocating piston crank mechanism of the variable compression ratio engine of the ninth embodiment shown in FIGS. 36A-36B having an offset cylinder structure that the cylinder centerline S is offset rightwards from the crankshaft centerline (the rotation center O of crankshaft 2) when viewed from the front end of the engine, the offset cylinder design is configured such that a side thrust force acts on a first thrust side cylinder wall 10a (a right-hand thrust side cylinder wall of left and right cylinder walls facing two opposite thrust faces of piston 9 in the engine front view of FIGS. 36A-36B), located far away from the rotation center O of crankshaft 2, near the piston BDC position of reciprocating piston 9. Several merits of the offset cylinder structure are explained later in reference to FIGS. 41A-41B, 42A-42B, 43A-43B, and 44A-44B.

In the reciprocating engine of the ninth embodiment, from the viewpoint of light weight, in other words, reduced fuel consumption and emissions, the base structural material of reciprocating piston 9 is made of magnesium alloy whose specific gravity is less than aluminum alloy (see FIG. 45). As a matter of course, such a magnesium-alloy piston is superior to an aluminum-alloy piston, in light weight and improved fuel economy.

As seen in FIG. 46, a piston-skirt clearance space defined between the piston skirt and cylinder 10 must be set in a predetermined permissible clearance range. When the piston-skirt clearance space is an excessive clearance above the upper limit of the permissible clearance range shown in FIG. 46, an excessive piston slapping noise above a permissible mechanical noise level tends to occur. Conversely when the piston-skirt clearance space is an excessively small clearance below the lower limit of the permissible clearance range shown in FIG. 46, the excessively small piston-skirt clearance space cannot be adequately filled with lubricating oil, thus resulting in undesirable seizing of piston 9 to cylinder 10. In FIG. 46, the lower limit of the permissible clearance range is set to slightly extend towards a minus value below the zero point of the ordinate axis, fully taking into account thermal expansion of the cylinder wall and the piston skirt under high temperatures.

In the case of the magnesium-alloy piston with no thermal-insulation coating layer (with no thermal-insulation portion), in a low piston temperature Tp range, piston slapping noise tends to exceed a permissible mechanical noise level (see the piston-temperature Tp versus piston-skirt clearance characteristic indicated by the broken line of FIG. 46).

For the reasons discussed above, in the reciprocating engine of the ninth embodiment shown in FIGS. 36A-36B having the offset cylinder structure, as shown in FIGS. 29-30 a part of the wall surface of combustion chamber 62 is formed of a non-metallic material having a higher heat-insulating and heat-reserving effect. In more detail, the magnesium-alloy piston of the reciprocating engine of the ninth embodiment has the thermal-insulation plus cooling-ring piston structure as shown in FIGS. 29-30. That is, the structural base material of the piston main body of the reciprocating engine of the ninth embodiment is formed of magnesium alloy. Almost all area of the piston crown is coated by thermal-insulation coating layer 55 (functioning as thermal-insulation portion 31) such as a ceramic coating layer. Only the outermost piston-crown annulus portion is formed as piston-crown cooling-ring portion 32A (functioning as heat-conduction portion 32 formed of a high heat-conduction material) having a heat conductivity that is much higher than the thermal-insulation coating layer 55 (i.e., thermal-insulation portion 31), and higher than the structural base material of the piston main body. As previously described, cooling-ring portion 32A is formed of a composite material, whose base material is a metallic material such as iron, aluminum or copper, and in which a carbon nanotube is blended with the metallic base material to provide a high heat-conduction piston-crown annulus portion. In the ninth embodiment, used as the previously-noted carbon nanotube (CNT) is a multi-wall carbon nanotube (MWNT), which is formed by graphitic carbons arranged in multiple layers. The heat conductivity of the multi-wall carbon nanotube (MWNT) is approximately five times higher than that of copper. Thus, by the use of such a multi-wall carbon nanotube (MWNT) as the cooling-ring portion 32A, it is possible to set the heat conductivity of heat-conduction portion 32 to a value much higher than that of the metallic material (magnesium alloy) of the structural base material of the main piston body of the reciprocating engine of the ninth embodiment.

In a similar manner to the fifth embodiment, in the multi-link reciprocating engine of the ninth embodiment of FIGS. 36A-36B, cooling-ring portion 32A is provided at the outermost piston-crown annulus portion that is brought into contact with high-temperature burned gas at the outermost combustion-chamber annulus portion 62A. Thus, it is possible to effectively suppress knocking to occur by locally enhancing a heat-exchange and cooling effect of the outermost combustion-chamber annulus portion by means of cooling-ring portion 32A, while effectively reducing a cooling loss by forming almost all area of the piston crown as the thermal-insulation portion 31. Therefore, in the case of the multi-link reciprocating engine of the ninth embodiment, it is possible to set geometrical compression ratio $\epsilon$ of the reciprocating engine to a high value by the use of the thermal-insulation plus cooling-ring piston structure.

Even when the structural base material of the reciprocating piston of the ninth embodiment is made of magnesium alloy, it is possible to put the piston-skirt clearance space in the previously-noted permissible clearance range by virtue of thermal-insulation coating layer 55 (thermal-insulation portion 31) such as a ceramic coating layer (see the piston-temperature Tp versus piston-skirt clearance characteristic indicated by the heavy solid line of FIG. 46). In FIG. 46, the fine solid line indicates the piston-temperature Tp versus piston-skirt clearance characteristic obtained by an aluminum-alloy piston with no thermal-insulation portion. It is generally known that an engine thermal efficiency can be enhanced by reducing a cooling loss by forming or coating most of the piston crown by thermal-insulation coating layer 55 (thermal-insulation portion 31) such as a ceramic coating layer, since heat transfer is blocked by thermal-insulation coating layer 55.

On the other hand, the previously-noted ceramic heat-insulating material (i.e., thermal-insulation coating layer 55) has a property that most of heat absorbed by the ceramic insulation material itself is transferred to air drawn into combustion chamber 62 at high load operation (at high engine temperatures). The use of ceramic materials results in a temperature rise of the intake air drawn into the combustion chamber. For instance, the intake-air temperature rises up to 200° C. or more at the end of compression stroke. Additionally, the heat conductivity of the magnesium material is less than that of the aluminum material (see FIG. 45), and thus the magnesium-alloy piston is inferior to the aluminum-alloy piston, in flow of thermal energy. That is, as compared to the aluminum-alloy piston, the magnesium-alloy piston is inferior in a heat-release property from the piston to the cylinder, and therefore the magnesium-alloy piston temperature tends to become high during operation of the engine, rather than the aluminum-alloy piston temperature. In gasoline engines, the excessive magnesium-alloy piston temperature rise leads to increased knocking tendencies. To avoid knocking arising from such an excessive magnesium-alloy piston temperature rise, the engine compression ratio $\epsilon$ must be reduced. This means a deteriorated fuel consumption rate during low load operation. Additionally, during high load operation, an adequate charging efficiency of intake air must be fully taken into account. When the intake-air temperature undesirably rises due to the use of the thermal-insulation piston structure (having thermal-insulation coating layer 55), the intake-air density is lowered, thus causing a decrease in the quantity of air drawn into combustion chamber 62, in other words, a reduction in engine torque output at high engine load. That is, avoiding engine knock by reducing the compression ratio in the multi-link reciprocating piston of the ninth embodiment having the thermal-insulation magnesium-alloy piston structure requires a trade-off in engine torque.

To avoid the aforementioned trade-off between knocking avoidance and reduced engine torque, in the multi-link reciprocating engine of the ninth embodiment, geometrical compression ratio $\epsilon$ is controlled to a high value at low engine load operation so as to enhance a thermal efficiency. Conversely during high engine operation that a knocking condition is easy to occur owing to the intake-air temperature rise, arising from the heat-reserving effect, which is the side effect of the thermal-insulation piston structure having thermal-insulation portion 55 formed of a thermal insulation material (a non-metallic material) such as a ceramic material, geometrical compression ratio $\epsilon$ is compensated and reduced to a compression ratio less than the high compression ratio suited to the low engine load operation, thus reliably avoiding engine knock from occurring during the high engine load operation even in the magnesium-alloy piston whose main metallic element contains magnesium.

That is, it is possible, on the one hand, to enhance an engine thermal efficiency by reducing a cooling loss by forming or coating most of the piston crown by thermal-insulation coating layer 55 (thermal-insulation portion 31) such as a ceramic coating layer, and, on the other hand, to enhance the thermal efficiency by increasing the engine compression ratio $\epsilon$ during part load operation by way of variable control of geometrical compression ratio $\epsilon$ (or the engine expansion ratio), and also to suppress the lowering rate of geometrical compression ratio $\epsilon$ to be reduced for knocking avoidance to a minimum by means of cooling-ring portion 32A provided at the outermost combustion-chamber annulus portion 62A, while lowering the engine compression ratio for knocking avoidance during high engine load operation. This contributes to the largely-improved fuel economy and largely-enhanced engine power output performance. That is, the multi-link reciprocating engine of the ninth embodiment realizes light-weighting (the use of the magnesium-alloy piston) in addition to the same operation and effects as variable compression ratio engine 100 of the fifth embodiment using the thermal-insulation plus cooling-ring piston structure.

Returning to FIGS. 36A-36B, the fundamental structure of the multi-link type reciprocating piston crank mechanism of the variable compression ratio engine of the ninth embodiment shown in FIGS. 36A-36B having the offset cylinder structure is similar to that of variable compression ratio engine 100 of the first embodiment shown in FIG. 1 having the non-offset cylinder structure. Thus, the same reference signs used to designate elements in variable compression ratio engine 100 shown in FIG. 1 will be applied to the corresponding elements used in the ninth embodiment shown in FIGS. 36A-36B, for the purpose of comparison of the $1^{st}$ and $9^{th}$ embodiments. As discussed above, the reciprocating engine of the ninth embodiment further has an offset cylinder design, in addition to the multi-link type reciprocating piston crank mechanism as shown in FIGS. 1 and 49. When the direction of rotation of crankshaft 2 is clockwise (see the arrow of FIG. 36A), the direction of an offset of cylinder centerline S from crankshaft centerline (i.e., rotation center O of crankshaft 2) is a right direction (when viewed from the front end of the engine). In the case of the multi-link reciprocating engine of the ninth embodiment shown in FIGS. 36A-36B having the right-offset cylinder structure, the right-offset cylinder design is configured such that a side thrust force acts on the $1^{st}$ thrust side cylinder wall 10a (the right-hand thrust side cylinder wall in the engine front view of FIGS. 36A-36B), located far away from the rotation center O of crankshaft 2, near the piston BDC position of reciprocating piston 9. The side thrust force is created as a divided force (or a component force) of the resultant force, which is the product of the combustion pressure applied to the piston crown and the inertia force of the reciprocating piston parts containing reciprocating piston 9, piston pin 8, and piston rings. The side thrust force acts in the direction perpendicular to the connecting rod (or upper link 6).

In FIGS. 36A-36B, a circle denoted by "T" is a locus of motion of the outermost diameter portion of counterweight 4b about the rotation center O of crankshaft 2, during operation of the engine. As seen in FIGS. 36A-36B, assuming that the lower end 10d of the $2^{nd}$ thrust side cylinder wall 10b (the left-hand thrust side cylinder wall as viewed from the front end of the engine in the axial direction of piston-pin axis Oc), located close to the rotation center O of crankshaft 2, is designed to extend downwards on a level with the lower end 10c of the $1^{st}$ thrust side cylinder wall 10a (the right-hand thrust side cylinder wall in the engine front view), located apart away from the rotation center O of crankshaft 2, the lower end 10d of the $2^{nd}$ thrust side cylinder wall 10b interferes with counterweight 4b. Thus, the longitudinal length of the $2^{nd}$ thrust side cylinder wall 10b (the left-hand thrust side cylinder wall in the engine front view) is dimensioned to be shorter than that of the $1^{st}$ thrust side cylinder wall 10a (the right-hand thrust side cylinder wall in the engine front view). The level of the lower end 10d of $2^{nd}$ thrust side cylinder wall 10b is designed to be higher than that of the lower end 10c of $1^{st}$ thrust side cylinder wall 10a. In this manner, the lower end 10c of $1^{st}$ thrust side cylinder wall 10a is configured to extend down to a lower level rather than the lower end 10d of $2^{nd}$ thrust side cylinder wall 10b, and thus the piston sliding surface of $1^{st}$ thrust side cylinder wall 10a near the piston BDC position becomes greater than that of $2^{nd}$ thrust side cylinder wall 10b near the piston BDC position.

FIG. 37A shows a single-link type reciprocating piston crank mechanism that produces a standard piston stroke at a fixed compression ratio, whereas FIG. 37B shows a multi-link type reciprocating piston crank mechanism that produces an enlarged piston stroke by a combination of a very short piston having a very short axial length and the compression ratio control system. On the assumption that the design vertical distance between the piston crown (denoted by reference sign "9m") at the piston TDC position and the rotation center O of crankshaft 2 is the same for the single-link type reciprocating piston crank mechanism shown in FIG. 37A and the multi-link type reciprocating piston crank mechanism shown in FIG. 37B, suppose that the piston BDC position of the multi-link type reciprocating piston crank mechanism (FIG. 37B) must be set to a lower level than that of the single-link type reciprocating piston crank mechanism (FIG. 37A). In such a case, the piston skirt structure must be adequately considered, configured or designed as explained hereunder in reference to FIGS. 38A-38C, in order to avoid the skirt portion of piston 9 from interfering with counterweight 4b.

Referring now to FIGS. 38A-38C, there are shown the detailed structure of the very short height piston, which is applicable to the multi-link reciprocating piston engine of the ninth embodiment employing variable compression ratio mechanism 20. FIG. 38A shows the longitudinal cross-section of the very short height piston (viewed from the front end of the reciprocating engine), cut along a plane perpendicular to an axis of a piston-pin hole 9j and including the piston-crown center, FIG. 38B shows the longitudinal cross-section of the very short height piston (viewed in the left-to-right direction of the reciprocating engine), cut along a plane including the axis of piston-pin hole 9j, and FIG. 38C shows the very short height piston partially cutout.

As seen in FIG. 38A, the compression height h1 (measured in the direction of cylinder centerline S or in the central axis of the piston) of the very short height piston of the multi-link reciprocating piston engine is substantially identical to that of the standard engine (i.e., the single-link reciprocating engine). The skirt length or the skirt height h2 (measured in the direction of cylinder centerline S or in the central axis of the piston) of the multi-link reciprocating piston engine is dimensioned to be shorter than that of the standard engine (the single-link reciprocating engine). That is, the very short height piston is constructed as a so-called super-low piston having a very short skirt length. As compared to the standard engine (the single-link reciprocating engine), in the multi-link type reciprocating piston crank mechanism of the variable compression ratio engine of the ninth embodiment shown in FIGS. 36A-36B having the offset cylinder structure, the side thrust force (side thrust load) is comparatively small (see the small arrow indicating the side thrust in FIG. 37B) even under the maximum in-cylinder pressure (the maximum combustion pressure applied onto the piston crown) Pmax (see the downward-acting large arrow in FIG. 37B). The comparatively small side thrust contributes to the shortened piston-skirt length h2.

As seen in FIG. 38B, regarding the piston skirt portion 9b of the super-low piston 9, located below the piston ring land portion 9a, both sides of skirt portion 9b (viewed in the left-to-right direction of the reciprocating engine) are cut out (see left and right cutout portions 9c-9d in FIG. 38B). These cutout portions 9c-9d are provided to avoid undesirable interference between the skirt portion 9b and counterweight 4b during operation of the engine. As a result of left and right cutout portions 9c-9d, only the central skirt portion of a predetermined width is defined and thus the left-hand shoulder is defined by the left-hand side of ring land portion 9a and the central skirt portion, and the right-hand shoulder is defined by the right-hand side of ring land portion 9a and the central skirt portion, such that the two shoulders are approximately symmetric to each other with respect to the central axis of piston 9 (in other words, the centerline S of the cylinder). The left-hand shoulder defines a plane 9e formed on the underside of ring-land portion 9a and extending in the direction perpendicular to the piston axis (cylinder centerline S) and also defines a plane 9g extending downwards from the underside of ring-land portion 9a in the direction perpendicular to the plane 9e. In a similar manner, the right-hand shoulder defines a plane 9f formed on the underside of ring-land portion 9a and extending in the direction perpendicular to the piston axis (cylinder centerline S) and also defines a plane 9h extending downwards from the underside of ring-land portion 9a in the direction perpendicular to the plane 9f. Thus, the two planes 9g-9h are arranged parallel to each other and located symmetric to each other with respect to the piston axis (cylinder centerline S). Each of these two parallel planes 9g-9h is continuous smoothly with a bottom face 9i. In other words, the previously-noted left cutout portion 9c is defined by two planes 9e and 9g perpendicular to each other, while the previously-noted right cutout portion 9d is defined by two planes 9f and 9h perpendicular to each other.

As clearly shown in FIG. 38B, piston-pin hole 9j is bored in the two parallel planes 9g-9h, spaced apart from each other by the same distance with respect to the piston axis (cylinder centerline S), in such a manner as to penetrate through the planes 9g-9h in the fore-and-aft direction of the engine (in the left-to-right direction in FIG. 38B). Owing to the provision of left and right cutout portions 9c-9d, the axial length of piston-pin hole 9j of the super-low piston is dimensioned to be shorter than that of the single-link reciprocating engine (as can be seen from comparison between the piston-pin-hole axial lengths shown in the left-hand drawing of FIG. 37A and the left-hand drawing of FIG. 37B).

Returning to FIG. 38A, the left-hand side narrow outer periphery of skirt portion 9b is formed to be continuous with the outer periphery of ring-land portion 9a in such a manner as to extend downwards from the ring-land outer periphery. In a similar manner, the right-hand side narrow outer periphery of skirt portion 9b is formed to be continuous with the outer periphery of ring-land portion 9a in such a manner as to extend downwards from the ring-land outer periphery.

As best seen in FIG. 38C, in the same manner to the single-link reciprocating engine, in the super-low piston used in the multi-link reciprocating engine of the ninth embodiment, a piston cavity 9n and a valve recess 9o are formed in piston crown 9m. As best seen in FIG. 38B, also formed in the piston pin boss portion is a first-link mounting hole 9p into which the first link (upper link 6) is inserted.

According to the specific configuration of the super-low piston 9 explained previously in reference to FIGS. 38A-38C, as seen in FIG. 39 and in the left-hand drawing of FIG. 37B, when piston 9 passes near the piston BDC position, counterweight 4b passes through the previously-noted two cutout portions (cutout spaces) 9c-9d without interfering with skirt portion 9b.

Hereunder compiled briefly in reference to FIG. 40 is the principle that the super-low piston can be achieved or satisfied by virtue of the multi-link type piston crank mechanism of variable compression ratio engine 100 of the ninth embodiment. As clearly seen in FIG. 40, by the use of the multi-link piston crank mechanism, the attitude of upper link ($1^{st}$ link) 6 can be kept approximately upright near the piston stroke position corresponding to the maximum in-cylinder pressure (the maximum internal pressure in the combustion chamber) Pmax, thus ensuring a stable dynamic behavior of piston 9. The side thrust force acting on skirt portion 9b can be remarkably reduced, thus realizing the extremely shortened piston skirt (i.e., the very short skirt length h2 or the skirtless piston). On the other hand, the multi-link piston crank mechanism can realize the piston stroke characteristic close to a simple harmonic motion by way of proper setting of the multi-link configuration and design (described later in detail in reference to FIGS. 44A-44B), thus enabling a 30% reduction in the maximum inertia force of reciprocating piston parts. As a result, it is possible to reduce the axial length of piston pin 8 (in other words, the piston-pin boss width). As discussed above, by the almost skirt-less piston structure combined with the narrow piston-pin boss structure, it is possible to realize the previously-noted super-low piston.

Hereinafter described supplementally in reference to FIGS. 41A-41B, 42A-42B, 43A-43B, and 44A-44B are (i) the effects obtained by the offset cylinder structure where cylinder center line S is offset from the crankshaft centerline (i.e., rotation center O of crankshaft 2), and (ii) proper selection of the direction of an offset of cylinder centerline S from crankshaft centerline. Note that FIGS. 41A-41B and 42A-42B are engine rear views, whereas FIGS. 36A-36B are engine front views. Thus, left and right of FIGS. 41A-41B and 42A-42B are reverse to FIGS. 36A-36B. In the engine front-end views of FIGS. 36A-36B, the direction of rotation of crankshaft 2 is clockwise (see the direction of the arrow in FIG. 36A), whereas in the engine rear-end views of FIGS. 41A-41B and 42A-42B, the direction of rotation of crankshaft 2 is anticlockwise (see the arrows in the left-hand drawings of FIGS. 41A-41B and 42A-42B)

First, the effects obtained by the offset cylinder structure is hereunder described in reference to FIGS. 41A-41B. In the engine rear views of FIGS. 41A-41B, cylinder centerline S is offset rightwards, but actually cylinder offset is a left offset when viewed from the front end of the engine.

The left-hand, center, and right-hand drawings of FIG. 41A show the attitude changes of links (upper link 6, lower link 5, and control link 11) in the cylinder-offset multi-link reciprocating engine having a small left-offset cylinder structure and capable of attaining a piston-stroke enlargement ratio of 120% (+20% enlarged piston stroke), respectively at the piston TDC position, the intermediate stroke position, and the piston BDC position.

On the other hand, the left-hand, center, and right-hand drawings of FIG. 41B show the attitude changes of links (upper link 6, lower link 5, and control link 11) in the cylinder-offset multi-link reciprocating engine having a large left-offset cylinder structure and capable of attaining a piston-stroke enlargement ratio of 140% (+40% enlarged piston stroke), respectively at the piston TDC position, the intermediate stroke position, and the piston BDC position.

In FIGS. 41A-41B, the rotation center O of crankshaft 2 is taken as an origin "O", and thus the circle drawn around the origin "O" indicates the locus T of motion of the outermost diameter portion of counterweight 4b about the rotation center O of crankshaft 2. In FIGS. 41A-41B, vertically-extending two parallel heavy solid line segments indicate the engine cylinder 10, and a first one of these two parallel heavy solid line segments, located close to the crankshaft rotation center O indicates the $1^{st}$ thrust side cylinder wall 10a (the right-hand thrust side cylinder wall in the engine front view), whereas the second heavy solid line segment, located far away from the crankshaft rotation center O indicates the $2^{nd}$ thrust side cylinder wall 10b (the left-hand thrust side cylinder wall in the engine front view).

On the assumption that the design vertical distance between the piston crown 9m at TDC and the rotation center O of crankshaft 2 (in other words, the engine size) is the same for the single-link type reciprocating piston crank mechanism (see FIG. 37A) and the multi-link type reciprocating piston crank mechanism (see FIG. 37B) and the entire piston stroke of the standard engine (single-link type reciprocating piston crank mechanism) is 100%, the previously-noted piston-stroke enlargement ratio of 120% (+20% enlarged piston stroke) means +20% downwardly enlarged stroke, further enlarged from the lower stroke limit of the piston stroke characteristic of the standard engine, and thus the entire piston stroke of the multi-link type piston crank mechanism is 120%. In the same manner, the previously-noted piston-stroke enlargement ratio of 140% (+40% enlarged piston stroke) means +40% downwardly enlarged stroke, further enlarged from the lower stroke limit of the piston stroke characteristic of the standard engine, and thus the entire piston stroke of the multi-link type piston crank mechanism is 140%. The +20% enlarged piston stroke and +40% enlarged piston stroke respectively mean +20% enlarged displacement and +40% enlarged displacement.

In the case that the small left-offset cylinder structure is combined with the piston-stroke enlargement ratio of 120%, as shown in the right-hand drawing (indicating the multi-link attitude at the piston BDC position) of FIG. 41A, the locus T of counterweight 4b slightly interferes with the lower end of the $1^{st}$ thrust side cylinder wall 10a (the left-hand thrust side cylinder wall in the engine rear view). Therefore, the small left-offset cylinder design makes it difficult for the stroke of piston 9 to be further downwardly enlarged.

In contrast, in the case that the large left-offset cylinder structure is combined with the piston-stroke enlargement ratio of 140%, the side thrust force tends to act on the $2^{nd}$ thrust side cylinder wall 10b (the right-hand thrust side cylinder wall in the engine rear view) near the piston BDC position (see as shown in the right-hand drawing of FIG. 41B). In the case of the large offset cylinder structure combined with +40% scale-up piston stroke (i.e., the piston-stroke enlargement ratio of 140%), the locus T of motion of the outermost diameter portion of counterweight 4b is also enlarged. In spite of the enlarged locus T of the outermost diameter portion of counterweight 4b, by virtue of such a large leftward offset of cylinder centerline S from crankshaft centerline (crankshaft rotation center O), the lower end of the $2^{nd}$ thrust side cylinder wall 10b (the right-hand thrust side cylinder wall in the engine rear view) is satisfactorily avoided from interfering with the outermost diameter portion of counterweight 4b (see the right-hand drawing of FIG. 41B).

As is generally known, the direction of action of side thrust force is determined by the direction of inclination of upper link ($1^{st}$ link) 6. As described later in detail, the direction of inclination of upper link 6 is determined whether connecting pin 7 (the lower pivot of upper link 6) exists on the right-hand side of cylinder centerline S or on the left-hand side of cylinder centerline S, because the axis Oc of piston pin 8 (the upper pivot of upper link 6) is reciprocating on cylinder centerline S during operation of the engine. As shown in the right-hand drawing of FIG. 41A (in the case of the small left-offset cylinder structure combined with the piston-stroke enlargement ratio of 120%), with upper link 6 tilted or inclined toward $1^{st}$ thrust side cylinder wall 10a (the left-hand thrust side cylinder wall in the engine rear view, in other words, the right-hand thrust side cylinder wall in the engine front view), side thrust acts on $1^{st}$ thrust side cylinder wall 10a corresponding to the inclination direction of upper link 6. In contrast, as shown in the right-hand drawing of FIG. 41B (in the case of the large left-offset cylinder structure combined with the piston-stroke enlargement ratio of 140%), with upper link 6 tilted or inclined toward $2^{nd}$ thrust side cylinder wall 10b (the right-hand thrust side cylinder wall in the engine rear view, in other words, the left-hand thrust side cylinder wall in the engine front view), side thrust acts on $2^{nd}$ thrust side cylinder wall 10b corresponding to the inclination direction of upper link 6.

Returning to the right-hand drawing of FIG. 41B, even in the case of the large left-offset cylinder structure combined with the +40% scale-up piston stroke (i.e., the piston-stroke enlargement ratio of 140%), the locus T of counterweight 4b interferes with the $1^{st}$ thrust side cylinder wall 10a (the left-hand thrust side cylinder wall in the engine rear view, in other words, the right-hand thrust side cylinder wall in the engine front view). However, as set forth above, in the case of large left-offset cylinder structure combined with the +40% scale-up piston stroke, owing to the direction of inclination of upper link 6, there is no side thrust acting on $1^{st}$ thrust side cylinder wall 10a. Thus, such undesirable interference can be easily avoided by cutting out only the interfering portion of the lower end of $1^{st}$ thrust side cylinder wall 10a with counterweight 4b.

The criterion for determining whether the offset amount of the offset cylinder design is large or small, is as follows. That is, when the position of connecting pin 7 (a pivot of upper link 6 and lower link 5) at BDC is located at a first side (including crankshaft rotation center O) of both sides of cylinder centerline S serving as a reference line, a combination of the multi-link type piston crank mechanism and the offset cylinder design corresponds to such a case that the offset amount of cylinder centerline S from crankshaft centerline (crankshaft rotation center O) is large. Conversely when the position of connecting pin 7 at BDC is located at the second side (not including crankshaft rotation center O and opposite to the first side) of both sides of cylinder centerline S serving as a reference line, a combination of the multi-link type piston crank mechanism and the offset cylinder design corresponds to such a case that the offset amount of cylinder centerline S from crankshaft centerline (crankshaft rotation center O) is small.

Suppose that the piston stroke has to be further increased or enlarged downwards with no change in left-offset amount of the large left-offset cylinder design shown in FIG. 41B. Owing to the further downward-enlarged piston stroke (or a piston-stroke enlargement ratio greater than 140%), the position of connecting pin 7 at BDC tends to shift to the second side, namely, the opposite side of cylinder centerline S not including crankshaft rotation center O. Thus, when the piston stroke must be further enlarged downwards, at the same time the left-offset amount must be also increased. That is to say, in the case that the piston stroke must be further increased, while acting a side thrust force on a desired one (the right-hand thrust side cylinder wall in the engine rear view) of left and right cylinder walls 10a-10b facing two thrust faces of piston 9, it is necessary to simultaneously increase the left-offset amount in proportion to the enlarged stroke of the entire piston stroke.

In contrast to the above, suppose that the entire piston stroke has to be decreased with no change in left-offset amount of the small left-offset cylinder design shown in FIG. 41A. Owing to the further decreased entire piston stroke (or a piston-stroke enlargement ratio less than 120%), the position of connecting pin 7 at BDC tends to shift to the first side of cylinder centerline S including crankshaft rotation center O. Owing to such a shift of the position of connecting pin 7 at BDC from the second side to the first side, as a matter of course, the direction of action of side thrust load switches from $1^{st}$ thrust side cylinder wall 10a to $2^{nd}$ thrust side cylinder wall 10b. As set out above, in determining the direction of action of side thrust near BDC, it is necessary to adequately take into account a variation in the piston stroke characteristic as well as the offset amount of the offset cylinder design.

Next, proper selection of the direction of an offset of cylinder centerline S from crankshaft centerline (crankshaft rotation center O) is hereunder described in reference to FIGS. 42A-42B. In the engine rear view of FIG. 42A, cylinder centerline S is offset leftwards, but actually cylinder offset is a right offset when viewed from the front end of the engine. On the other hand, in the engine rear view of FIG. 42B, cylinder centerline S is offset rightwards, but actually cylinder offset is a left offset when viewed from the front end of the engine.

The left-hand, center, and right-hand drawings of FIG. 42A show the attitude changes of links (upper link 6, lower link 5, and control link 11) in the cylinder-offset multi-link reciprocating engine having a large right-offset cylinder structure and capable of attaining a piston-stroke enlargement ratio of 140% (+40% enlarged piston stroke), respectively at the piston TDC position, the intermediate stroke position, and the piston BDC position.

On the other hand, the left-hand, center, and right-hand drawings of FIG. 42B (identical to FIG. 41B) show the attitude changes of links (upper link 6, lower link 5, and control link 11) in the cylinder-offset multi-link reciprocating engine having a large left-offset cylinder structure and capable of attaining a piston-stroke enlargement ratio of 140% (+40% enlarged piston stroke), respectively at the piston TDC position, the intermediate stroke position, and the piston BDC position.

As can be seen from comparison between the right-offset cylinder structure of FIG. 42A and the left-offset cylinder structure of FIG. 42B, when the direction of the offset of cylinder centerline S from crankshaft centerline is reversed, the cylinder wall located far away from crankshaft rotation center O and the cylinder wall located close to crankshaft rotation center O are also reversed. That is, in the case of the reciprocating engine having the right-offset cylinder structure of FIG. 42A, $1^{st}$ thrust side cylinder wall 10a (the right-hand thrust side cylinder wall in the engine front view) is located far away from crankshaft rotation center O, whereas $2^{nd}$ thrust side cylinder wall 10b (the left-hand thrust side cylinder wall in the engine front view) is located close to crankshaft rotation center O. Conversely, in the case of the reciprocating engine having the left-offset cylinder structure of FIG. 42B, $1^{st}$ thrust side cylinder wall 10a (the right-hand thrust side cylinder wall in the engine front view) is located close to crankshaft rotation center O, whereas $2^{nd}$ thrust side cylinder wall 10b (the left-hand thrust side cylinder wall in the engine front view) is located far away from crankshaft rotation center O.

In the case that the large left-offset cylinder structure is combined with the piston-stroke enlargement ratio of 140%, as shown in the center drawing (indicating the multi-link attitude at the intermediate stroke position between TDC and BDC) of FIG. 42B, the angle of inclination of upper link 6 with respect to cylinder centerline S tends to become large at the intermediate stroke position. In contrast, in the case that the large right-offset cylinder structure is combined with the piston-stroke enlargement ratio of 140%, as shown in the center drawing (indicating the multi-link attitude at the intermediate stroke position between TDC and BDC) of FIG. 42A, the angle of inclination of upper link 6 with respect to cylinder centerline S tends to become small, such that the attitude of upper link ($1^{st}$ link) 6 is brought closer to an approximately upright attitude at the intermediate stroke position. Thus, the angle of inclination of upper link 6 with respect to cylinder centerline S becomes small during combustion stroke (during power stroke). As hereunder described in detail, the small angle of inclination of upper link 6 means that side thrust load can be suppressed to a minimum during the power stroke.

The difference between of the piston thrust load rate characteristics, respectively obtained by the multi-link reciprocating engine having a piston-stroke enlargement ratio of 140% and a large rightward cylinder offset (see FIG. 42A) and the multi-link reciprocating engine having a piston-stroke enlargement ratio of 140% and a large leftward cylinder offset (see FIG. 42B) is hereunder described in reference to FIGS. 43A-43B. Hereupon, the piston thrust load rate is defined as a side thrust load per unit load applied onto the piston crown. In the ordinate axis indicated in FIGS. 43A-43B, the positive value above the zero point "0", namely, a plus rate of piston thrust load means that the thrust load acts on $1^{st}$ thrust side cylinder wall 10a (see the left-hand thrust side cylinder wall in the engine rear view of the right-hand drawing of FIG. 43A). On the other hand, the negative value below the zero point "0", namely, a minus rate of piston thrust load means that the thrust load acts on $2^{nd}$ thrust side cylinder wall 10b (see the right-hand thrust side cylinder wall in the engine rear view of the right-hand drawing of FIG. 43A). In FIGS. 43A-43B, the characteristic curve indicated by the heavy solid line is a change in piston thrust load rate, the vertical one-dotted line indicates the piston TDC position, and the vertical fine solid line indicates the angular position (expressed in terms of crankangle) corresponding to the maximum in-cylinder pressure (the maximum combustion pressure applied onto the piston crown) Pmax. In FIGS. 43A-43B, although only the piston TDC position is clearly shown, the piston BDC position is easily considered as the angular position corresponding to +180 degrees of crankshaft rotation from the TDC position.

As seen from the piston thrust load rate characteristic curve of FIG. 43B obtained by the multi-link reciprocating engine having a piston-stroke enlargement ratio of 140% and a large leftward cylinder offset, the characteristic curve exhibits a tendency that the piston thrust load rate gradually increases near TDC, in other words, a tendency for the plotted point of the piston thrust load rate to go away from the abscissa axis (the x-axis). Additionally, the characteristic curve of FIG. 43B exhibits the maximal value of the rate of piston thrust load, substantially midway between TDC and BDC. The characteristic curve further exhibits a tendency that the piston thrust load rate gradually decreases near BDC (TDC+180° crankangle), in other words, a tendency for the plotted point of the piston thrust load rate to approach to the abscissa axis (the x-axis). The characteristic curve of FIG. 43B (in case of the left-offset cylinder design) means that the side thrust load has to be undesirably greatly increased substantially at the midpoint of TDC and BDC, in order to ensure the side thrust load applied to the $2^{nd}$ thrust side cylinder wall 10b (the right-hand thrust side cylinder wall in the engine rear view of the right-hand drawing of FIG. 43B), located far away from crankshaft rotation center O, at the piston BDC position.

In contrast, as seen from the piston thrust load rate characteristic curve of FIG. 43A obtained by the multi-link reciprocating engine having a piston-stroke enlargement ratio of 140% and a large rightward cylinder offset, the characteristic curve exhibits a tendency that the piston thrust load rate gradually decreases near TDC, in other words, a tendency for the plotted point of the piston thrust load rate to approach to the abscissa axis (the x-axis). Additionally, the characteristic curve of FIG. 43A exhibits the minimal value of the rate of piston thrust load, substantially midway between TDC and BDC. The characteristic curve further exhibits a tendency that the piston thrust load rate gradually increases near BDC (TDC+180° crankangle), in other words, a tendency for the plotted point of the piston thrust load rate to go away from the abscissa axis (the x-axis). The characteristic curve of FIG. 43A (in case of the right-offset cylinder design) means that it is possible to avoid the demerit of the piston thrust load rate characteristic of the left-offset cylinder design of FIG. 43B that the side thrust load has to be undesirably greatly increased substantially at the midpoint of TDC and BDC, in order to ensure the thrust load applied to the $2^{nd}$ thrust side cylinder wall 10b located far away from crankshaft rotation center O, at the piston BDC position.

As discussed above, in the case of the left-offset cylinder design explained in reference to FIG. 43B, the piston thrust load tends to greatly increase substantially at the midpoint of TDC and BDC. The greatly increased piston thrust load leads to increased frictional loss and increased side thrust applied to the thrust face of the piston skirt portion. For the reasons discussed above, assuming that the piston-skirt area (or the skirt length h2) is narrowed or reduced with the left-offset cylinder design (see FIGS. 42B and 43B), it is impossible to satisfy or form a super-long piston stroke concept. As appreciated from the above, it will be understood that it is more desirable to select the right-offset cylinder design, when the direction of rotation of crankshaft 2 is clockwise in the engine front view, in the cylinder-offset multi-link reciprocating engine.

The difference between the piston stoke characteristics, respectively obtained by the multi-link reciprocating engine having a piston-stroke enlargement ratio of 140% and a large rightward cylinder offset (see FIGS. 42A and 43B) and the multi-link reciprocating engine having a piston-stroke enlargement ratio of 140% and a large leftward cylinder offset (see FIGS. 42B and 43B) is hereunder described in reference to FIGS. 44A-44B. Hereupon, the piston stroke is defined as a distance between rotation center O of crankshaft 2 and piston-pin axis Oc. In FIGS. 44A-44B, the characteristic curve indicated by the heavy solid line is the piston stroke characteristic obtained by the multi-link reciprocating engine, whereas the characteristic curve indicated by the fine solid line is the piston stroke characteristic obtained by the single-link reciprocating engine. In FIGS. 44A-44B, the maximal value of the piston stroke characteristic curve means the piston TDC position, whereas the minimal value of the piston stroke characteristic curve means the piston BDC position.

As can be seen from comparison between the piston stroke characteristic curve (see the heavy solid line of FIG. 44A) obtained by the multi-link reciprocating engine having the right-offset cylinder structure and the piston stroke characteristic curve (see the fine solid line of FIG. 44A) obtained by the single-link reciprocating engine having the non-offset cylinder structure, in FIG. 44A, there is a slight phase shift between these two piston stroke characteristics, exactly, a slight phase retard of the multi-link engine piston-stroke characteristic relative to the single-link engine piston-stroke characteristic. However, as compared to the stroke characteristic of the single-link reciprocating piston engine having the non-offset cylinder design, the stroke characteristic of the multi-link reciprocating piston engine having the right-offset cylinder design (FIG. 44A) is set or adjusted closer to a simple harmonic motion. In a similar manner, as can be seen from comparison between the piston stroke characteristic curve (see the heavy solid line of FIG. 44B) obtained by the multi-link reciprocating engine having the left-offset cylinder structure and the piston stroke characteristic curve (see the fine solid line of FIG. 44B) obtained by the single-link reciprocating engine having the non-offset cylinder structure, in FIG. 44B, there is a slight phase shift between these two piston stroke characteristics, exactly, a slight phase advance of the multi-link engine piston-stroke characteristic relative to the single-link engine piston-stroke characteristic. However, as compared to the stroke characteristic of the single-link reciprocating piston engine having the non-offset cylinder design, the stroke characteristic of the multi-link reciprocating piston engine having the left-offset cylinder design (FIG. 44B) is also set or adjusted closer to a simple harmonic motion.

Referring now to FIG. 47, there is shown the diagrammatic engine control system exemplified for variable compression ratio control ($\epsilon$ control) achieved through $\epsilon$ control actuator 16 of the variable compression ratio control system included in the multi-link reciprocating engine of the ninth embodiment. As shown in FIG. 47, the input/output interface (I/O) of ECU 39 receives input information from various engine/vehicle sensors, namely a crank angle sensor (or a crankshaft position sensor) 162, a coolant temperature sensor (an engine temperature sensor) 163, and the like. The I/O of ECU 39 also receives information concerning engine load. For instance, the information about engine load can be detected as a sensor signal from a throttle opening sensor (or an accelerator position sensor). In lieu thereof, a basic fuel injection pulse-width Tp corresponding to a basic injection quantity is calculated based on an intake-air quantity measured by an airflow meter and engine speed Ne detected by crank angle sensor 162, and the magnitude of engine load may be estimated based on the calculated basic fuel injection pulse-width Tp. Assuming that the number of engine cylinders is "n", crank angle sensor 162 generates a reference pulse signal REF at a predetermined crank angle for every crank angle 720°/n, and simultaneously generates a unit pulse signal POS (1° signal or 2° signal) for every unit crank angle (1° or 2°). The processor of ECU 39 arithmetically calculates engine speed Ne for example based on the period of the reference pulse signal REF from crank angle sensor 162. Coolant temperature sensor (engine temperature sensor) 163 is located on the engine (engine block 1) to sense the actual operating temperature (coolant temperature Teng) of the engine.

Referring to FIG. 48, there is shown the compression ratio control routine executed within ECU 39 incorporated in the variable compression ratio control system included in the multi-link reciprocating engine of the ninth embodiment. The $\epsilon$ control routine shown in FIG. 48 is executed as time-triggered interrupt routines to be triggered every predetermined sampling time intervals (every execution cycles) such as 10 milliseconds.

At step S51, latest up-to-date information concerning engine load, engine speed Ne, and engine coolant temperature Teng detected by coolant temperature sensor 163, is read.

At step S52, a check is made to determine whether the detected coolant temperature Teng is less than a predetermined temperature value T1. When Teng<T1 (under a low thermal load condition), the routine proceeds to step S53. Conversely when Teng≧T1 (under a high thermal load condition), the routine proceeds to step S54.

At step S53, target compression ratio $\epsilon$m is calculated or retrieved based on latest up-to-date information concerning engine speed Ne and engine load, from the $1^{st}$ target compression ratio $\epsilon$m1 map of FIG. 12A selected depending on the low thermal load condition (low coolant temperature).

At step S54, target compression ratio $\epsilon$m is calculated or retrieved based on latest up-to-date information concerning engine speed Ne and engine load, from the $2^{nd}$ target compression ratio $\epsilon$m2 map of FIG. 12B selected depending on the high thermal load condition (high coolant temperature).

At step S55, ECU 39 outputs a command signal corresponding to a controlled variable, which is determined based on the calculated target compression ratio $\epsilon$m, to $\epsilon$ control actuator 16, so as to bring or adjust the actual compression ratio (geometrical compression ratio $\epsilon$) closer to the calculated target compression ratio $\epsilon$m suited to the thermal load condition.

In the control routine of FIG. 48, as an engine temperature, coolant temperature Teng, detected by coolant temperature sensor 163, is used. In lieu thereof, combustion-chamber wall temperature Tw, detected by combustion-chamber wall temperature sensor 63 (see FIG. 5), may be used. The operation and effects of the reciprocating engine of the ninth embodiment are hereunder described in detail.

According to the reciprocating engine of the ninth embodiment, first, the base structural material of reciprocating piston 9 is made of magnesium alloy whose specific gravity is less than aluminum alloy (see FIG. 45), thus enabling approximately −30% reduction of the weight of piston 9. This realizes a high-performance engine capable of generating a high engine power output at high engine speeds. This also contributes to reduced noise and vibrations during operation of the engine.

Secondly, almost all area of the piston crown is coated by thermal-insulation coating layer 55 (functioning as thermal-insulation portion 31) such as a ceramic coating layer, which serves as a heat-insulating material and also serves as a heat-reserving material, thereby effectively enhancing a thermal efficiency by greatly reducing a cooling loss during combustion. Thus, in spite of the use of magnesium alloy whose thermal expansion coefficient is somewhat greater than aluminum alloy (see FIG. 45) as the base structural material of reciprocating piston 9, the piston-skirt clearance space can be well-adjusted and properly set or put in the predetermined permissible clearance range (see the piston-temperature Tp versus piston-skirt clearance characteristic indicated by the heavy solid line of FIG. 46).

Additionally, according to the ninth embodiment, it is possible, on the one hand, to enhance an engine thermal efficiency by reducing a cooling loss by forming or coating most of the piston crown by thermal-insulation coating layer 55 (thermal-insulation portion 31) such as a ceramic coating layer, and, on the other hand, to enhance the thermal efficiency by increasing the engine compression ratio $\epsilon$ during part load operation by way of variable control of geometrical compression ratio $\epsilon$ (or the engine expansion ratio), and also to suppress the lowering rate of geometrical compression ratio $\epsilon$ to be reduced for knocking avoidance to a minimum by means of cooling-ring portion 32A provided at the outermost combustion-chamber annulus portion 62A, while lowering the engine compression ratio for knocking avoidance during high engine load operation. This contributes to the largely-improved fuel economy and largely-enhanced engine power output performance.

Additionally, according to the ninth embodiment, it is possible to variably control geometrical compression ratio $\epsilon$ depending on engine operating conditions (see the $\epsilon$ control routine of FIG. 48). In the multi-link reciprocating engine of the ninth embodiment, during high engine operation that a knocking condition is easy to occur owing to the intake-air temperature rise, arising from the heat-reserving effect, which is the side effect of the thermal-insulation piston structure having thermal-insulation portion 55 formed of a thermal insulation material (a non-metallic material) such as a ceramic material, geometrical compression ratio $\epsilon$ is compensated and reduced to a compression ratio less than the high compression ratio suited to low engine load operation (see FIGS. 12A-12B), thus reliably avoiding engine knock from occurring during the high engine load operation even in the magnesium-alloy piston whose structural base material mainly contains magnesium. This effectively reconcile the enhanced thermal efficiency and satisfactory knocking avoidance.

As described previously, the piston stroke velocity of the single-link reciprocating engine tends to become relatively fast near TDC and relatively slow near BDC, thereby causing unbalanced piston stroke velocities at TDC and BDC, that is, increased engine noise and vibrations. In contrast, the piston stroke velocity of the multi-link reciprocating engine tends to become relatively slow near TDC and become relatively fast near BDC. However, in the case of the multi-link reciprocating engine, it is possible to adjust or set its piston stroke characteristic close to a simple harmonic motion (see the piston stroke characteristic curve indicated by the heavy solid line in FIGS. 44A-44B) by way of proper setting of the multi-link configuration (multi-link alignment) and design of variable compression ratio mechanism 20, thus eliminating the problem of unbalanced piston stroke velocities at TDC and BDC, consequently reducing a second-order vibration component of a vibrating system of reciprocating motion of each reciprocating piston, and reducing vibrations of crankshaft 2.

Furthermore, according to the ninth embodiment, both sides of skirt portion 9b (viewed in the left-to-right direction of the reciprocating engine) are cut out (see left and right cutout portions 9c-9d in FIG. 38B). These cutout portions 9c-9d are configured or shaped such that the outermost diameter portion of counterweight 4b passes through cutout portions (cutout spaces) 9c-9d without interfering with skirt portion 9b even when piston 9 passes through near the BDC position (see the left-hand drawing of FIG. 37B and the right-hand drawing of FIG. 42A). With upper line 6 whose longitudinal length is properly limited, it is possible to set or approach the piston BDC position closer to crankshaft 2, thus ensuring the effectively enlarged piston stroke (see FIG. 37B). Owing to the enlarged piston stroke, the piston stroke acceleration tends to increase. By using the magnesium-alloy piston instead of the aluminum-alloy piston, it is possible to remarkably reduce the inertial mass of reciprocating piston 9 (see FIG. 45). Thus, the light-weight magnesium-alloy piston is very advantageous with respect to the speed-up and super-long stroke reciprocating engine.

As is generally known, with the connecting rod (or upper link 6) tilted, during operation of the engine, a side thrust force is created. In the single-link reciprocating engine, a piston skirt portion of a predetermined skirt length is provided to ensure a properly increased contact-surface area of the skirt portion (exactly, the thrust face) bearing against the cylinder wall, thereby reducing a bearing stress or a bearing pressure (or a contact-surface pressure). Even with the side thrust force applied from the piston skirt portion (the thrust face) to the cylinder wall, in other words, even with the piston skirt portion in sliding contact with the cylinder wall during upstroke or downstroke of the piston, it is possible to attain a smooth reciprocating motion of the piston. In contrast, in the multi-link reciprocating engine of the ninth embodiment employing variable compression ratio mechanism 20 constructed by the multi-link type piston crank mechanism containing upper link 6, lower link 5, and control link 11, reciprocating piston 9 is driven by crankshaft 2 through a plurality of links 6, 5, and 11. The angle of inclination of the $1^{st}$ link (i.e., upper link 6) of the multi-link piston crank mechanism can be set to be smaller than that of the connecting rod of the single-link piston crank mechanism, by way of proper setting of the multi-link configuration (multi-link alignment) and design of variable compression ratio mechanism 20. The smaller inclination angle of upper link 6 contributes to a reduction of side thrust, thus shortening a. The reduced side thrust also contributes to a reduced skirt length h2 (see FIG. 38A).

On the other hand, to realize the super-long stroke reciprocating engine that the piston-pin axis Oc (the upper pivot of upper link 6) can approach closer to crankshaft 2, it is necessary to adequately take into account (i) the problem of undesirable interference between the lower end of cylinder 10 and the outermost diameter portion of counterweight 4b during operation of the engine and (ii) the problem of undesirable interference between the outermost diameter portion of counterweight 4b and the piston skirt portion 9b near the piston BDC position.

In the case of the reciprocating engine of the ninth embodiment, reciprocating piston 9 is driven by crankshaft 2 through a plurality of links 6, 5, and 11, thus enabling the reduced skirt length h2. Moreover, the reciprocating engine of the ninth embodiment has a right-offset cylinder structure that the centerline S of cylinder 10 is offset rightwards from the crankshaft centerline (the rotation center O of crankshaft 2) in the engine front view (see FIGS. 36A-36B), and additionally side thrust load acts on only the $1^{st}$ thrust side cylinder wall 10a (the right-hand thrust side cylinder wall in the engine front view, in other words, the left-hand thrust side cylinder wall in the engine rear view), located far away from crankshaft rotation center O near the piston BDC position. From the viewpoint of reduced bearing pressure at the contact surface of the piston skirt portion (the thrust face) bearing against the cylinder wall, it is desirable to relatively length the lower end 10c of $1^{st}$ thrust side cylinder wall 10a rather than the lower end 10d of $2^{nd}$ thrust side cylinder wall 10b located close to crankshaft rotation center O. In other words, there is no problem even if the lower end 10d of $2^{nd}$ thrust side cylinder wall 10b is cut out or shortened for avoiding undesirable interference between the lower end 10d of $2^{nd}$ thrust side cylinder wall 10b and the outermost diameter portion of counterweight 4b, while realizing the right-offset cylinder structure. Thus, in the reciprocating engine of the ninth embodiment having a right-offset cylinder structure, actually, the lower end 10c of $1^{st}$ thrust side cylinder wall 10a is configured to extend down to a lower level rather than the lower end 10d of $2^{nd}$ thrust side cylinder wall 10b. This enables the super-long reciprocating piston stroke.

As will be appreciated from the above, according to the multi-link reciprocating engine of the ninth embodiment, it is possible to further downwardly enlarge the piston stroke amount from the lower stroke limit of the reciprocating piston stroke characteristic of the single-link engine, on the assumption that the design vertical distance between the piston crown 9m at TDC and the crankshaft rotation center O (in other words, the engine size) is the same for the single-link type reciprocating piston crank mechanism (see FIG. 37A) and the multi-link type reciprocating piston crank mechanism (see FIG. 37B). The engine displacement is also increased in direct proportion to the downwardly enlarged piston stroke, and therefore it is possible to effectively improve or enhance an engine output torque in a low engine speed range by the increased displacement. The increased displacement means an increase in cooling loss. Owing to the downwardly enlarged piston stroke, a so-called S/V ratio of the surface area S existing within the combustion chamber to the volume V existing within the combustion chamber (in particular, at the piston TDC position) tends to decrease. The decreased S/V ratio means a decrease in cooling loss. Thus, it is possible to cancel the increased cooling loss, arising from the increased engine displacement, by way of the decreased cooling loss, arising from the decreased S/V ratio, thus effectively improving fuel economy. Additionally, the enlarged piston stroke contributes to reduced noise and vibrations.

In the ninth embodiment, the multi-link reciprocating engine is exemplified in a spark-ignited in-line reciprocating engine in which all engine cylinders are in a single row and which has a right-offset cylinder structure that cylinder centerline S is offset rightwards from the crankshaft centerline (i.e., crankshaft rotation center O) with crankshaft 2 rotating clockwise in the engine front view. The fundamental inventive concept of the ninth embodiment may be applied to another types of multi-link reciprocating piston engines, which crankshaft 2 rotates anticlockwise in the engine front view. In this case, the reciprocating engine must be configured or designed as a left-offset cylinder structure that cylinder centerline S is offset leftwards from the crankshaft centerline (i.e., crankshaft rotation center O).

Furthermore, in a similar manner to the reciprocating piston engine of the seventh embodiment shown in FIG. 32, in order to more certainly suppress undesirable knocking during high engine load operation (or during a high thermal load condition), the multi-link reciprocating engine of the ninth embodiment may include oil jet nozzle 70 capable of spraying or jetting cooling oil 71 toward the underside (the backface) of piston 9 facing apart from combustion chamber 62.

It will be appreciated that the multi-link reciprocating engine of the ninth embodiment is exemplified in spark-ignited four-stroke-cycle gasoline engines, the inventive concept of the ninth embodiment can be applied to Diesel engines or two-stroke-cycle reciprocating internal combustion engines.

The entire contents of Japanese Patent Application Nos. 2006-277854 (filed Oct. 11, 2006), 2006-283981 (filed Oct. 18, 2006), and 2007-192734 (filed Jul. 25, 2007) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An engine comprising:
    a cylinder block having a cylinder;
    a reciprocating piston movable through a stroke in the cylinder;
    a variable compression ratio mechanism configured to be linked to the piston for variably adjusting a geometrical compression ratio of the engine by varying at least a top dead center position of the piston, such that the top dead center position obtained at a low geometrical compression ratio is set to be lower than that at a high geometrical compression ratio, responsively to a controlled variable;
    an engine-and-vehicle sensor provided for detecting an engine operating condition including at least an engine load; and
    a controller configured to be electronically connected to at least the variable compression ratio mechanism and the sensor for controlling the variable compression ratio mechanism by calculating a target compression ratio based on the engine load detected by the sensor, setting the target compression ratio to a high value at low engine load operation and to a relatively low value at high engine load operation as compared to the target compression ratio set at the low engine load operation, and changing the controlled variable to bring the geometrical compression ratio closer to the target compression ratio,
    wherein a substantially entire area of a crown of the piston, defining a part of a wall surface of a combustion chamber, which chamber is defined between the piston and the cylinder, is formed of a non-metallic material having a higher heat-insulating and heat-reserving property as compared to a base structural material of each of the combustion chamber and the piston.

2. The engine as claimed in claim 1, wherein:
    the controller comprises:
        a target compression ratio arithmetic processing section configured to calculate the target compression ratio based on engine speed detected by the sensor, the target compression ratio arithmetic processing section setting the target compression ratio to a high value at high engine speed operation, and setting to a relatively low value at low engine speed operation as compared to the target compression ratio set at the high engine speed operation; and a control section configured to change the controlled variable of the variable compression ratio mechanism to bring the geometrical compression ratio closer to the target compression ratio calculated based on the engine speed.

3. The engine as claimed in claim 1, wherein:

the engine is a reciprocating piston internal combustion engine;

the reciprocating piston internal combustion engine comprises a knock detector provided for generating a knock sensor signal indicating at least one of a frequency of occurrences of knocking and an intensity of knocking; and the controller decreases the calculated target compression ratio, when a level of the knock sensor signal exceeds a predetermined threshold value.

4. The engine as claimed in claim 1, further comprising:

a combustion-chamber wall temperature detector provided for detecting a wall surface temperature of the combustion chamber, wherein the controller decreases the calculated target compression ratio, when the combustion-chamber wall surface temperature exceeds a predetermined temperature value.

5. The engine as claimed in claim 1, wherein:

the controller comprises an engine-knock prediction section configured to estimate, based on a history of the engine operating condition including at least engine load, an index of a margin for occurrences of knocking; and the controller decreases the calculated target compression ratio, when the engine-knock prediction section predicts, based on the estimated index, that knocking takes place.

6. The engine as claimed in claim 1 wherein:

the controller has a first target compression ratio map, suited to a low thermal load condition and using engine load and engine speed as parameters to retrieve the target compression ratio, and a second target compression ratio map, suited to a high thermal load condition and using engine load and engine speed as parameters to retrieve the target compression ratio, for a same engine load and a same engine speed, a value of the target compression ratio retrieved from the first target compression ratio map being set to be relatively higher than a value of the target compression ratio retrieved from the second target compression ratio map;

the controller comprises:

a map selection section configured to select, based on a thermal load condition, either one of the first and second target compression ratio maps, the map selection section selecting the first target compression ratio map under the low thermal load condition, and selecting the second target compression ratio map under the high thermal load condition;

a target compression ratio arithmetic processing section configured to calculate the target compression ratio based on the engine load and the engine speed, from the selected target compression ratio map; and a control section configured to change the controlled variable of the variable compression ratio mechanism to bring the geometrical compression ratio closer to the target compression ratio calculated based on the engine load, the engine speed, and the thermal load condition.

7. The engine as claimed in claim 6, further comprising:

a combustion-chamber wall temperature detector provided for detecting a wall surface temperature of the combustion chamber, wherein the controller comprises a thermal-load condition determination section configured to determine based on the combustion-chamber wall surface temperature, whether the thermal load condition is high or low.

8. The engine as claimed in claim 7, wherein:

the engine is a reciprocating gasoline engine;

the reciprocating gasoline engine comprises a knock detector provided for generating a knock sensor signal indicating at least a frequency of occurrences of knocking;

the controller comprises:

a predetermined target compression ratio range arithmetic processing section configured to calculate a predetermined target compression ratio range based on the combustion-chamber wall surface temperature and the frequency of occurrences of knocking; and the control section further configured to compensate for the controlled variable of the variable compression ratio mechanism to adjust the target compression ratio calculated based on the engine load, the engine speed, and the thermal load condition within the predetermined target compression ratio range.

9. The engine as claimed in claim 1, wherein:

the variable compression ratio mechanism comprising:

a multi-link piston crank mechanism comprising:

(a) a first link connected at an upper end to the piston via a piston pin to permit relative rotation of the upper end of the first link about an axis of the piston pin;

(b) a second link adapted to be pivotally connected to a lower end of the first link and rotatably attached onto a crank pin on a crankshaft, so that the piston and the crankshaft are mechanically linked to each other via the first and second links; and (c) a third link pivotally connected at one end to the second link and pivotally connected at the other end to a fulcrum supported by the cylinder block to permit oscillating motion of the third link about the fulcrum;

a control shaft unit provided for displacing a position of the fulcrum corresponding to a center of oscillating motion of the third link; and an actuator configured to be linked to the control shaft unit for displacing the center of the oscillating motion of the third link responsively to the controlled variable of the variable compression ratio mechanism and for varying at least the piston top dead center position.

10. The engine as claimed in claim 9, wherein:

the control shaft unit comprises:

a control shaft rotatably supported on the cylinder block; and a connecting pin mechanically linking the third link to the control shaft and fixedly connected to the control shaft, an axis of the control shaft being eccentric to an axis of the connecting pin; and the actuator configured to vary at least the piston top dead center position by displacing the axis of the connecting pin about the axis of the control shaft by way of rotary motion of the control shaft based on the engine operating condition.

11. The engine as claimed in claim 10, wherein:

a multi-link configuration of the first, second, and third links of the variable compression ratio mechanism is set to bring a piston stroke characteristic of the piston close to a simple harmonic motion. 12. The engine as claimed in claim 1, wherein:
a piston stroke characteristic of the piston is close to a simple harmonic motion.

13. The engine as claimed in claim 1, further comprising:
a variable valve operating system configured to variably control at least an intake valve closure timing based on the engine operating condition, for adjusting an effective compression ratio determined based on the intake valve closure timing to a smaller value than an effective expansion ratio determined based on an exhaust valve open timing and for executing a Miller-cycle operating mode at which the intake-valve closure timing is phase-changed with respect to a bottom dead center position of the piston.

14. The engine as claimed in claim 13, wherein:
the variable valve operating system comprises:
 a continuously variable valve event and lift control mechanism that changes both a valve lift and a working angle of an intake valve; and
 a variable phase control mechanism that phase-changes an angular phase at a maximum valve lift point of the intake valve.

15. The engine as claimed in claim 13, wherein:
the engine is a reciprocating piston internal combustion engine;
the variable valve operating system of the reciprocating piston internal combustion engine is configured to execute an early intake-valve closing Miller-cycle operating mode at which the intake-valve closure timing IVC is phase-advanced to an approximately 90 degrees of crankangle before the piston bottom dead center position.

16. The engine as claimed in claim 13, wherein:
the variable valve operating system is configured to phase-advance the intake valve closure timing, as engine load detected by the sensor decreases.

17. The engine as claimed in claim 13, wherein:
the variable compression ratio mechanism is configured to increase the geometrical compression ratio of the engine, as engine load detected by the sensor decreases.

18. The engine as claimed in claim 17, further comprising:
a knock detector provided for generating a knock sensor signal indicating at least one of a frequency of occurrences of knocking and an intensity of knocking,
wherein the variable compression ratio mechanism is controlled to reduce the geometrical compression ratio, when a level of the knock sensor signal exceeds a predetermined threshold value.

19. The engine as claimed in claim 17, further comprising:
a combustion-chamber wall temperature detector provided for detecting a wall surface temperature of the combustion chamber,
wherein the variable compression ratio mechanism is controlled to reduce the geometrical compression ratio, when the combustion-chamber wall surface temperature exceeds a predetermined temperature value.

20. The engine as claimed in claim 1, wherein:
the engine is a spark-ignited reciprocating piston internal combustion engine in which an electrical discharge created by an igniter ignites an air-and-fuel mixture in the combustion chamber formed above the piston reciprocating in the cylinder; and
an outermost piston-crown diameter portion of the crown of the piston is formed as a heat-conduction portion having a higher heat conductivity, as compared to a remaining portion of the piston crown except the outermost piston-crown diameter portion.

21. The engine as claimed in claim 20, wherein:
the remaining portion of the piston crown is formed as a thermal-insulation portion formed of a thermal insulation material.

22. The engine as claimed in claim 21, wherein:
the thermal insulation material is the non-metallic material.

23. The engine as claimed in claim 20, wherein:
the heat-conduction portion is formed of a high heat-conduction material having a higher heat conductivity, as compared to the remaining portion of the piston crown except the outermost piston-crown diameter portion.

24. The engine as claimed in claim 23, wherein:
the high heat-conduction material is a composite material composed of the base structural material of the piston crown blended with a carbon nanotube.

25. The engine as claimed in claim 20, wherein:
the heat-conduction portion comprises a cooling-ring portion annularly extending around an entire circumference of the outermost piston-crown diameter portion.

26. The engine as claimed in claim 20, wherein:
a piston-ring groove is formed in the heat-conduction portion.

27. The engine as claimed in claim 20, further comprising:
an oil jet provided for jetting cooling oil toward a backface of the piston; and
a cooling-oil passage formed in the heat-conduction portion for cooling the piston by the cooling oil jetted from the oil jet.

28. The engine as claimed in claim 20, wherein:
the heat-conduction portion comprises only a substantially crescent-shaped cooling area of the outermost piston-crown diameter portion, localized near an exhaust valve.

29. The engine as claimed in claim 1, wherein:
the base structural material of the piston is formed of a magnesium alloy whose main metallic element contains magnesium.

30. The engine as claimed in claim 29, wherein:
the controller variably controls the variable compression ratio mechanism depending on an thermal load condition as well as the engine operating condition including engine load and engine speed.

31. The engine as claimed in claim 30, wherein:
the variable compression ratio mechanism comprising:
 a multi-link piston crank mechanism comprising:
  (a) a first link connected at an upper end to the piston via a piston pin to permit relative rotation of the upper end of the first link about an axis of the piston pin;
  (b) a second link adapted to be pivotally connected to a lower end of the first link and rotatably attached onto a crank pin on a crankshaft, so that the piston and the crankshaft are mechanically linked to each other via the first and second links; and
  (c) a third link pivotally connected at one end to the second link and pivotally connected at the other end to a fulcrum supported by the cylinder block to permit oscillating motion of the third link about the fulcrum; and
 a control shaft unit provided for displacing a position of the fulcrum corresponding to a center of oscillating motion of the third link.

32. The engine as claimed in claim 31, wherein:
the variable compression ratio mechanism further comprising:

an actuator configured to be linked to the control shaft unit for displacing the center of the oscillating motion of the third link based on the thermal load condition as well as the engine operating condition including engine load and engine speed.

33. The engine as claimed in claim 31, wherein:
the multi-link piston crank mechanism has a multi-link configuration that an angle of inclination of the first link with respect to a centerline of the cylinder becomes small during combustion stroke.

34. The engine as claimed in claim 31, wherein:
a piston stroke characteristic curve, obtained by the multi-link piston crank mechanism and indicating a relationship between a crankangle and a piston stroke of the reciprocating piston, is set at a stroke characteristic close to a simple harmonic motion.

35. The engine as claimed in claim 31, wherein:
a piston-skirt width of a skirt portion of the piston when viewed in a direction perpendicular to the piston-pin axis, is dimensioned to be substantially identical to an axial length of the piston pin.

36. The engine as claimed in claim 31, wherein:
a skirt portion of the piston has left and right cutout portions formed by cutting out both sides of the skirt portion when viewed in a direction perpendicular to the piston-pin axis; and
the left and right cutout portions are configured to permit an outermost diameter portion of a counterweight to pass through the cutout portions without interfering with the skirt portion when the piston passes near a bottom dead center position.

37. The engine as claimed in claim 31, wherein:
The engine is a spark-ignited reciprocating piston internal combustion engine having an offset cylinder structure that a centerline of the cylinder is offset from a rotation center of the crankshaft as viewed from a front end of the engine in an axial direction of the piston-pin axis, and that a side thrust force, created owing to at least an inertia force of the reciprocating piston, acts on only a first cylinder wall of left and right cylinder walls facing two opposite thrust faces of the piston near a piston bottom dead center position, the first cylinder wall located far away from the crankshaft rotation center and the second cylinder wall located close to the crankshaft rotation center as viewed from the front end of the engine.

38. The engine as claimed in claim 30, further comprising:
an oil jet provided for jetting cooling oil toward a backface of the piston; and
a cooling-oil passage formed in the base structural material of the piston for cooling the piston by the cooling oil jetted from the oil jet.

\* \* \* \* \*